(12) United States Patent
Hattori et al.

(10) Patent No.: US 7,509,452 B2
(45) Date of Patent: Mar. 24, 2009

(54) IMAGE FORMING APPARATUS, ERASING METHOD, AND HARD DISK MANAGEMENT METHOD

(75) Inventors: Yasuhiro Hattori, Kanagawa (JP); Ken Satoh, Tokyo (JP); Hidenori Shindoh, Tokyo (JP); Takahiro Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 588 days.

(21) Appl. No.: 10/928,481

(22) Filed: Aug. 30, 2004

(65) Prior Publication Data

US 2005/0174675 A1 Aug. 11, 2005

(30) Foreign Application Priority Data

| Jan. 19, 2004 | (JP) | 2004-011070 |
| Jan. 19, 2004 | (JP) | 2004-011071 |
| Jan. 19, 2004 | (JP) | 2004-011072 |
| Jan. 19, 2004 | (JP) | 2004-011073 |

(51) Int. Cl.
*G06F 12/00* (2006.01)

(52) U.S. Cl. .................. 711/112; 711/152; 711/163; 358/1.15; 358/1.14; 358/1.17

(58) Field of Classification Search ............... 711/112, 711/152, 163; 358/1.14, 1.15, 1.17
See application file for complete search history.

(56) References Cited

U.S. PATENT DOCUMENTS

| 4,866,541 | A | 9/1989 | Kawamura et al. |
| 5,212,556 | A | 5/1993 | Ogawa |
| 5,345,575 | A | 9/1994 | English et al. |
| 5,457,658 | A * | 10/1995 | Niijima et al. ............ 365/218 |
| 5,523,859 | A | 6/1996 | Nakajima et al. |
| 5,802,343 | A | 9/1998 | Fandrich et al. |
| 5,987,227 | A | 11/1999 | Endo et al. |
| 6,226,102 | B1 | 5/2001 | Koike et al. |
| 6,449,064 | B1 | 9/2002 | Hattori et al. |
| 6,535,707 | B2 | 3/2003 | Maruta et al. |

(Continued)

FOREIGN PATENT DOCUMENTS

EP 0 415 757 A1 3/1991

(Continued)

OTHER PUBLICATIONS

Steven Bauer, et al. "Secure Data Deletion for Linux File Systems"; Proceedings of the 10th Usenix Security Symposium (On Line); Aug. 13-14, 2001; pp. 153-164; XP002453010.

(Continued)

*Primary Examiner*—Matt Kim
*Assistant Examiner*—Hetul Patel
(74) *Attorney, Agent, or Firm*—Oblon, Spivak, McClelland, Maier & Neustadt, P.C.

(57) ABSTRACT

An image forming apparatus includes a plurality of erase information each showing whether or not to erase data for each of a plurality of divided areas into which the hard disk is divided, group erase information showing groups grouping the erase information, and erase count information determined based on the group erase information. Based on the erase count information whether or not there is a divided area to erase, the divided area is erased.

22 Claims, 59 Drawing Sheets

U.S. PATENT DOCUMENTS

| | | |
|---|---|---|
| 6,658,438 B1 | 12/2003 | Moore et al. |
| 6,708,234 B2 | 3/2004 | Moteki et al. |
| 2001/0025343 A1 | 9/2001 | Chrisop et al. |
| 2002/0181134 A1 | 12/2002 | Bunker et al. |
| 2002/0188814 A1 | 12/2002 | Saito et al. |
| 2003/0142354 A1 | 7/2003 | Matsuo et al. |
| 2004/0008375 A1* | 1/2004 | Fukuhara et al. ............ 358/1.16 |
| 2004/0027603 A1* | 2/2004 | Ueda et al. ................. 358/1.14 |
| 2005/0285899 A1* | 12/2005 | Simpson et al. ............... 347/49 |
| 2006/0152753 A1* | 7/2006 | Nakai et al. ................ 358/1.15 |
| 2006/0170953 A1* | 8/2006 | Okamoto et al. ........... 358/1.15 |
| 2006/0244997 A1* | 11/2006 | Watabe ...................... 358/1.16 |

FOREIGN PATENT DOCUMENTS

| | | |
|---|---|---|
| EP | 0 559 213 A2 | 9/1993 |
| EP | 1 357 468 A2 | 10/2003 |
| EP | 1 383 301 A1 | 1/2004 |
| JP | 55-112664 | 8/1980 |
| JP | 60-98505 | 6/1985 |
| JP | 64-1120 | 1/1989 |
| JP | 7-121309 | 5/1995 |
| JP | 7-271637 | 10/1995 |
| JP | 9-284572 | 10/1997 |
| JP | 10-150627 | 6/1998 |
| JP | 2001-225516 | 8/2001 |
| JP | 2002-329370 | 11/2002 |
| JP | 2002-366420 | 12/2002 |
| JP | 2003-198815 | 7/2003 |
| JP | 2003-280963 | 10/2003 |

OTHER PUBLICATIONS

Gordon Hughes, et al. "Secure Erase of Disk Drive Data"; Idema Insight Magazine; 2002; pp. 22-25; XP 002453011.

* cited by examiner

FIG.31
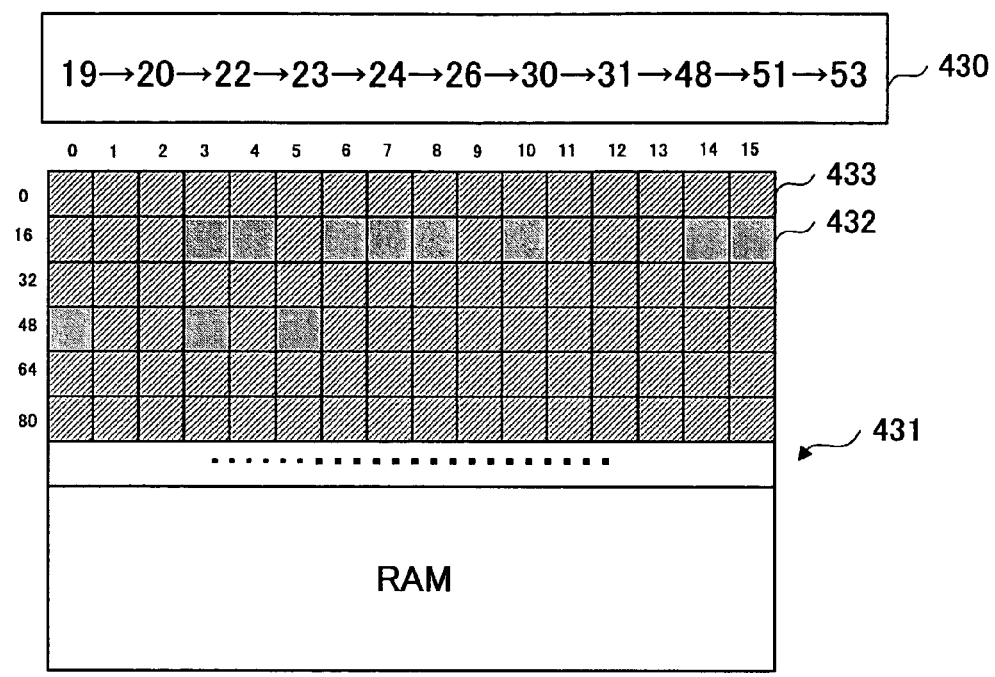
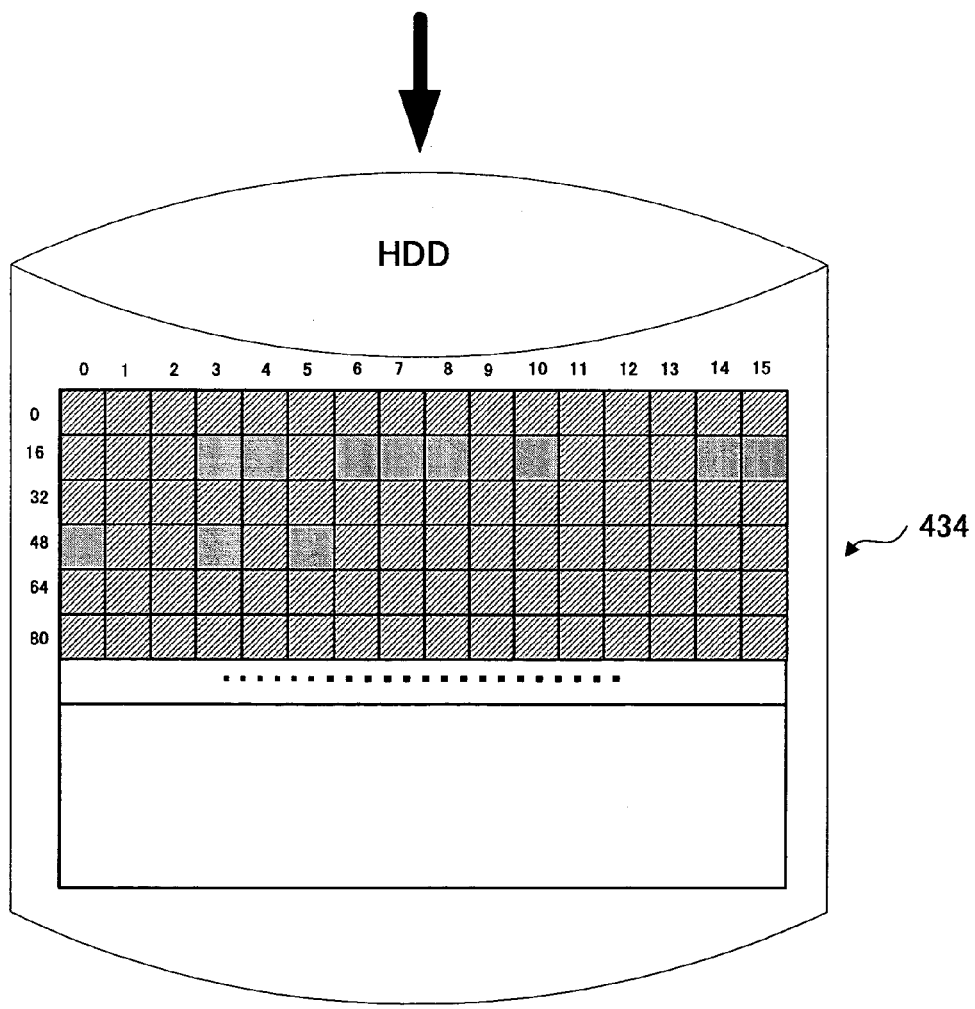

FIG.32
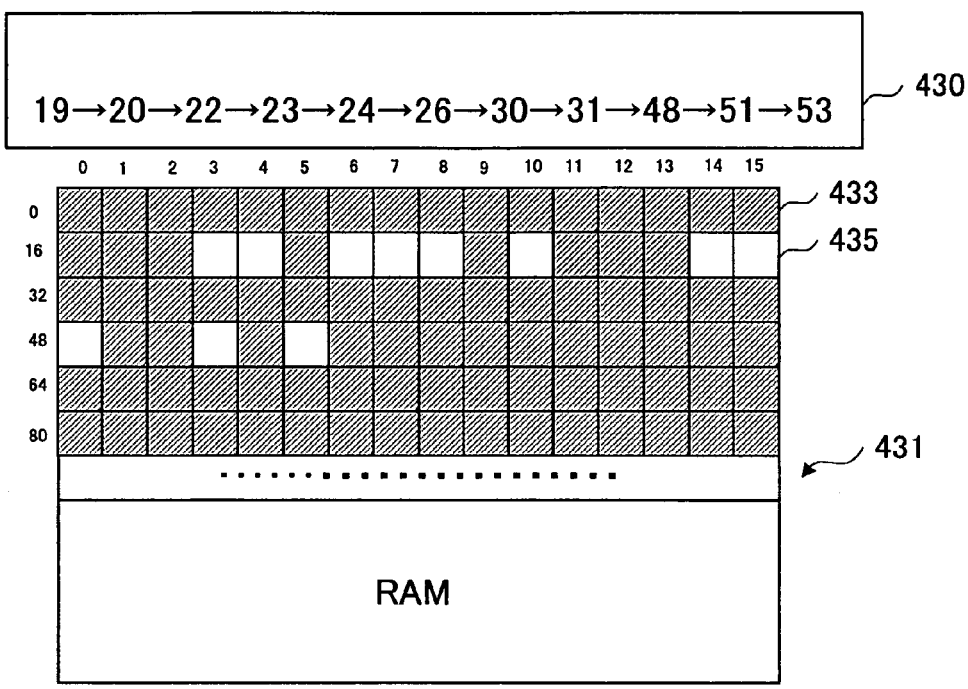
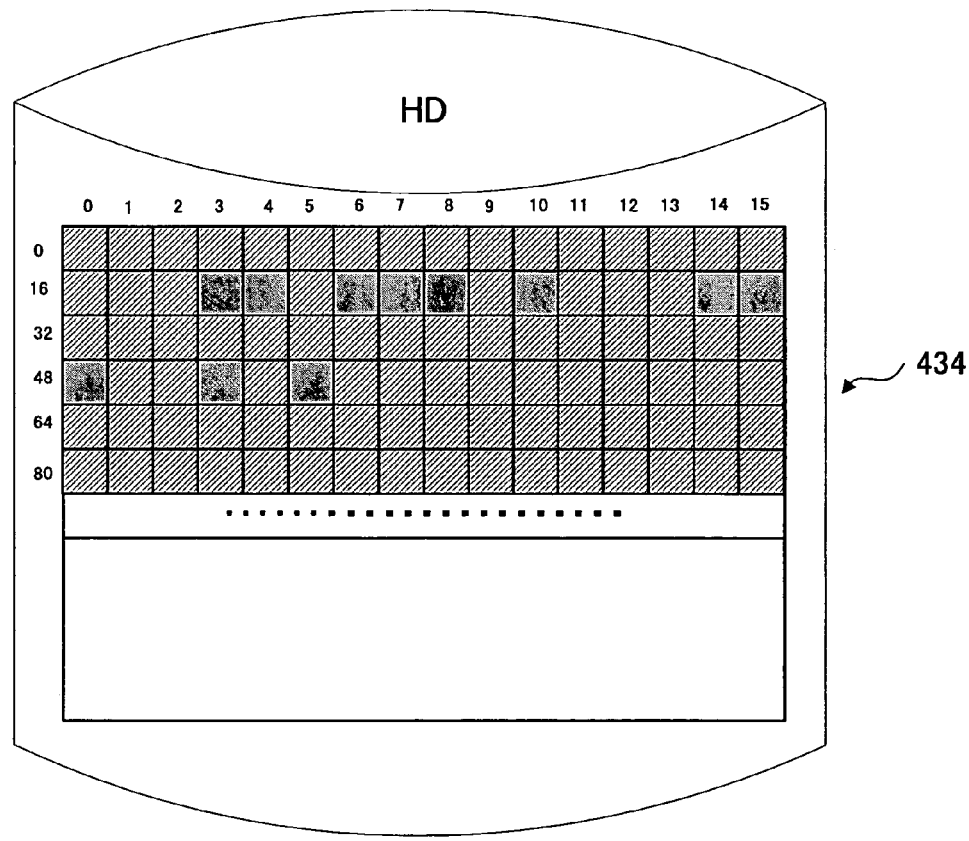

OVERWRITE FS

OVERWRITE FS

OVERWRITE FS

END OF OVERWRITE

OVERWRITE FS

FIG.40

| | IMAGE INPUT | AFTER FS BACKUP | IMAGE ERASE | AFTER FS BACKUP | IN OVERWRITING | END OF OVERWRITING |
|---|---|---|---|---|---|---|
| IMH FS (RAM) | 1 | 1 | 0 | 0 | 1 | 0 |
| IMH FS (HDD) | 0 | 1 | 1 | 0 | 0 | 0 |
| OVERWRITE FS | 1 | 1 | 1 | 1 | 1 | 0 |
| OVERWRITE DETERMINATION | NON | NON | EXE | NON | – | – |
| AFTER OFF / ON | OVERWRITE | – | OVERWRITE | – | OVERWRITE | – |

IMAGE FORMING APPARATUS, ERASING METHOD, AND HARD DISK MANAGEMENT METHOD

BACKGROUND OF THE INVENTION

1. Field of the Invention

The present invention generally relates to image forming apparatuses, erasing methods, and hard disk management methods, and more particularly to an image forming apparatus mounting a hardware disk, an erasing method for erasing information stored in the hard disk thereof, and a hard disk management method.

2. Description of the Related Art

Recently, an image forming apparatus (hereinafter, called multi-functional apparatus) accommodating functions of a facsimile, a printer, a copier, and a scanner into a single chassis has been widely known. In the multi-functional apparatus, a displaying part, a printing part, an imaging part, and a like are arranged within the single chassis, and also four applications corresponding to the facsimile, the printer, the copier, and scanner are included. By switching the four applications, the multi-functional apparatus operates as the facsimile, the printer, the copier, and the scanner.

There is a multi-functional apparatus mounting a hard disk (hereinafter, called HDD) for recording image data. In this case, this multi-functional apparatus conducts an erasing process for erasing data recorded in the HDD.

The erasing process takes a relatively large amount of time since the HDD recently becomes larger in addition to a large size of the image data. Accordingly, the erasing process for data recorded in the HDD influences other processes and then a performance of the multi-functional apparatus becomes degraded.

Moreover, if the multi-functional apparatus mounts the HDD, a security problem concerning information recorded in the HDD is raised. This security problem will be described with reference to FIG. 1 to FIG. 4.

FIG. 1 is a diagram showing magnetic data on the HDD and read data. The magnetic data on the HDD records data "0101010". In the magnetic data on the HDD, flat portions show data "0" and convex portions show data "1". In addition, a height of the convex portion shows a magnetic level.

In order to erase data recorded on the HDD, data "0" is overwritten on the HDD. A state of the HDD in this case is shown in FIG. 2. In FIG. 2, portions shown as "0 ERASE" become flat and show data "0". On the other hand, other portions which are not shown as "0 ERASE" still remain parts of convex portions.

Accordingly, as shown in FIG. 2, by shifting position to read, the data "0101010" can be read.

Moreover, another method for erasing information by data "0" can be applied as shown in FIG. 3. FIG. 3 shows a state of the HDD which cannot be uniformly flat. In this case, if a read level is lowered to determine data "1", the data "0101010" can be read.

As described above, even in a case in that data are regularly erased, data before erased can be read. Thus, data being accumulated and erased in the multi-functional apparatus can be read out.

As an example to avoid such problems described above, a method recommended by the NSA (National Security Agency) in U.S.A. will be described with reference to FIG. 4. In this method, random numbers are overwritten twice to the HDD and data "0" are overwritten once to the HDD.

It is assumed that data recorded on the HDD are "010101010101010". Random numbers "010011000001000" are overwritten on the HDD, and then magnetic data at a first time are formed on the HDD. As shown in the magnetic data at the first time, portions overwriting "1" over "0" cannot be perfect convex portions, and portions overwriting "0" over "1" cannot be perfect flat portions. Next, random numbers "001111000010101" are overwritten on the HDD, and then magnetic data at a second time are formed on the HDD. Compared with the magnetic data at the first time, the magnetic data at the second time are different from the magnetic data at the first time.

Data "0" are further overwritten on the HDD, and then magnetic data at a third time are formed on the HDD. After that, it becomes quite difficult to predict original magnetic data.

As described above, the method for perfectly erasing information to maintain security of the information recorded in the HDD is disclosed. However, a method for practically realizing this method has not been introduced.

Furthermore, in a case that the HDD is mounted in the multi-functional apparatus, there is a disadvantage in that incomplete information remains in the HDD when the multi-functional apparatus is shout down while recording information such as image data to the HDD. In addition, the information being recorded when the multi-functional apparatus is shut down can be damaged.

The above-described phenomenon can occur while a regular operation is conducted. In this case, a consistency of information recorded in the HDD is lost.

SUMMARY OF THE INVENTION

It is a general object of the present invention to provide image forming apparatuses, erasing methods, and hard disk management methods, in which the above-mentioned problems are eliminated.

A more specific object of the present invention is to provide an image forming apparatus and an erasing method in that a performance of the image forming apparatus can be improved.

The above objects of the present invention are achieved by an image forming apparatus including hardware resources to use for an image forming process, at least one program for conducting a process concerning an image formation, and a hard disk for recording information including an image, said image forming apparatus including: a plurality of erase information each showing whether or not to erase data for each of a plurality of divided areas into which the hard disk is divided; group erase information showing groups grouping the erase information; erase count information determined based on the group erase information; an erase determining part determining based on the erase count information whether or not there is a divided area to erase in the plurality of the divided areas corresponding to the group erase information defining the erase count information; and an erasing part erasing the divided area based on the erase information corresponding to the plurality of divided area which are determined by said erase determining part that there is the divided area to erase.

Another specific object of the present invention is to provide an image forming apparatus and an erasing method in that information recorded in a hard disk can be erased so as to be unreadable.

The above objects of the present invention are achieved by an image forming apparatus including hardware resources to use for an image forming process, at least one program for conducting a process concerning an image formation, and a hard disk for recording information including an image, said image forming apparatus including: an erase information generating part generating erase information for erasing the information recorded in the hard disk; and an erase information overwriting part overwriting the erase information on the information at a sector unit or a cluster unit.

A further specific object of the present invention is to provide an image forming apparatus and a hard disk management method, in which a consistency of information recorded in a hard disk is maintained.

The above objects of the present invention are achieved by an image forming apparatus including hardware resources to use for an image forming process, at least one program for conducting a process concerning an image formation, and a hard disk for recording information including an image, said image forming apparatus including a plurality of erase information each showing whether or not each of a plurality of divided areas into, which the hard disk is divided, is being used; backup information which is the usable area information backed up to the hard disk; erase execution information showing whether or not to execute an erasing process for the at least one divided area for each of the at least one divided area; and a hard disk erasing part erasing the information recorded in the hard disk based on the usable area information and the erase execution information.

BRIEF DESCRIPTION OF THE DRAWINGS

In the following, embodiments of the present invention will be described with reference to the accompanying drawings.

FIG. 31 is a diagram showing management information according to the third embodiment of the present invention;

FIG. 32 is a diagram showing the management information according to the third embodiment of the present invention;

FIG. 40 is a diagram showing a process in each state of file systems and each operation process of a multi-functional apparatus according to the third embodiment of the present invention;

DESCRIPTION OF THE PREFERRED EMBODIMENTS

In the following, embodiments of the present invention will be described with reference to the accompanying drawings.

First Embodiment

Figure 1:
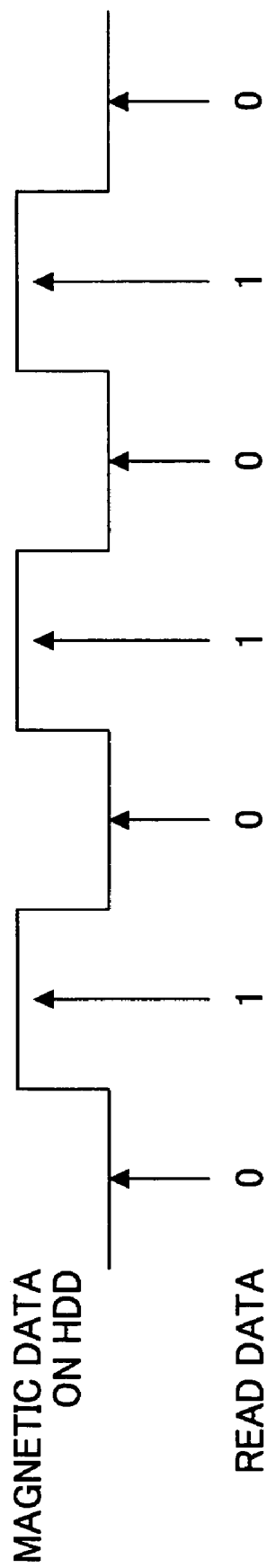
FIG. 1 is a diagram showing magnetic data on an HDD and read data.
Figure 2:
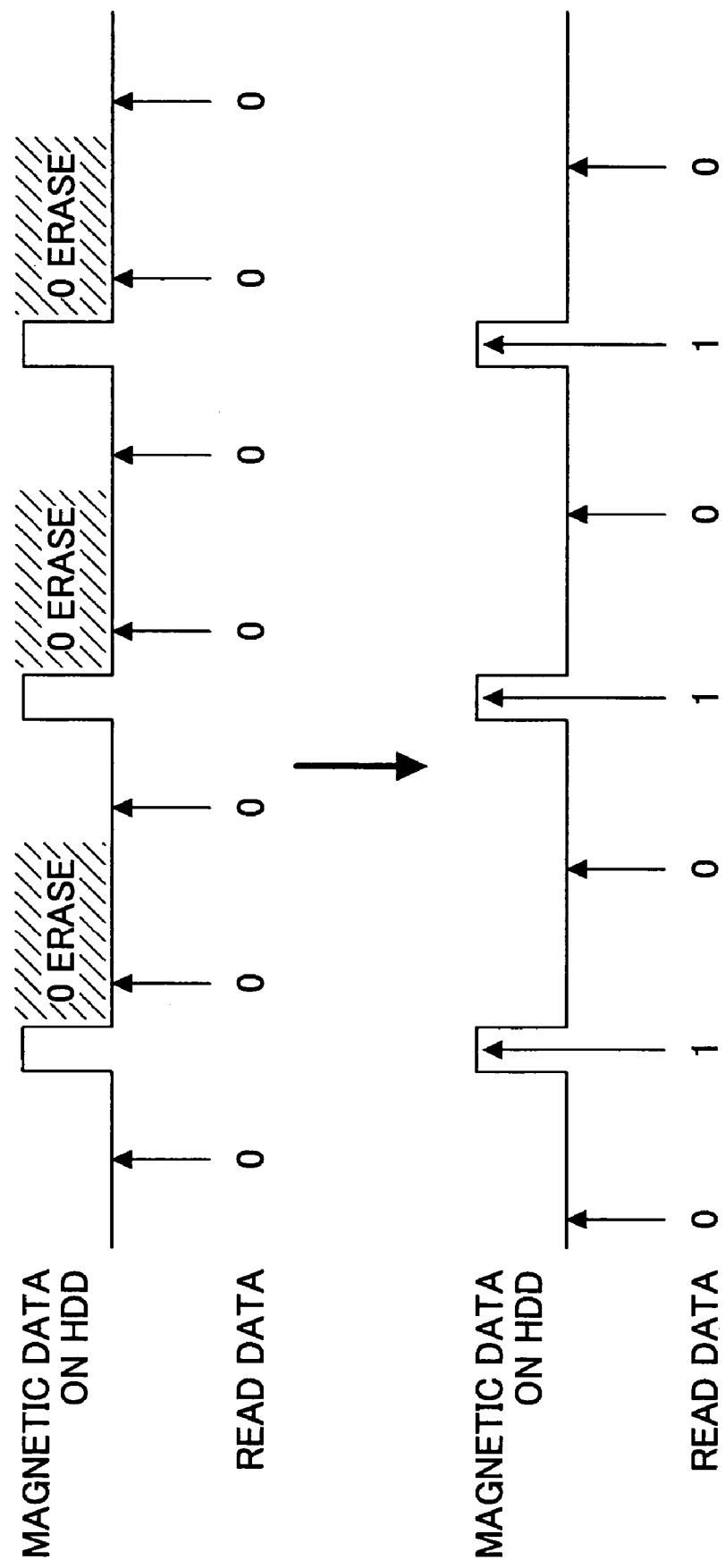
FIG. 2 is a diagram showing the magnetic data on the HDD after overwritten data "0"
Figure 3:
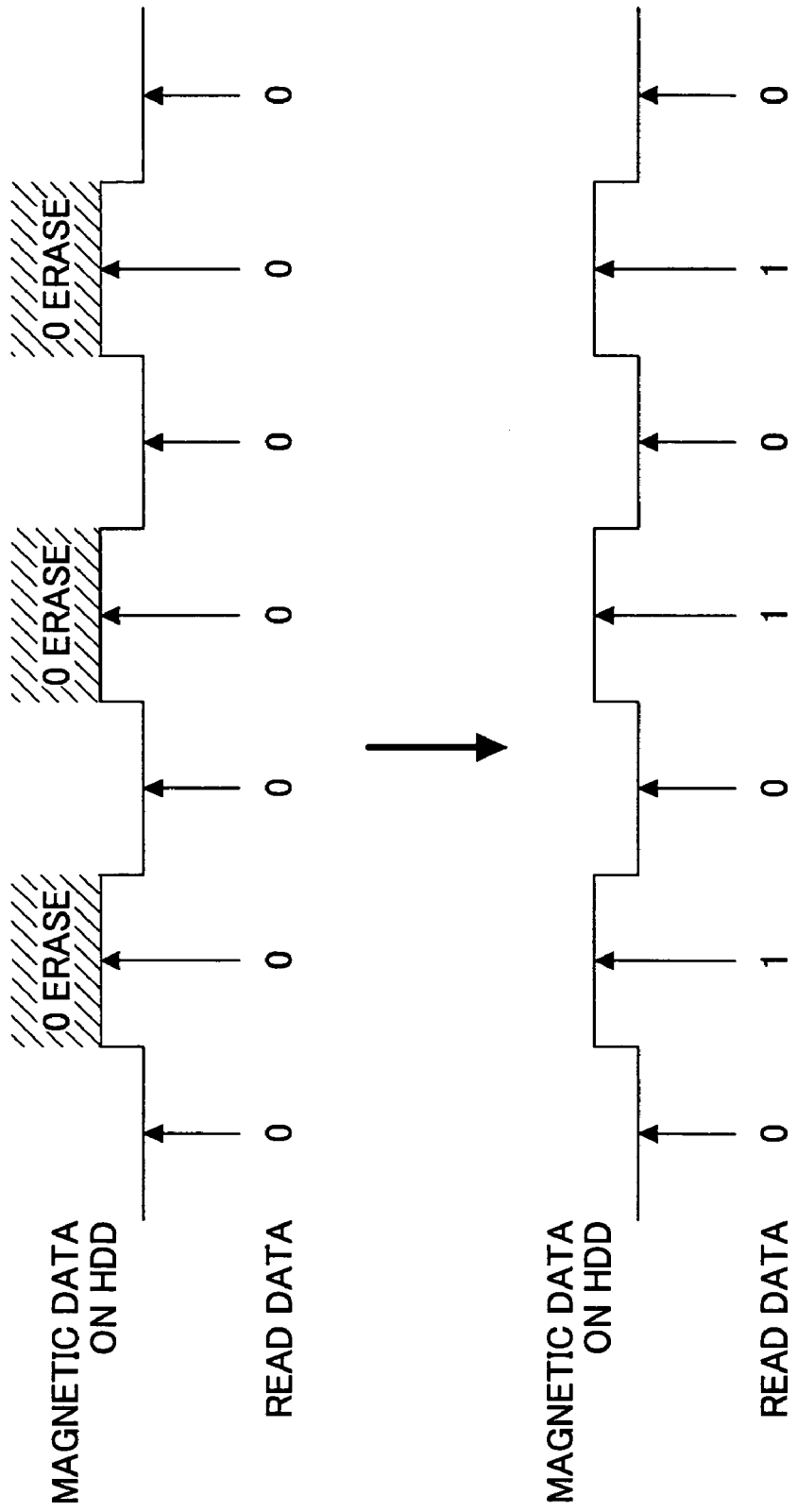
FIG. 3 is a diagram showing a state of the HDD which cannot be flat.
Figure 4:
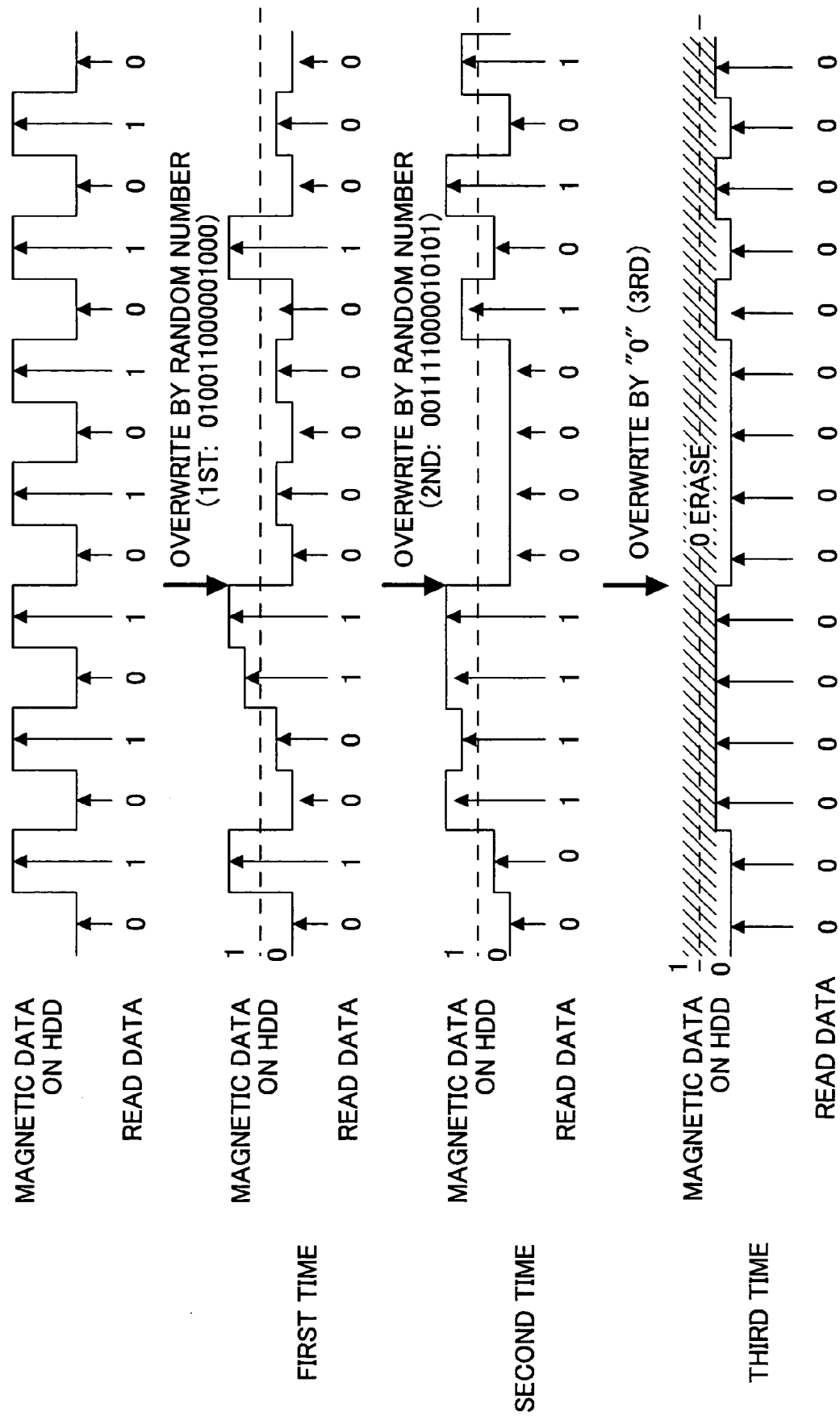
FIG. 4 is a diagram showing a method recommended by the NSA.
Figure 5:
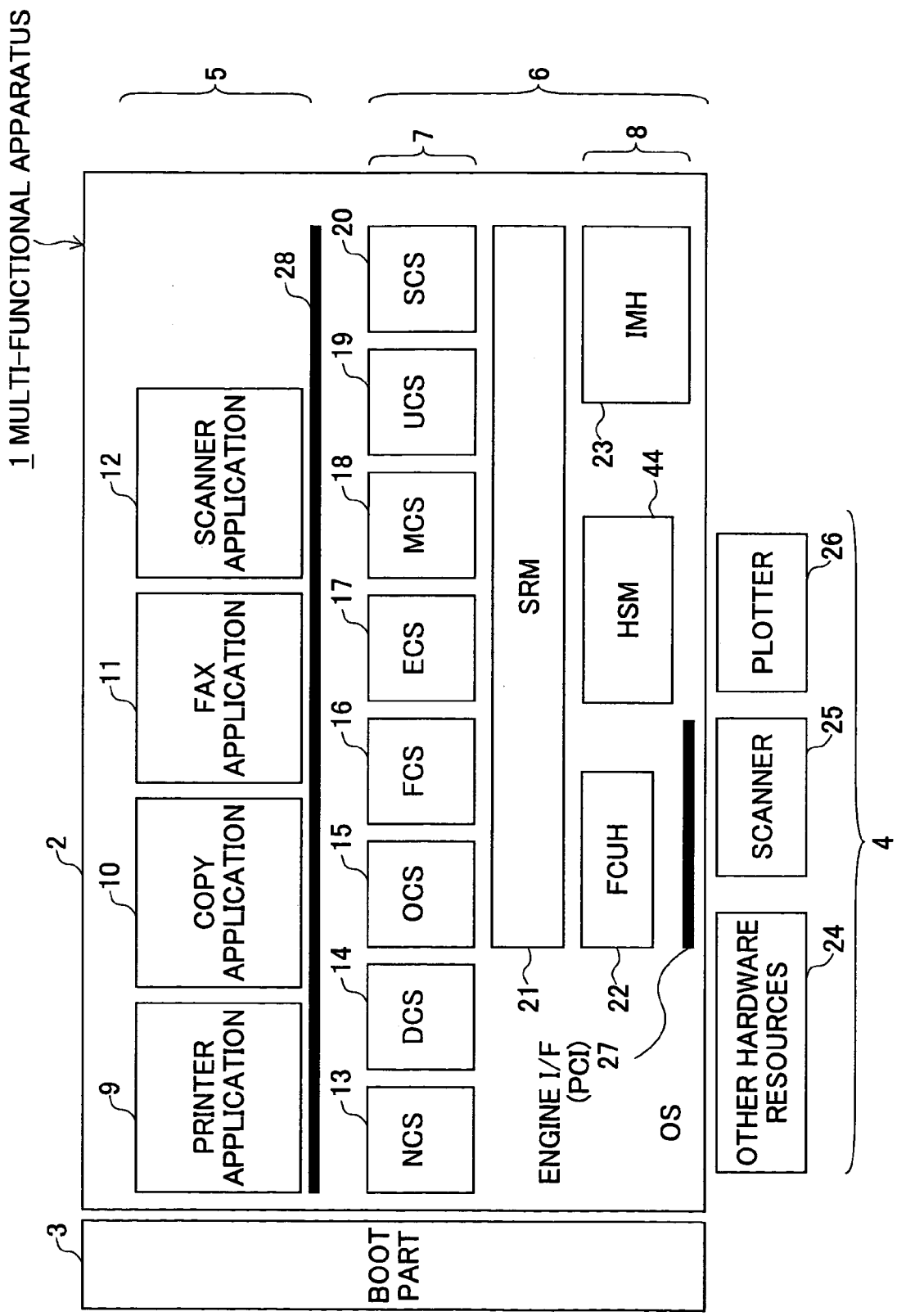
FIG. 5 is a diagram showing a configuration of a multi-functional apparatus according to a first embodiment of the present invention.

FIG. 5 is a diagram showing a configuration of a multi-functional apparatus according to the first embodiment of the present invention. The multi-functional apparatus 1 includes a software group 2, a boot part 3, and hardware resources 4.

The boot part 3 is executed first when the multi-functional apparatus 1 is turned on, and activates an application layer 5 and a platform layer 6. For example, the boot part 3 reads out programs of the application layer 5 and the platform layer 6 from a hard disk device (hereinafter, called HDD) or a like, and transfers each of the programs, which are read out from the HDD, into a memory area and activates the programs. The hardware resources 4 include a scanner 25, a plotter 26, and other hardware resources 24 such as an ADF (Auto Document Feeder).

The software group 2 includes the application layer 5 and the platform layer 6 which are activated on an operating system (hereinafter, called OS) such as UNIX™. The application layer 5 includes programs for conducting special processes as user services according to an image formation such as a printer, a copier, a facsimile, a scanner, and a like.

The application layer 5 includes a printer application 9 for a printing process, a copy application 10 for a copying process, a fax application 11 for a facsimile process, and a scanner application for a scanner process.

The platform layer 6 includes a control service layer 7 for generating an acquisition request of the hardware resources 4 by reading a process request sent from the application layer 5, a system resource manager (hereinafter, SRM) 21 for mediating the acquisition request sent from the control service layer 7 by managing at least one of the hardware resources 4, and a handler layer 8 for managing the hardware resources 4 in response to the acquisition request sent from the SRM 21. The SRM 21 serves as a resource managing part.

The control service layer 7 includes at lease one of service modules such as a network control service (hereinafter, called NCS) 13, a delivery control service (hereinafter, called DCS) 14, an operation panel control service (hereinafter, called OCS) 15, a fax control service (hereinafter, called FCS) 16, an engine control service (hereinafter, called ECS) 17, a memory control service (hereinafter, called MCS) 18, a user information control service (hereinafter, called USC) 19, a system control service (hereinafter, called SCS) 20, and a like.

The platform layer 6 includes an API (Application Program Interface) 28 which enables receiving the process request sent from the application layer 5 by a function being defined beforehand. The OS executes relative software for the application layer 5 and the platform layer 6 in parallel.

A process of the NCS 13, which serves as a communication part, provides a service utilized in common with respect to an application requiring a network I/O. The process distributes data received by each protocol from a network side to each application and mediates data when data is sent from each application to the network side.

For example, the NCS 13 controls a data communication with a network device connected via a network in accordance with an HTTP (HyperText Transfer Protocol) by an httpd (HyperText Transfer Protocol Daemon).

A process of the DCS 14 controls a distribution of an accumulated document. A process of the OCS 15 controls an operation panel which serves as an information transmitting part between an operator and the multi-functional apparatus 1. A process of the FCS 16 provides an API for sending or receiving data by fax utilizing a PSTN (Public Switched Telephone Networks) and ISDN (Integrated Services Digital Network) from or to the application layer 5, for registering/ extracting various fax data managed in a memory for a backup, for reading fax data, for printing out data received by fax, and a like.

A process of the ECS 17 controls an engine part such as the scanner 25, the plotter 26, the other hardware resources 24. A process of the MCS 18 conducts a memory control to obtain and release a memory, and to utilize the HDD. A process of the UCS 19 manages user information.

A process of the SCS 20 conducts processes such as an application management, an operating part control, a system screen display, a LED (Light Emitting Diode) display, a hardware resource management, an interruption application control, and a like.

A process of the SRM 21 conducts a system control and a management of the hardware resources 4 with the SCS 20. For example, the process of the SRM 21 mediates the acquisition request sent from an upper layer utilizing the scanner 25, the plotter 26, and the other hardware resources 24 and conducts an execution control for the acquisition request.

In detail, the process of the SRM 21 determines whether or not the hardware resources 4 are available for the acquisition request (that is, whether or not the hardware resources 4 are utilized for another acquisition request) If available, the process of the SRM 21 informs the upper layer that the hardware resources 4 for the acquisition request can be utilized. In addition, the process of the SRM 21 makes a schedule to utilize the hardware resources 4 for the acquisition request sent from the upper layer, and directly conducts a request content (for example, a paper feed and an imaging operation by a printer engine, a memory allocation, a file generation, and a like).

Moreover, the handler layer 8 includes a fax control unit handler (hereinafter, called FCUH) 22 for managing a fax control unit (hereinafter, called FCU) that will be described later, an image memory handler (hereinafter called IMH) 23 for assigning a memory area for each process and managing the memory area being assigned to each process and for managing the HDD, and a hard disk security module (hereinafter, called HSM) 44. The SRM 21 and the FCUH 22 conduct the process request to the hardware resources 4 by utilizing an engine I/F 27 which enables the process request to the hardware resources 4 by the function being defined beforehand. The IMH 23 serves as a validity determining part.

The HSM 44 can access the HDD without passing through the IMH 23. The HSM 44 communicates to the IMH 23 so as to obtain a sector which can be erased and erase data in the sector. Also, the HSM 23 serves as a hard disk erasing part.

The multi-functional apparatus 1 can centralize and conduct necessary processes in common among applications in the platform layer 6. Next, a hardware configuration for the multi-functional apparatus 1 will be described.

Figure 6:
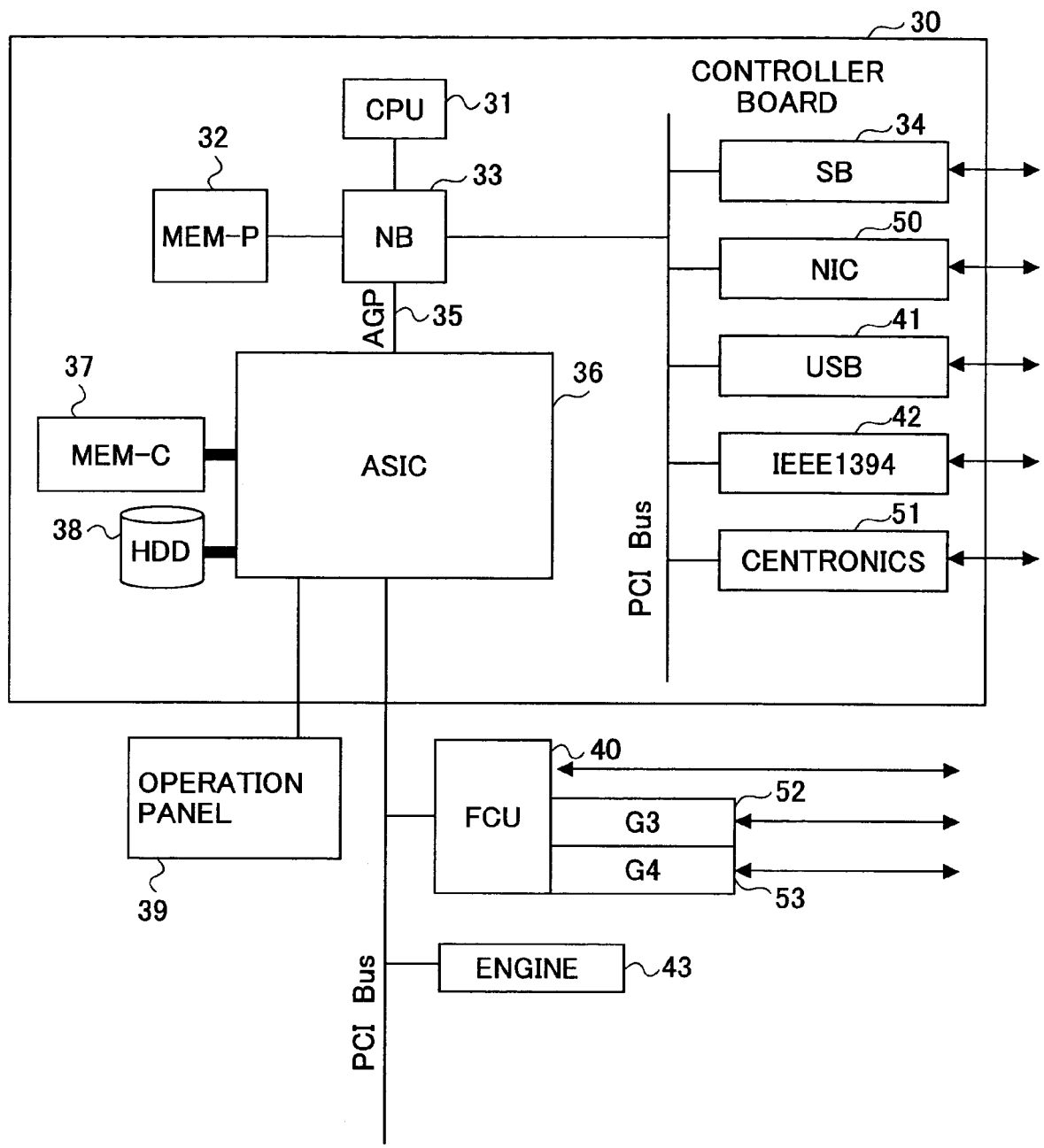
FIG. 6 is a diagram showing a hardware configuration of the multi-functional apparatus according to the first embodiment of the present invention.

FIG. 6 is a diagram showing the hardware configuration of the multi-functional apparatus according to the first embodiment of the present invention. The multi-functional apparatus 1 includes a controller board 30, an operation panel 39, a FCU (Fax Control Unit) 40, and engine 43. In addition, the FCU 43 includes a G3 standard conformity unit 52 and a G4 standard conformity unit 53.

Moreover, the controller board 30 includes a CPU (Computer Processing Unit) 31, an ASIC (Application Specific Integrated Circuit) 36, the HDD 38, a system memory (MEM-P) 32, a local memory (MEM-C) 37, a north bridge (hereinafter, called NB) 33, a south bridge (hereinafter, called SB) 34, a NIC (Network Interface Card) 50, a USB (Universal Serial Bus) device 41, an IEEE 1394 device 42, and a centronics device 51.

The operation panel 39 is connected to the ASIC 36 of the controller board 30. The SB 34, the NIC 50, the USB device 41, the IEEE 1394 device 42, and the centronics device 51 are connected with each other via a PCI (Peripheral Component Interconnect) bus.

The FCU 40 and the engine 43 are connected to the ASIC 36 of the controller board 30 via the PCI bus.

The controller board 30 is connected to the local memory 37, the HDD 38, and the like, and also is connected to the CPU 31 and the ASIC 36 via the NB 33 of a CPU chipset. As described above, by connecting the CPU 31 to the ASIC 36 via the NB 33, it is possible to correspond to a case in that an interface of the CPU 31 is not published.

Moreover, instead of connecting the ASIC 36 and the NB 33 via the PCI bus, the ASIC 36 and the NB 33 are connected via an AGP (Accelerated Graphics Port) 35. As described above, in order to execute and control more than one process forming the application layer 5 and the platform layer 6 in FIG. 6, the ASIC 36 and the NB 33 are connected to each other via the AGP 35, instead of the PCI bus being slow speed, so as to prevent a performance from being degraded.

The CPU 31 controls the entire multi-functional apparatus 1. The CPU 31 activates and executes the NCS 13, the DCS 14, the OCS 15, the FCS 16, the ECS 17, the MCS 18, the UCS 19, the SCS 20, the SRM 21, the FCUH 22, the IMH 23, and HSM 44 as processes on the OS, respectively. Also, the CPU 31 activates and executes the printer application 9, the copy application 10, the fax application 11, and the scanner application 12.

The NB 33 is a bridge for connecting the system memory 32, the SB 34, and the ASIC 36 to each other. The system memory 32 is a memory used as a drawing memory of the multi-functional apparatus 1. The SB 34 is a bridge for connecting the NB 33, the PCI bus, and the peripheral device to each other. The local memory 37 is a memory used as an image buffer for a copy, and a code buffer.

The ASIC 36 is an IC (Integrated Circuit) for an image process with a hardware element for the image process. The HDD 38 is a storage unit used to accumulate an image, a program, font data, and a form. The operation panel 39 is an operating part to accept information and instruction by an input operation of the operator and to display a screen for the operator.

In the following, a process for improving a performance of erasing information in the HDD 38 will be described. Hereinafter, erasing information recorded in the HDD 38 may be expressed as erasing or overwriting information recorded in the HDD 38.

Figure 7:
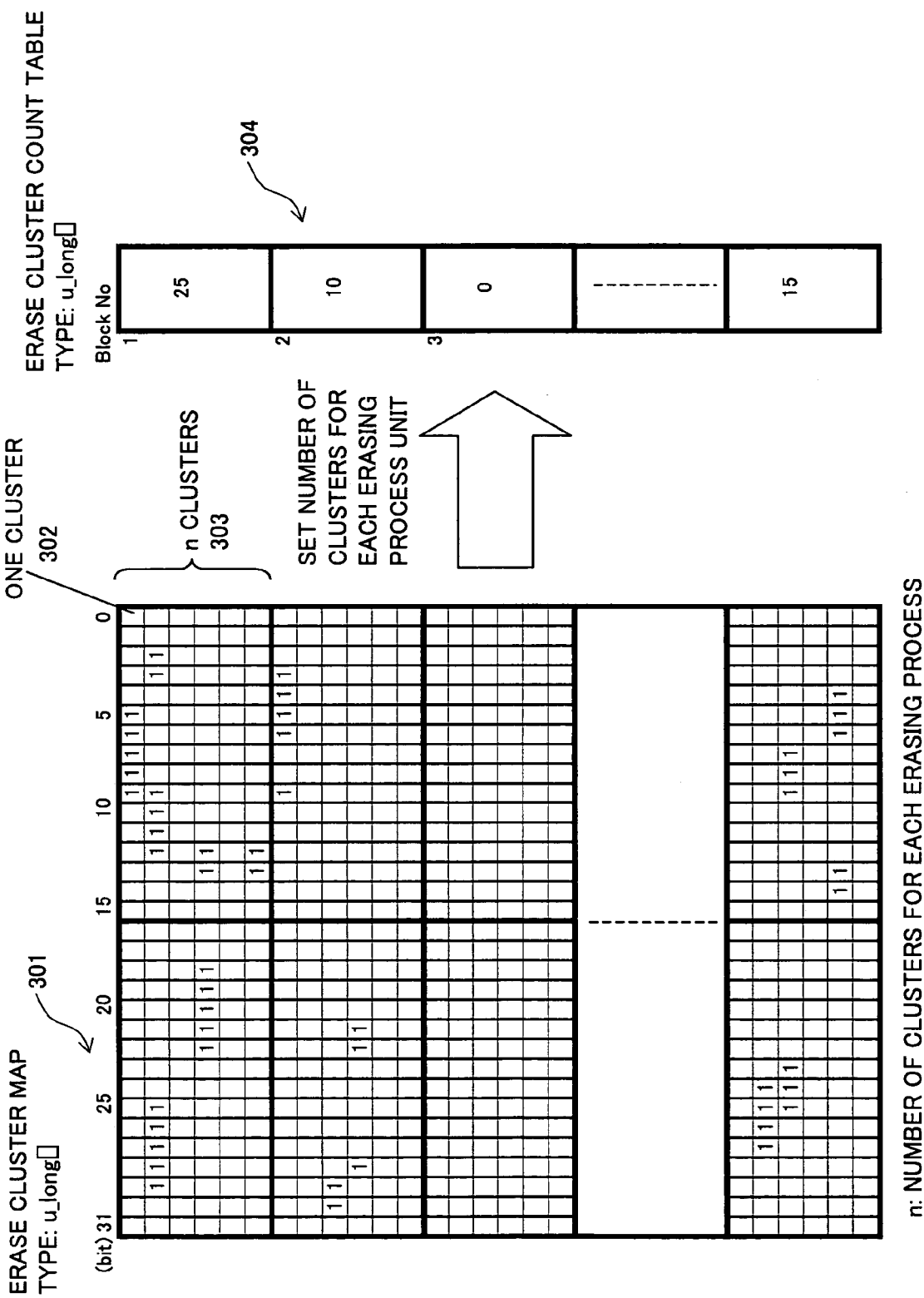
FIG. 7 is a diagram showing an erase cluster map and an erase cluster count table according to the first embodiment of the present invention.

An erase cluster map 301 and an erase cluster count table 304 will be described with reference to FIG. 7. The erase cluster count map 301 indicates a cluster in the HDD to erase, and maintains each of all clusters of the HDD by one bit as shown one cluster 302 in FIG. 7. If a bit corresponding to a cluster shows "0" (zero), the cluster is not an erase subject, and if the bit shows "1", the cluster is the erase subject.

If the erase subject is searched for by determining each bit, a workload of the CPU 31 is increased the erase cluster count table 304, in which a certain amount of clusters in the erase cluster map 301 is grouped (n clusters 303), is prepared. The erase cluster count table 304 stores a count value showing the number of erase subject clusters in the n clusters being grouped.

For example, the count value of a Block No. 1 in the erase cluster count table 304 shows "25" as the number of erase subject clusters. In the n clusters 303 corresponding to the Block No. 1, there are 25 bits showing "1".

The erase cluster count table 304 is formed by arrays, which are numbered such as the Block No. In the following, information showing each of the count values is simply expressed as a table.

By maintaining the erase subject by the erase cluster count table 304, a determination whether or not there is the erase subject in the n clusters can be easily conducted by referring to the erase cluster count table 304.

In this case, a search procedure is described as follows:
1. a table in which the count value does not show "0" (zero) is searched for from the erase cluster count table 304.
2. when the table in which the count value does not show "0" (zero), a bit determining process is conducted only for a subject area being grouped in the erase cluster map 301. Accordingly, it is possible to improve the performance since the bit determining process is conducted only for a part of the erase cluster map 301 so that the workload of the CPU 31 can be reduced and a search process can be effectively conducted.

Figure 8:
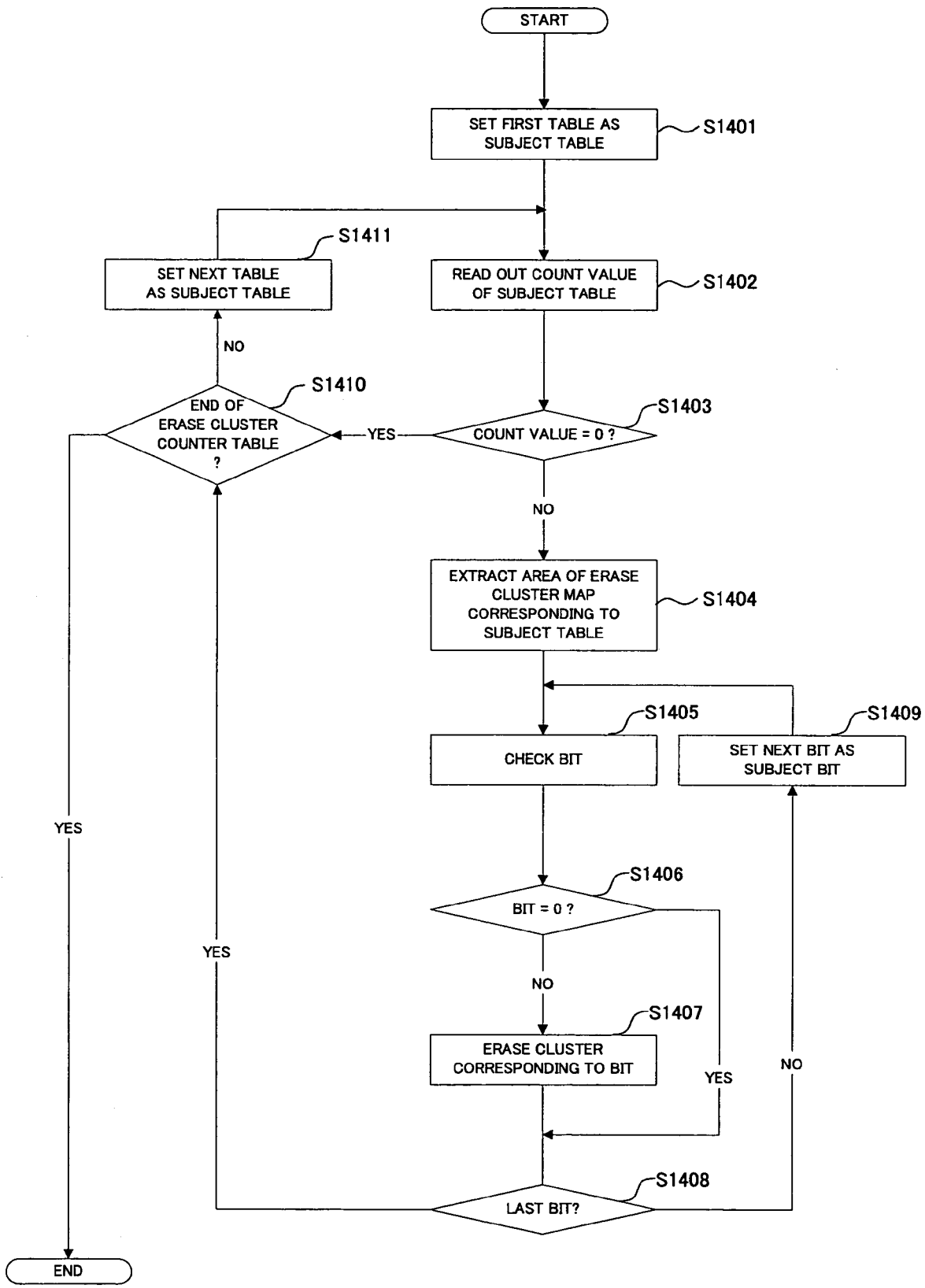
FIG. 8 is a flowchart for detecting an erase subject cluster according to the first embodiment of the present invention.

The bit determining process will be described with reference to a flowchart shown in FIG. 8 in detail. In step S1401, the HSM 44 sets a first table of the erase cluster count table 304 as a determination subject. Next, the HSM 44 reads out the count value of the table being set as the determination subject in step S1402.

In step S1403, the HSM 44 determines whether or not the count value is "0" (zero). When the count value "0" (zero), there is no cluster to set as the erase subject. Accordingly, when it is determined the table is a last table of the erase cluster count table 304 in step S1410, the bit determining process is terminated. If the table is not the last table of the erase cluster count table 304, the HSM 44 sets a next table as the determination subject.

When it is determined that the count value is not "0" (zero) in step S1403, the HSM 44 extracts an area on the erase cluster map 301 which corresponds to the table being set as the determination subject in step S1404. In step S1405, the HSM 44 conducts the bit determining process for the area being extracted. In step S1406, when the HSM 44 determines that the bit is "0" (zero), the HSM 44 advances to step S1408. In step S1406, when the HSM 44 determines that the bit is not "0" (zero), the HSM 44 erases a cluster corresponding the bit in step S1407.

Accordingly, in step S1408, the HSM 44 determines whether or not the bit being determined is a last bit in the area being extracted. When the bit is not the last bit, the HSM 44 sets a next bit as a determination subject bit.

Next, a process for improving the performance will be described. In this process, a time sharing for a multi-task or a multi-thread is utilized. In the multi-functional apparatus 1 according to the first embodiment of the present invention, the CPU 31 continuously operates each of threads within a short time unit. In this case, when one thread is operated by the CPU 31, other threads are not operated. It is possible to set a time and a priority order to assign for each of the threads.

Since the HSM 44 is one of the threads, when the HSM 44 operates, other threads cannot operate. Accordingly, the HSM 44 makes a schedule so as to switch to one of other threads utilizing the HDD 38 for a regular purpose other than an erase purpose by setting an erase start interval. Thus, the performance to access the HDD 38 other than the erase purpose can be maintained without being degraded.

Figure 9:
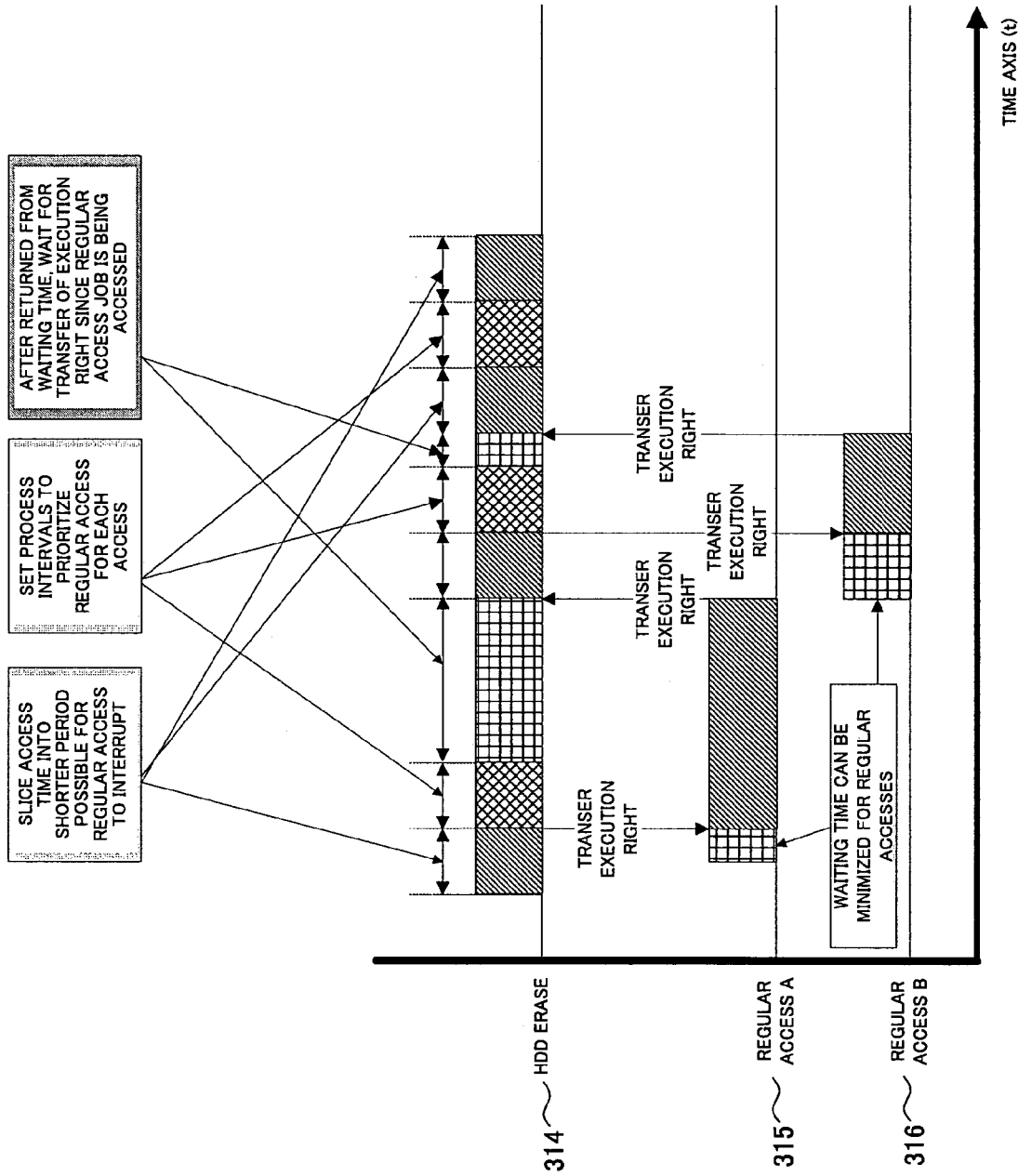
FIG. 9 is a diagram showing a HDD erase start interval according to the first embodiment of the present invention.

This process for improving the performance will be described with reference to FIG. 9. In FIG. 9, a graph having a time axis as an abscissa axis is shown. An HDD erase 314 conducted by the HSM 44, process statuses of a regular access A 315 conducted by the IMH 23, and a regular access B 316 are shown by bar on this graph.

This graph shows a status by an oblique line pattern, a lattice pattern, and an oblique lattice pattern. The oblique line pattern shows an access status in which the HDD 38 is being accessed. The lattice pattern shows an access waiting status. The oblique lattice pattern appears for the HDD erase 314 and shows a no-access status since the regular access A 315 and the regular access B 316 are prioritized.

In FIG. 9, first, a process for the HDD erase 314 is conducted. Next, the regular access A 315 becomes in an execution waiting state. Then, an execution right is transferred from the process for the HDD erase 314 to a process for the regular access A 315. After that, the process for the regular access A 315 is executed, and the process for the HDD erase 314 is in the no-access status since the execution right is transferred to the process for the regular access A 315. Next, the process for the HDD erase 314 becomes in the execution waiting status.

When the execution right is transferred from the process for the regular access A 315 to the process for the HDD erase 314, the process for the regular access B 316 becomes the execution waiting process simultaneously. Accordingly, the process for the HDD erase 314 is executed for a while similar to a previous status, and then the execution right is transferred to the process for the regular access B 316. At this time, the process for the HDD erase 314 is in the no-access status.

After that, the process for the HDD erase 314 is in the execution waiting status. When the execution right is transferred from the process for the regular access A 315 to the process for the HDD erase 314, the process for the HDD erase 314 is conducted. After that, the execution right is transferred to one of other threads which are not shown in FIG. 9, and then the process for the HDD erase 314 becomes in the no-access status. After that, the execution right is transferred to the process for the HDD erase 314, again.

Figure 10:
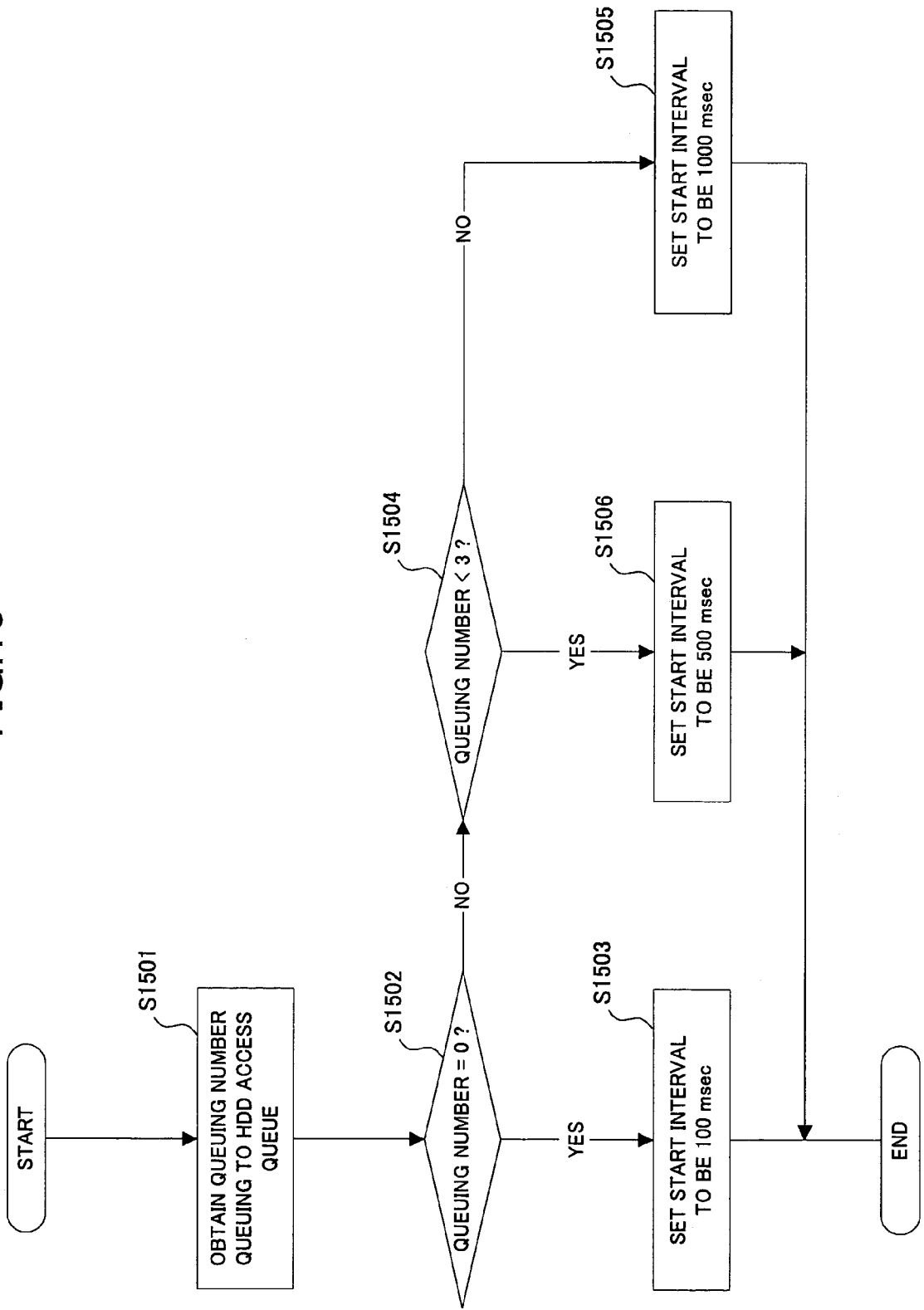
FIG. 10 is a flowchart for explaining a determining process for determining the HDD erase start interval according to the first embodiment of the present invention.

Various methods can be considered to make a schedule for the execution right as described above. One example of a scheduling method will be described with reference to FIG. 10. In the example in FIG. 10, the HDD access is queued to an HDD access queue and the HDD access is centralized and managed so as to make a schedule based on the number of queues. In step S1501, the number of queues is obtained. In step S1502, it is determined whether or not the number of queues is "0" (zero). When the number of queues is "0" (zero), a start interval is set to be 100 msec in step S1503, and then this process is terminated.

When it is determined that the number of queues is not "0" (zero) in step S1502, it is further determined whether or not the number of queues is less than three in step S1504. When the number of queues is less than three, the start interval is set to be 500 msec in step S1506, and this process is terminated.

When it is determined that the number of queues is not less than three in step S1504, the start interval is set to be 1000 msec in step S1505 and then this process is terminated.

Next, a process, in which the start interval is postponed when the HDD erase is blocked by other processes, will be described with reference to FIG. 11. Various statuses in FIG. 11 are shown as the same as those shown in FIG. 9, and explanations thereof will be omitted.

Figure 11:
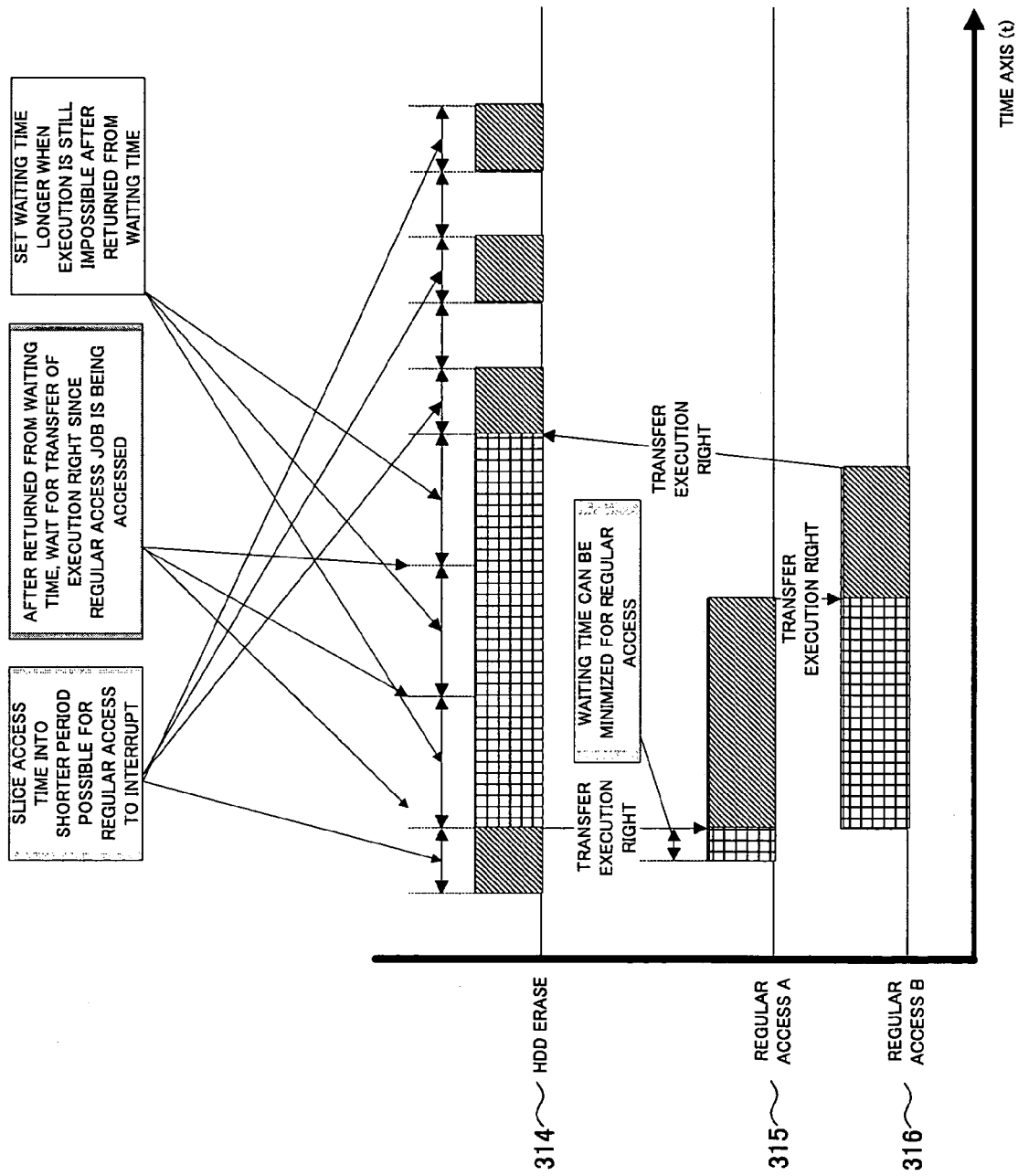
FIG. 11 is a diagram showing the HDD erase start interval according to the first embodiment of the present invention.

In FIG. 11, the process for the HDD erase 314 is executed. Next, the regular access A 315 becomes in the execution waiting status. Thus, the execution right is transferred from the process for the HDD erase 314 to the regular access A 315. After that, the process of the regular access A 315 is executed and then the process for the HDD erase 314 becomes in the waiting status. After that, a time is assigned to the process for the HDD erase 314 to execute. However, since the process for the regular access A 315 is being executed, the process for the HDD erase 314 is not be executed.

Also, the process for the regular access B 316 becomes in the waiting status simultaneously when the execution right is transferred from the process for the HDD erase 314 to the process for the regular access A 315. Therefore, when the process of the regular access A 315 is terminated, the execution right is transferred to the process for the regular access B 316. Then, when the process for the regular access B 316 is terminated, the execution right is transferred to the execution right to the process for the HDD erase 314.

Figure 12:
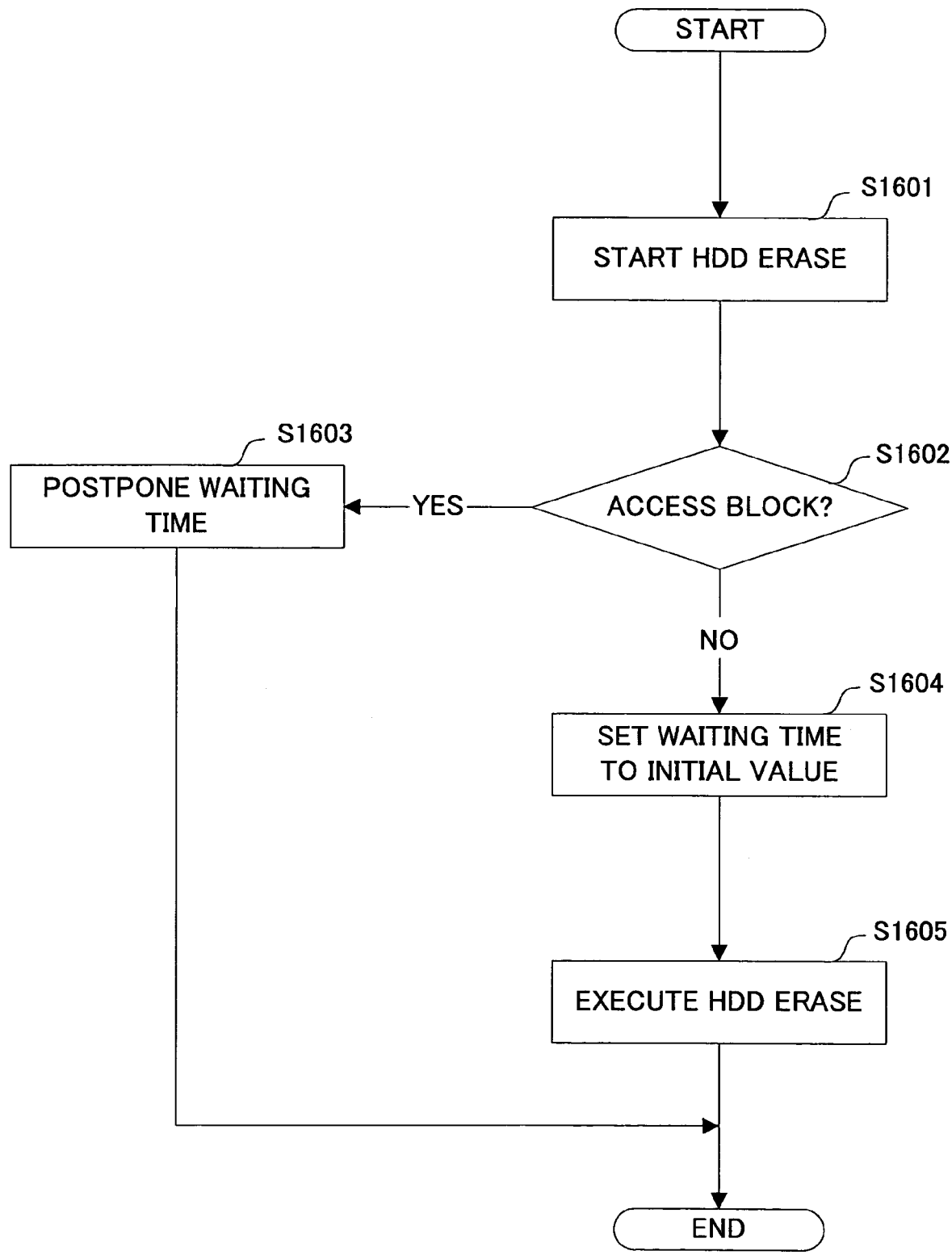
FIG. 12 is a flowchart for explaining a process for determining a delay of an erase waiting interval according to the first embodiment of the present invention.

A process realizing a flow shown in FIG. 11 will be described with reference to a flowchart shown in FIG. 12. In step S1601, the process for the HDD erase 134 starts. In step S1602, it is determined whether or not the process is blocked. When the process is blocked, the waiting time is postponed in step S1603, and then this process is terminated. When it is determined that the process is not blocked in step S1602, the waiting time is set as an initial value in step S1604, and then the process for the HDD erase 314 is executed in step S1605.

Figure 13:
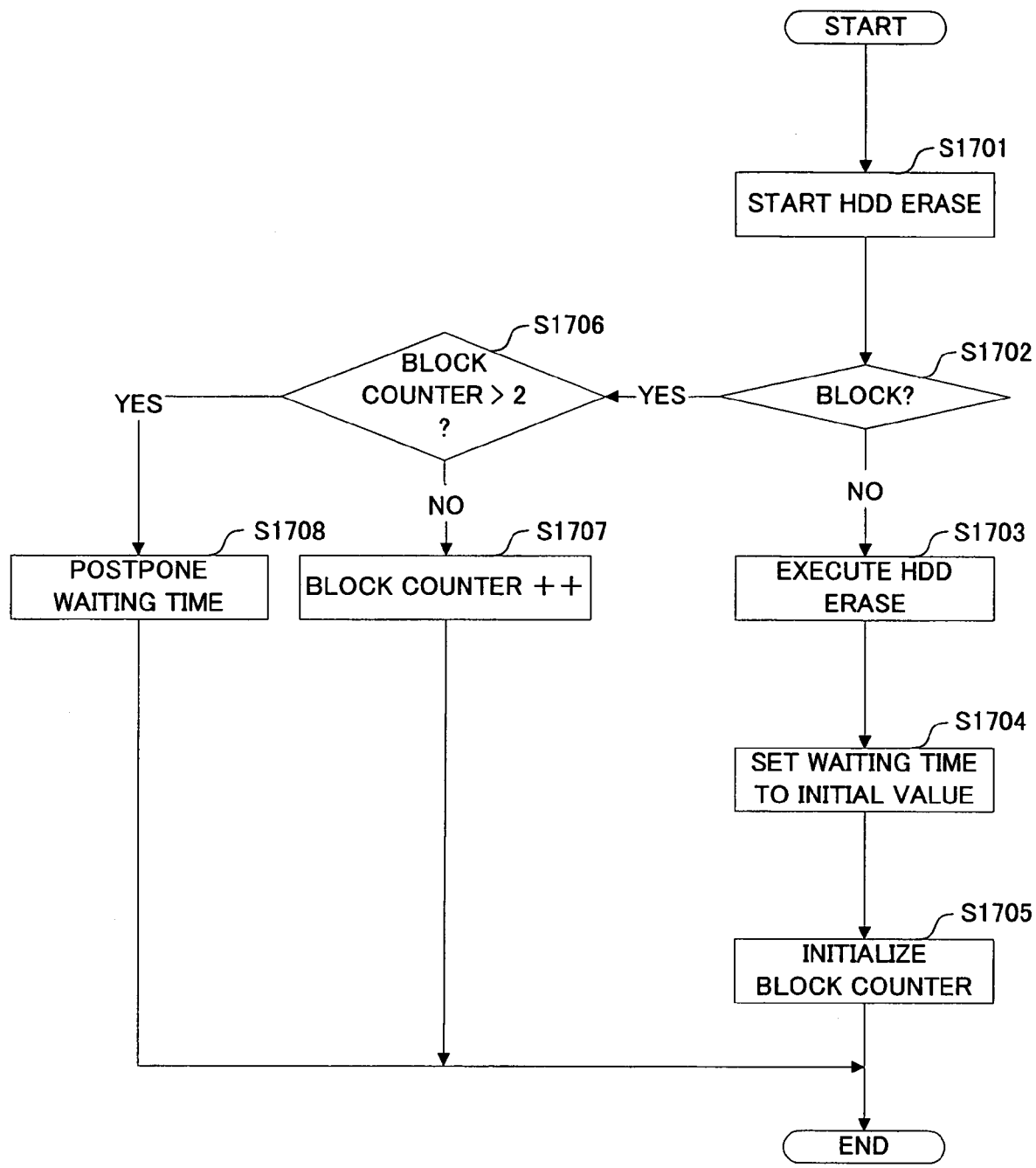
FIG. 13 is a flowchart for explaining a change of a waiting time based on the number of blocks according to the first embodiment of the present invention.

Alternatively, a number of blocks is maintained in a block counter, and then the start interval may be postponed when the number of blocks exceeds more than an upper limit. This alternative process will be described with reference to a flowchart shown in FIG. 13.

In step S1701, the process for the HDD erase 314 starts. In step S1702, it is determined whether or not the process is blocked. When the process is blocked, it is further determined whether or not the block counter is greater than two in step S1703. When the block counter is greater than two, the waiting time is postponed in step S1708 and then the process is terminated. When it is determined that the block counter is less than two in step S1703, the block counter is incremented in step S1707 and then the process is terminated.

When it is determined that the process is not blocked in step S1702, the process for the HDD erase 314 is executed. Then, the waiting time is set to be the initial value in step S1704. Also, in step S1705, the block counter is initialized.

Figure 14:
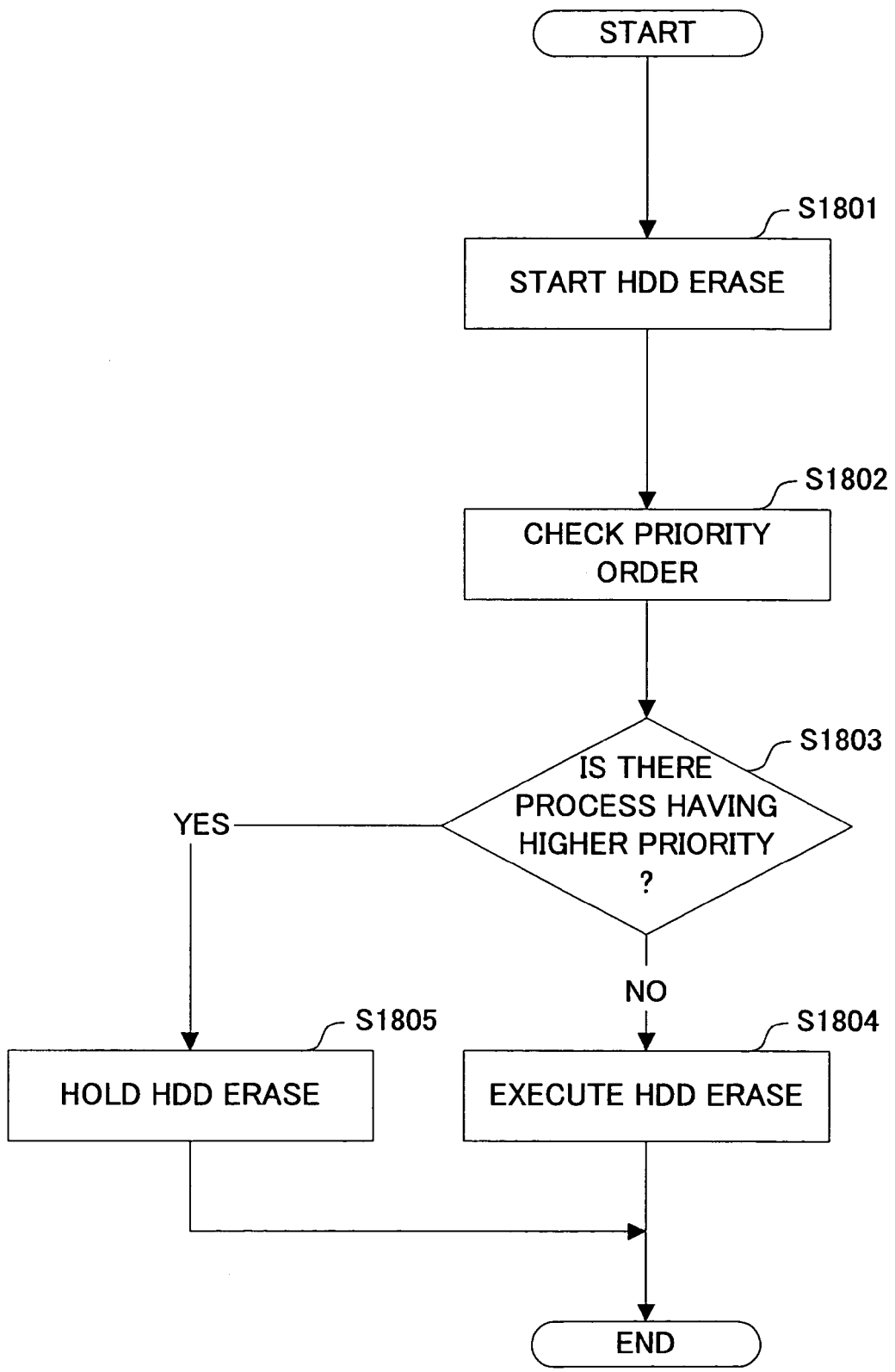
FIG. 14 is a flowchart for explaining a process for determining a priority order according to the first embodiment of the present invention.

In addition to the above explanations, a process for breaking the process for the HDD erase 314 being executed by arranging an interruption will be described with reference to FIG. 14. In step S1801, the process for the HDD erase 314 starts. In step S1802, the priority order is checked. In step S1803, it is determined whether or not there is a process having a higher priority order. When there is the process having the higher priority order, the process for the HDD erase 314 is suspended in step S1805. When there is no process having the higher priority order, the process for the HDD erase 314 is continuously executed in step S1804.

By arranging the interruption, it is not necessary to conduct a complex process for quantifying an erase.

Next, a process for determining an erase amount based on a data transmission ability (MB/sec) of the HDD 38 will be described. In this process, the erase amount can be fluctuated since a performance during an erase time is fluctuated in response to the data transmission ability of the HDD 38.

A value showing the erase amount may be programmed as a fixed value based on a value as a result from measuring the data transmission ability of the HDD 38 beforehand. Alternatively, a program for measuring the data transmission ability can be implemented in the multi-functional apparatus 1 so as to fluctuate the erase amount for each HDD 38. As another manner, the operator may be allowed to set the value of the erase amount.

Figure 15:
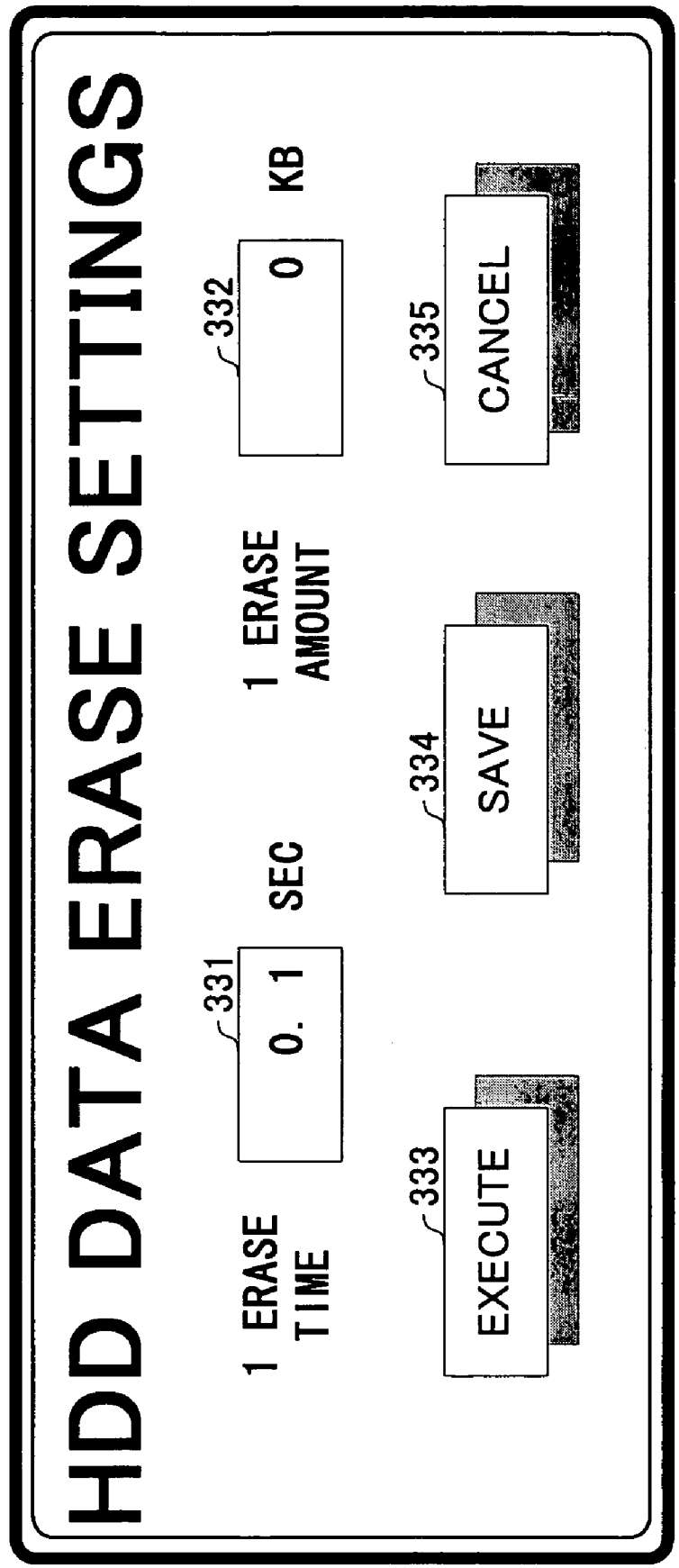
FIG. 15 is a diagram illustrating an HDD data erase setting screen according to the first embodiment of the present invention.

FIG. 15 is a diagram illustrating an HDD data erase setting screen displayed at the operation panel of the multi-functional apparatus when the operator sets HDD data erase settings, according to the first embodiment of the present invention. In FIG. 15, the HDD data erase setting screen 330 includes a setting area 331 for "1 ERASE TIME", a displaying area 332 for "1 ERASE AMOUNT", a button 333 for executing a predetermined calculation, a button 334 for saving the settings, and a button 334 for canceling the settings.

The setting area 331 for "1 ERASE TIME" is used to set a time which is allowed to spend for one erase. The displaying area 332 for "1 ERASE AMOUNT" displays an information capacity which can be erased at one time. The button 333 for executing the predetermined calculation is pressed to calculate the erase amount at one time during the one erase time being set in the setting area 331. The button 334 is pressed to save contents of the settings. The button 335 is pressed to cancel the settings and close the HDD data erase setting screen 330.

Figure 16:
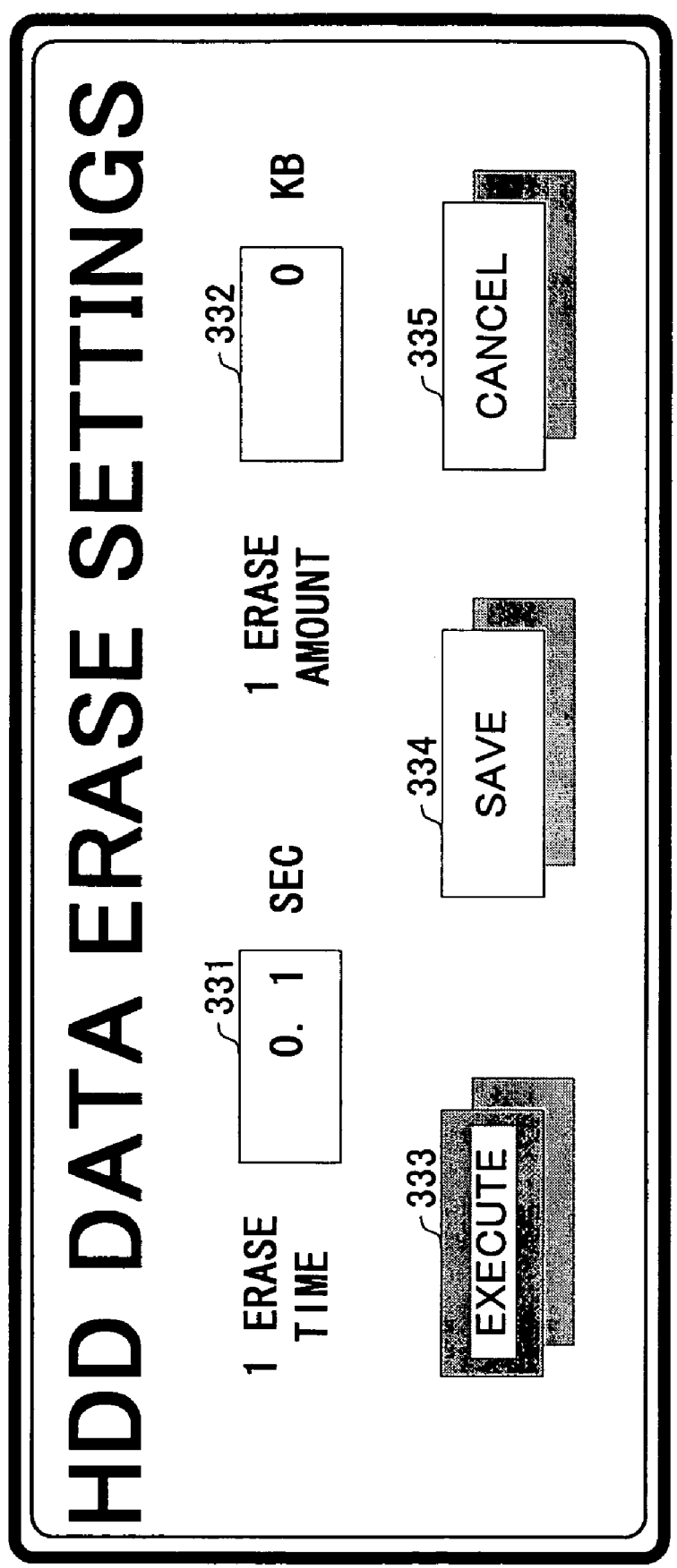
FIG. 16 is a diagram illustrating the HDD data erase setting screen according to the first embodiment of the present invention.
Figure 17:
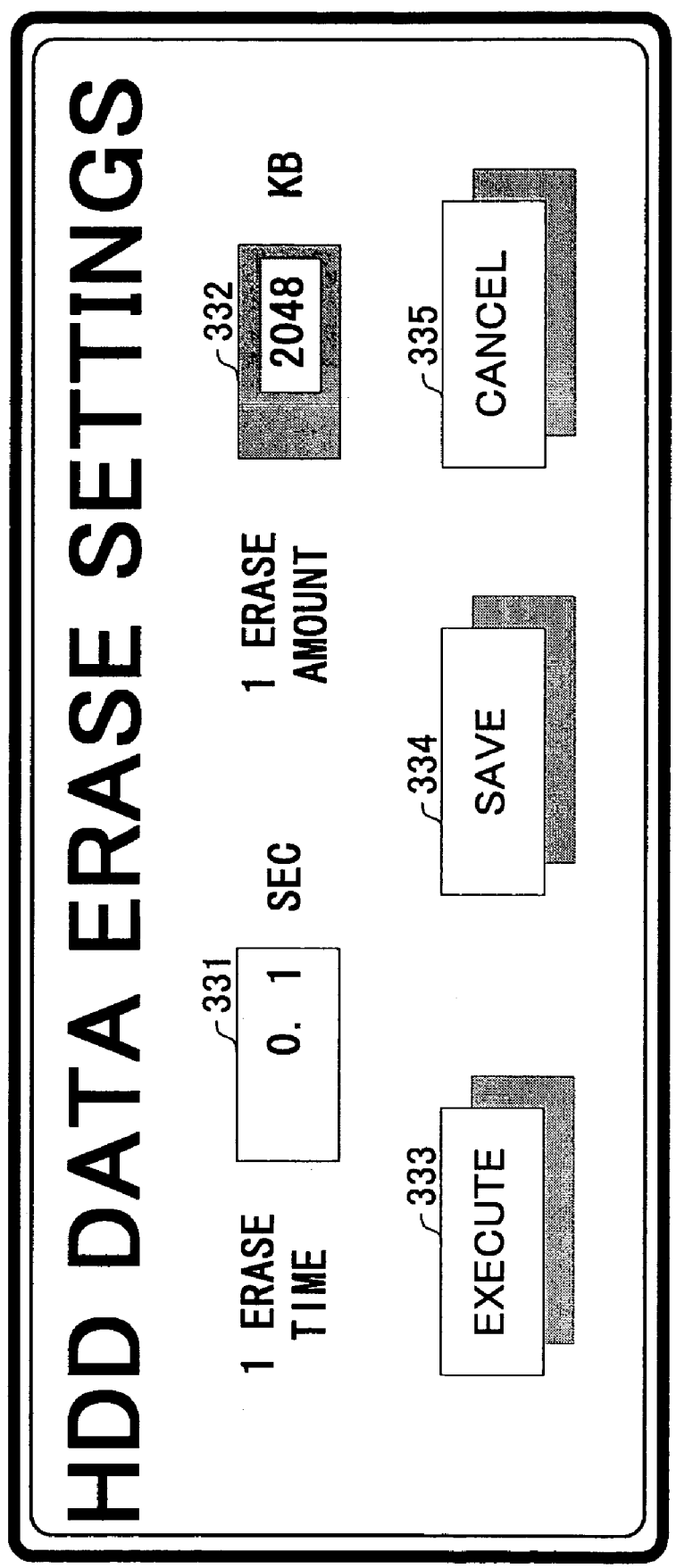
FIG. 17 is a diagram illustrating the HDD data erase setting screen according to the first embodiment of the present invention.

In the HDD data erase setting screen 330 in FIG. 15, a case in that "0.1" sec is set as "1 ERASE TIME" by the operator is illustrated. As shown in FIG. 16, when the operator presses the button 333 for executing the predetermined calculation, the erase amount is calculated. When a calculation result is obtained, the displaying area 332 displays the calculation result as "1 ERASE AMOUNT" as shown in FIG. 17. In this case in FIG. 17, "2048" KB is displayed as "1 ERASE AMOUNT". This erase amount can be calculated as follows:

$$\text{erase amount} = \text{data transmission/erase time} \quad (1)$$

Figure 18:
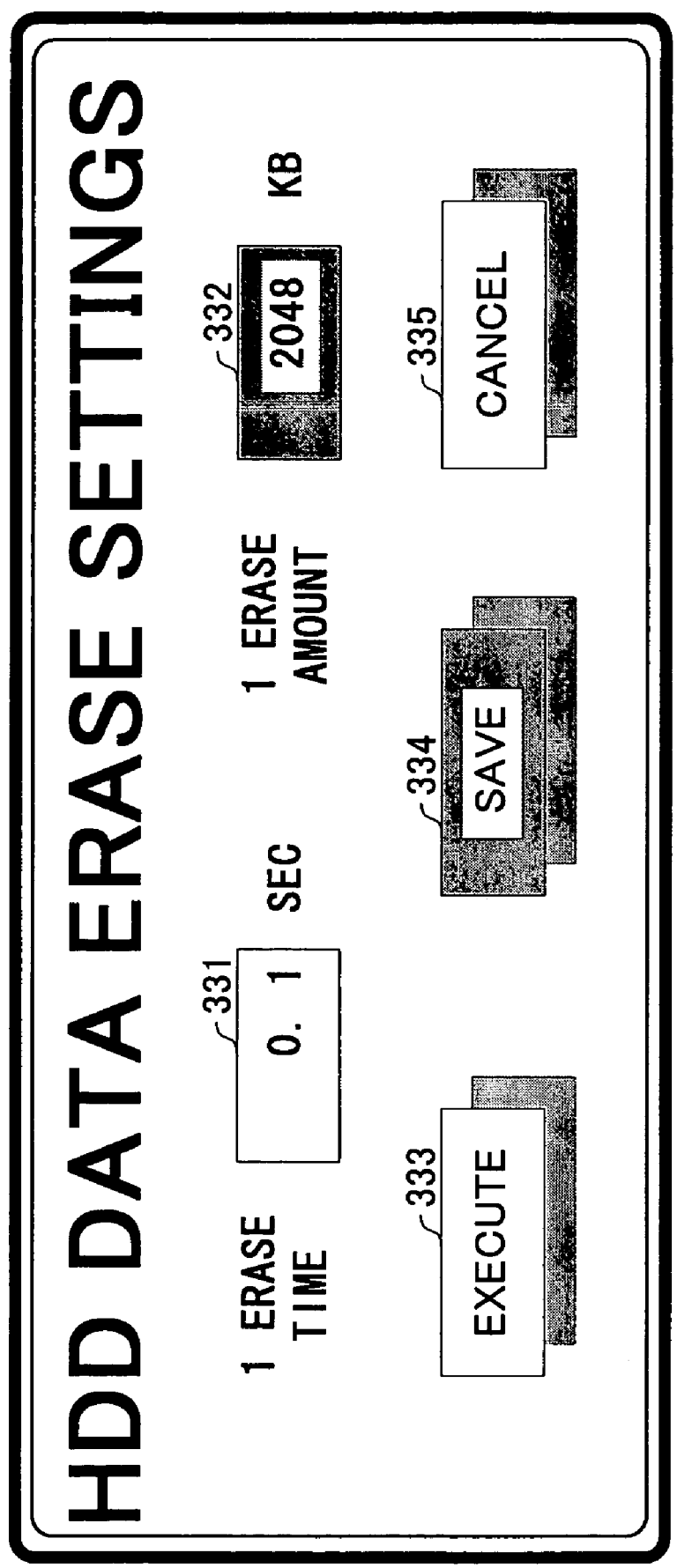
FIG. 18 is a diagram illustrating the HDD data erase setting screen according to the first embodiment of the present invention.

After the erase amount is calculated as described above, when the operator presses the button 334 for saving the settings as shown in FIG. 18, the settings are saved.

As other method for determining the erase amount, a rotation speed of an HDD 38, a cache of the HDD 38, a seek time of the HDD 38, and a connection state of the HDD 38 may be used.

Since the a performance of the HDD data access is improved if the rotation speed of the HDD 38 is faster, for example, the erase amount can be determined in proportion to the rotation speed. In particular, in a case in that an address where the process for the regular access is conducted is far from an address where the process for the HDD erase 314, a location adjustment of a head frequently occurs. In this case, the erase amount can be increased since the location adjustment of the head becomes faster if the rotation speed is faster. On the other hand, if the rotation speed is slower, the location adjustment of the head becomes slower. Accordingly, by reducing the erase amount, it is possible to reduce factors causing this degrade of the performance of the regular access.

If a capacity of a cache of the HDD 38 becomes larger, a communication time to the HDD 38 can be shorter and an erase amount can be increased. Accordingly, a total erase time can be shorter.

If the capacity of the cache becomes larger, the communication time to the HDD 38 becomes shorter, the erase amount can be increased. On the other hand, if the capacity of the cache becomes smaller, the communication time to the HDD 38 becomes longer. Thus, if the erase amount is set to be smaller, it is possible to minimize an influence to an access at a regular use.

When the seek time is faster, it is possible to suppress a degrade of the performance of the access to the HDD 38 even if a random access is conducted between at the access for the regular use and at the access for the erase.

In this case, the erase amount is determined by sampling the seek time individually for each address in the multi-functional apparatus 1 where a seek time measurement program is built in.

For example, the connection status of the HDD 38 shows a case in that the access speed is improved by RAID (Redundant Arrays of Inexpensive Disks). In this case, the erase amount is increased.

Figure 19:
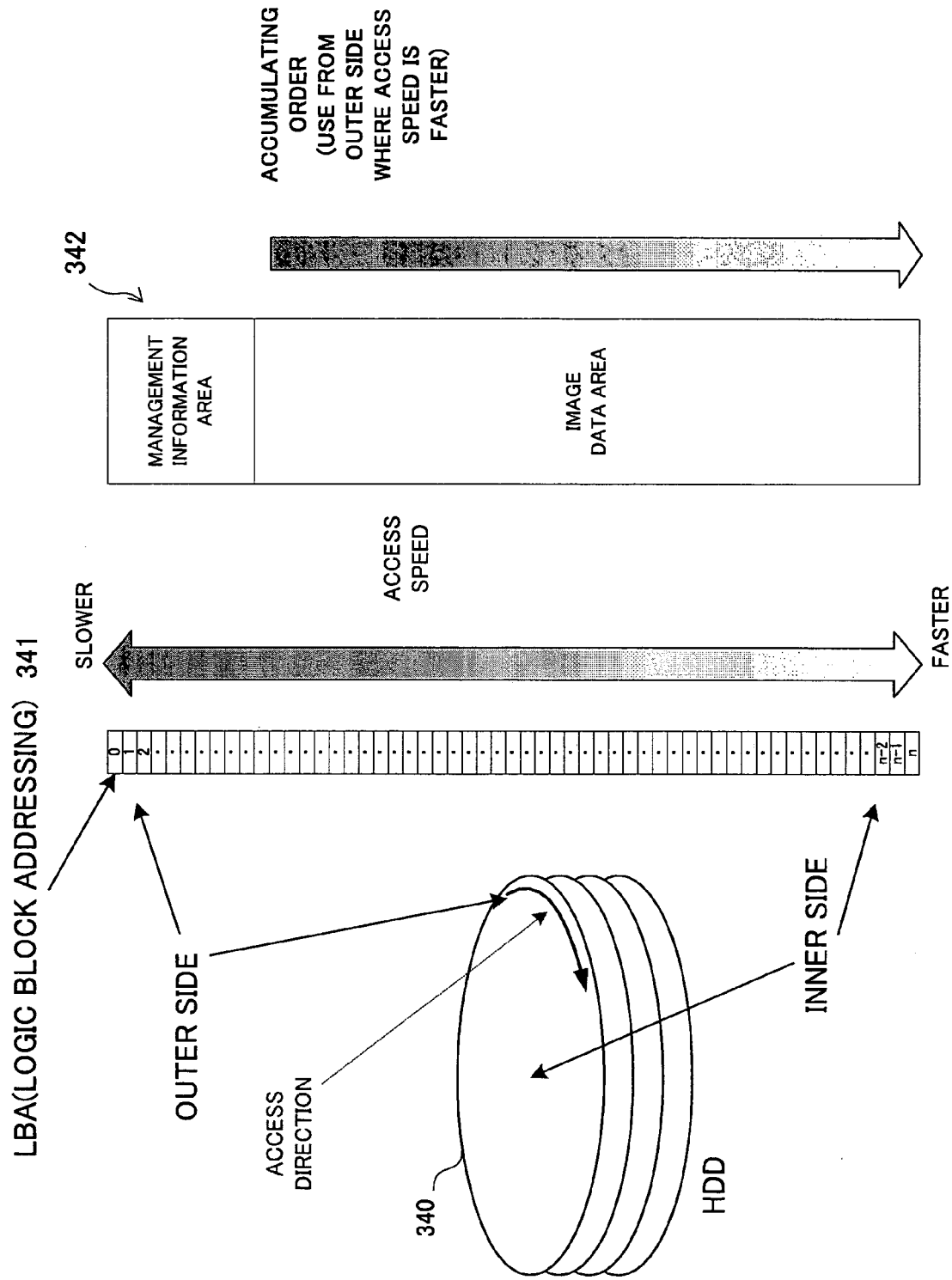
FIG. 19 is a diagram showing a relationship between an access location of the HDD and the access speed according to the first embodiment of the present invention.

Furthermore, as one of other methods, the erase amount is increased at an outer side and is decreased at an inner side, so that it is possible to make the erase time uniform. FIG. 19 is a diagram showing a relationship between an access location of the HDD and the access speed. In FIG. 19, a disk 340, a LBA (Logical Block Addressing) 341, and area information 342 of the HDD 38. As shown in FIG. 19, generally, at the HDD 38, the access speed is faster at the outer side where the LBA is smaller and is slower at the inner side where the LBA is greater. Accordingly, as shown in the area information 342, the HDD 38 is used from the outer side where the access speed is faster. In addition, the erase amount fluctuates depending on the access location, so that it is possible to effectively conduct the erasing process while utilizing most features of the HDD 38.

Figure 20:
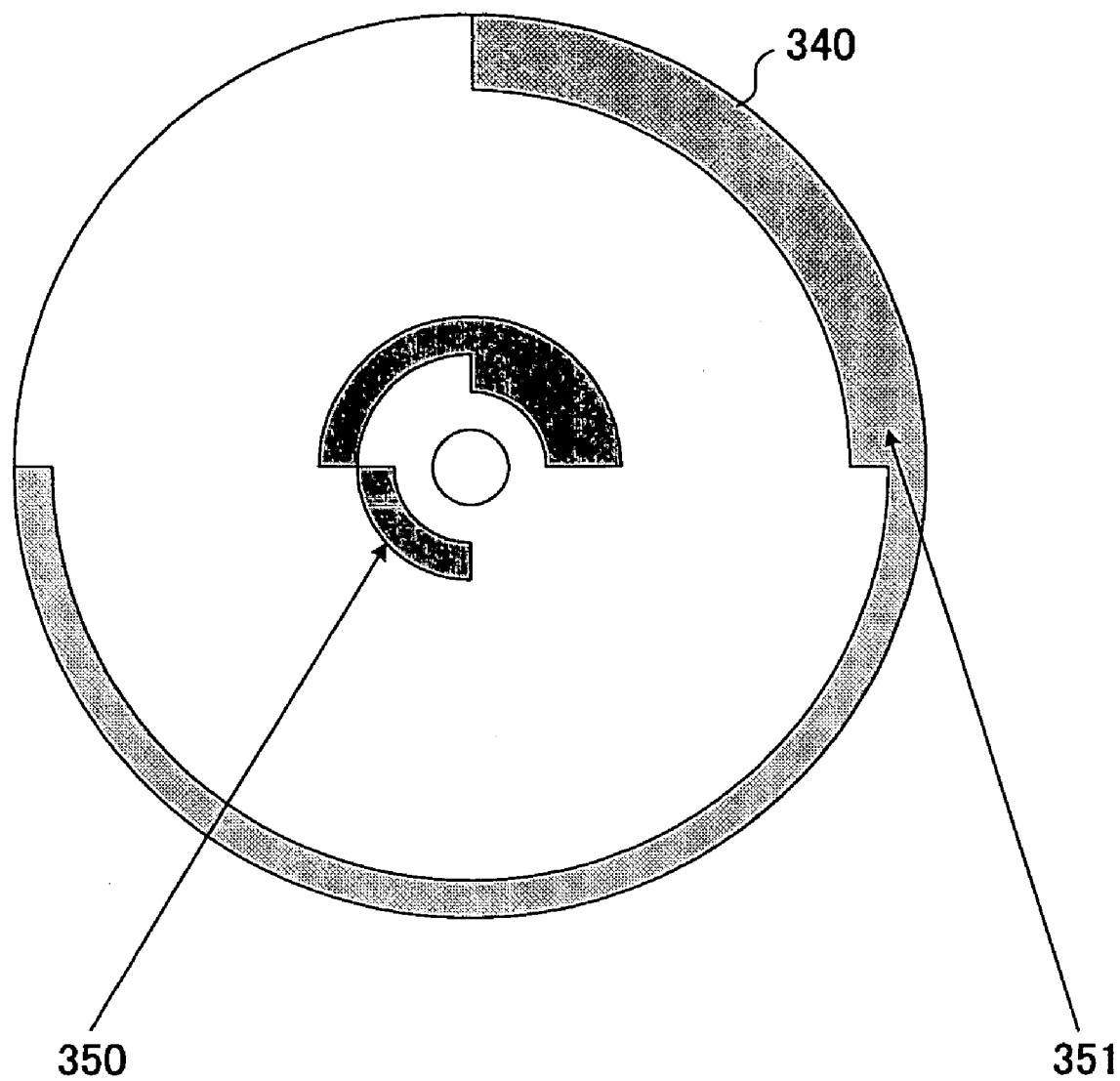
FIG. 20 is a diagram for explaining a priority order of the inner side and the outer side according to the first embodiment of the present invention.

Next, a case of erasing the inner side at a higher priority will be described with reference to FIG. 20. In FIG. 20, the disk 340, the outer side 351, and the inner side 350 of the HDD 38 are shown. Since a high speed access as described above can be conducted an area of the outer side 351, the area is used to record an image and is controlled to improve a frequency of recording the image. In this case, a new image is overwritten immediately on an area recording data which become unnecessary. Accordingly, in a regular operation, a significance of the erasing process is a lower level.

Moreover, an area of the inner side 350 is controlled so that the image is merely recorded. Accordingly, data which become unnecessary still remain at the area of the inner side 350. Therefore, data recorded in the area of the inner side 350 are erased at a higher priority so that it is possible to improve the significance of the HDD erase.

In this case, the erasing process may start from the inner side 350, and may start again from the inner side 350 when the data which can be erased are searched for until the outer side.

Next, referring to FIG. 21, a process for erasing from a nearest area to another area being most recently accessed will be described.

Figure 21:
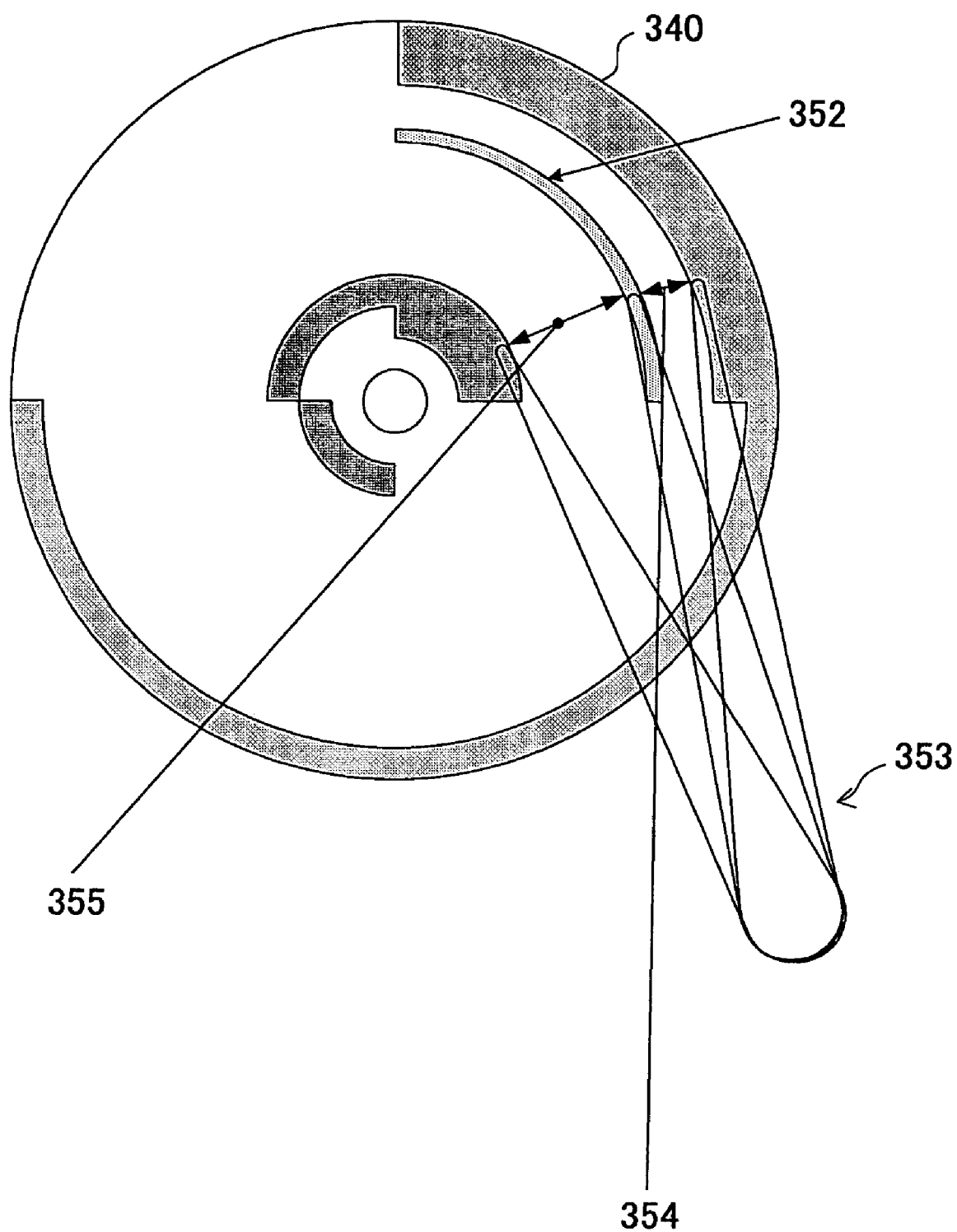
FIG. 21 is a diagram for explaining a process for erasing from a nearest area to another area being most recently accessed according to the first embodiment of the present invention.

In FIG. 21, the disk 340, ahead 353, a most recent accessed area 352, and head movement amounts 354 and 355 are shown.

In order to reduce a movement time of the head 353, the nearest area to the most recent accessed area 352. In a case shown in FIG. 21, the erasing process starts from area where the head 353 can move at the head movement amount 355. In detail, regarding a search for an area where the head movement amount 355 is smaller, the inner side 350 and the outer side in the nearest area are alternately searched for so that the inner side 350 in the nearest area is searched for, the outer side in the nearest area is searched for, the inner side 350 in the nearest area is search for again.

Figure 22:
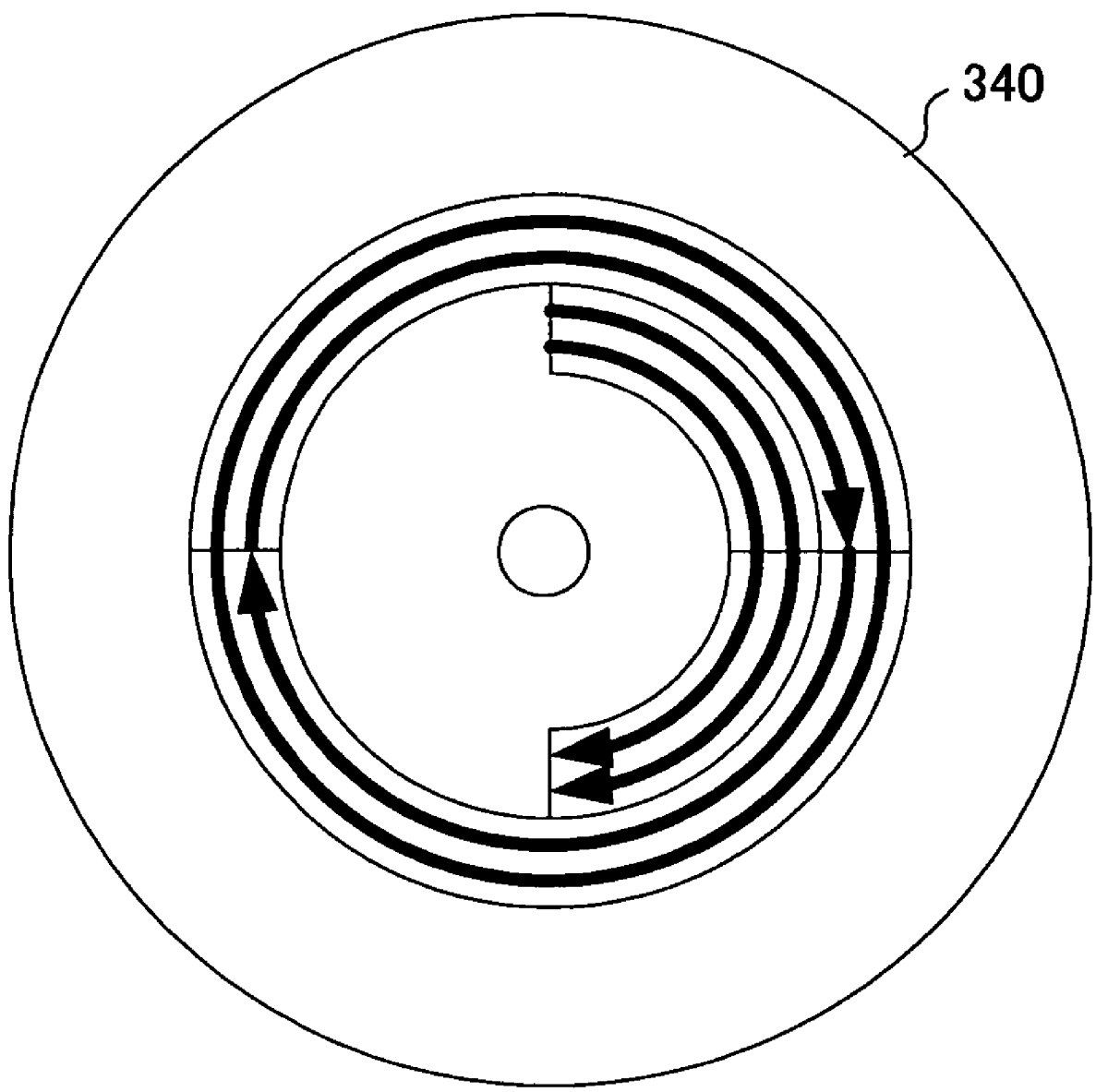
FIG. 22 is a diagram for explaining a process for erasing along concentric circles of a disk, according to the first embodiment of the present invention.

Next, referring to FIG. 22, a process for erasing along concentric circles of the disk 340 will be described. The disk 340 is shown in FIG. 22. By erasing along the concentric circles of the disk 340, the head 351 is not required to move to search for the area to be erased and then it is possible to improve the performance of the erasing process.

Figure 23:
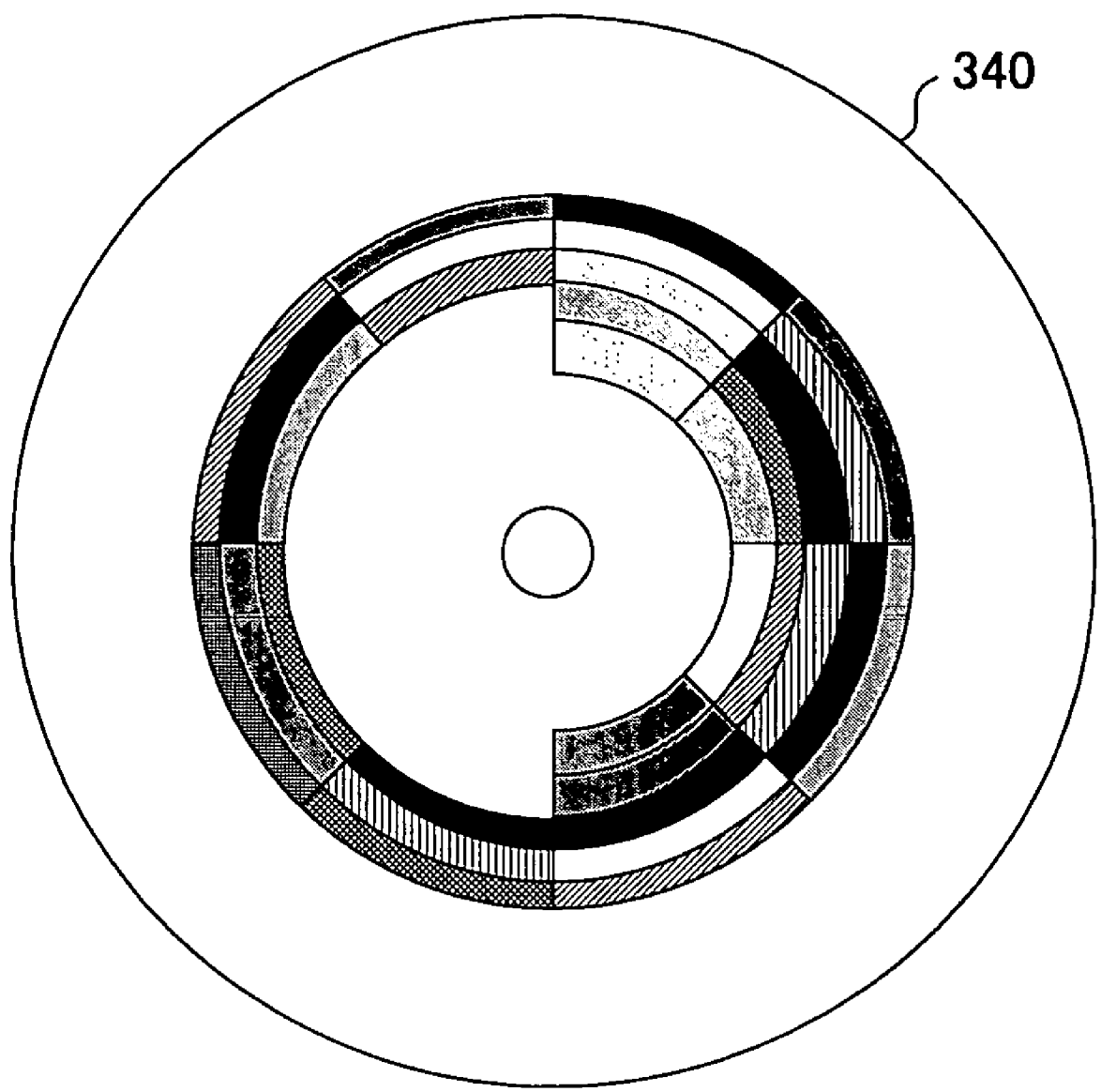
FIG. 23 is a diagram for explaining a process for a case in which there are a plurality of areas to be erased, according to the first embodiment of the present invention.

Next, referring to FIG. 23, a process for a case in which there are a plurality of areas to be erased will be described. As shown in the disk 340 in FIG. 23, in the case in which there are the plurality of areas to be erased, if the erasing process is conducted for each of the plurality of areas, for example, when the power is shut down, data which are not erased remain in some of the plurality of areas.

Accordingly, the plurality of areas to be erased are alternately erased little by little. Data in each area become incomplete data. Therefore, it is possible to improve the performance regarding to security of the data.

Second Embodiment

In the following, an erasing method for erasing information recorded in a hard disk will be described. Hereinafter, erasing information recorded in the hard disk (for example, HDD 38 in FIG. 6) may be expressed as erasing or overwriting information recorded in the hard disk.

Figure 24:
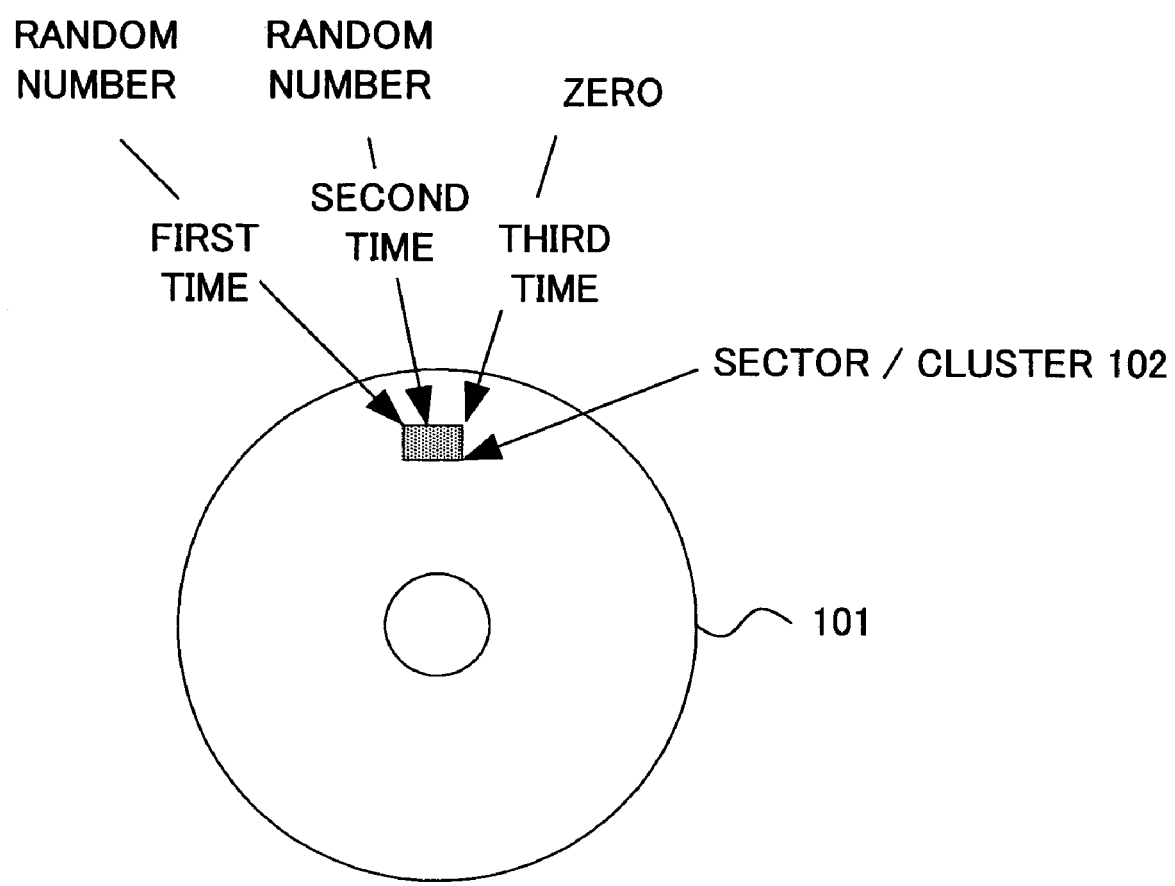
FIG. 24 is a diagram for explaining an erasing method of a hard disk according to a second embodiment of the present invention.

FIG. 24 is a diagram for explaining the erasing method for erasing information recorded on a hard disk, according to a second embodiment of the present invention. In FIG. 24, a disk 101 of the hard disk and a sector/cluster 102 are shown. Random numbers are over written at a first time and a second time and zero is overwritten at a third time, with respect to the sector/cluster 102. The sector/cluster 102 denotes a sector or a cluster.

As described above, erase information used to erase information recorded in the hard disk and an erasing method for erasing the information in a case of overwriting three times will be described by illustrating three examples.

A first example will be described with reference to FIG. 25. In the first example, after random numbers corresponding to an information amount necessary to overwrite the sector/cluster 102 as one sector/cluster are generated, the random numbers are overwritten to all sectors/clusters 102 which are subjects to overwrite.

Figure 25:
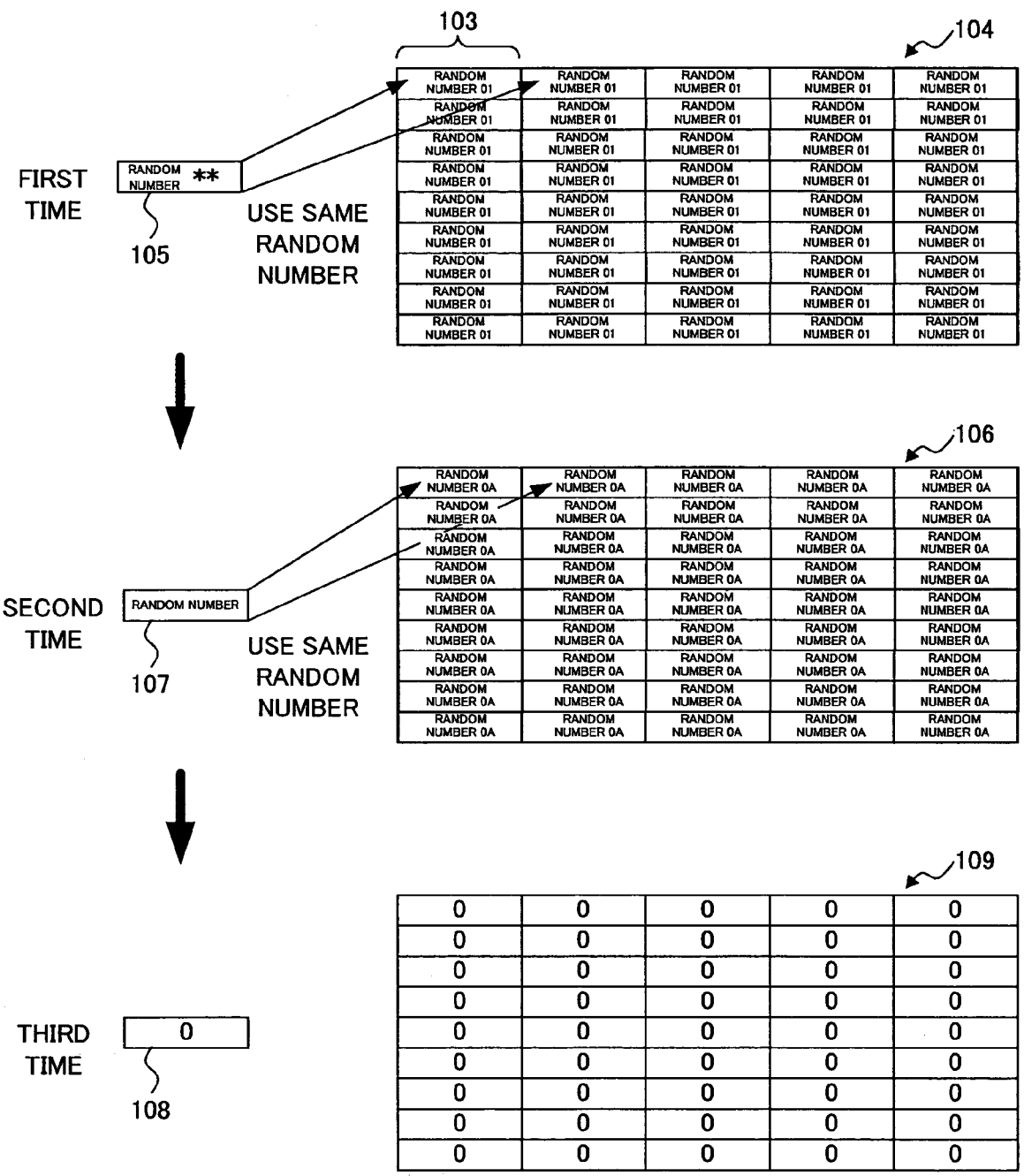
FIG. 25 is a diagram showing a first example of the erasing method of the hard disk according to the second embodiment of the present invention.

In FIG. 25, cells 103 are shown as one sector/cluster. Sector/cluster groups 104, 106, and 109. "RANDOM NUMBER 01", "RANDOM NUMBER 0A", and "0" written in each cell 103 show a random number or a constant number to overwrite the sector/cluster 102. Cells 105, 107, and 108 show a generated random number or a generated constant number.

In FIG. 25, at a first time, a random number shown in the cell 105 is generated, and all sectors/clusters in the sector/cluster group 104 are overwritten by "RANDOM NUMBER 01". At a second time, a random number shown in the cell 107 is generated. Similar to the first time, all sectors/clusters in the sector/cluster group 106 are overwritten by "RANDOM NUMBER 0A" which is generated.

At a third time, a constant number "0" shown in the cell 108 is overwritten. At the third time, all sectors/clusters group 109 are overwritten by the constant number "0", instead of a random number.

As described above, in the first example shown in FIG. 25, at each of the first time and the second time, the random number is generated once. Then, the constant number "0" is overwritten at the third time.

In the first example described in FIG. 25, "RANDOM NUMBER 01", "RANDOM NUMBER 0A", and "0" are used as the erase information.

Next, a second example will be described with reference to FIG. 26. In the second example, random numbers corresponding to the information amount necessary to overwrite one sector/cluster 102 are generated for each sector/cluster 102, and then the random number is overwritten on each sector/cluster 102.

Figure 26:
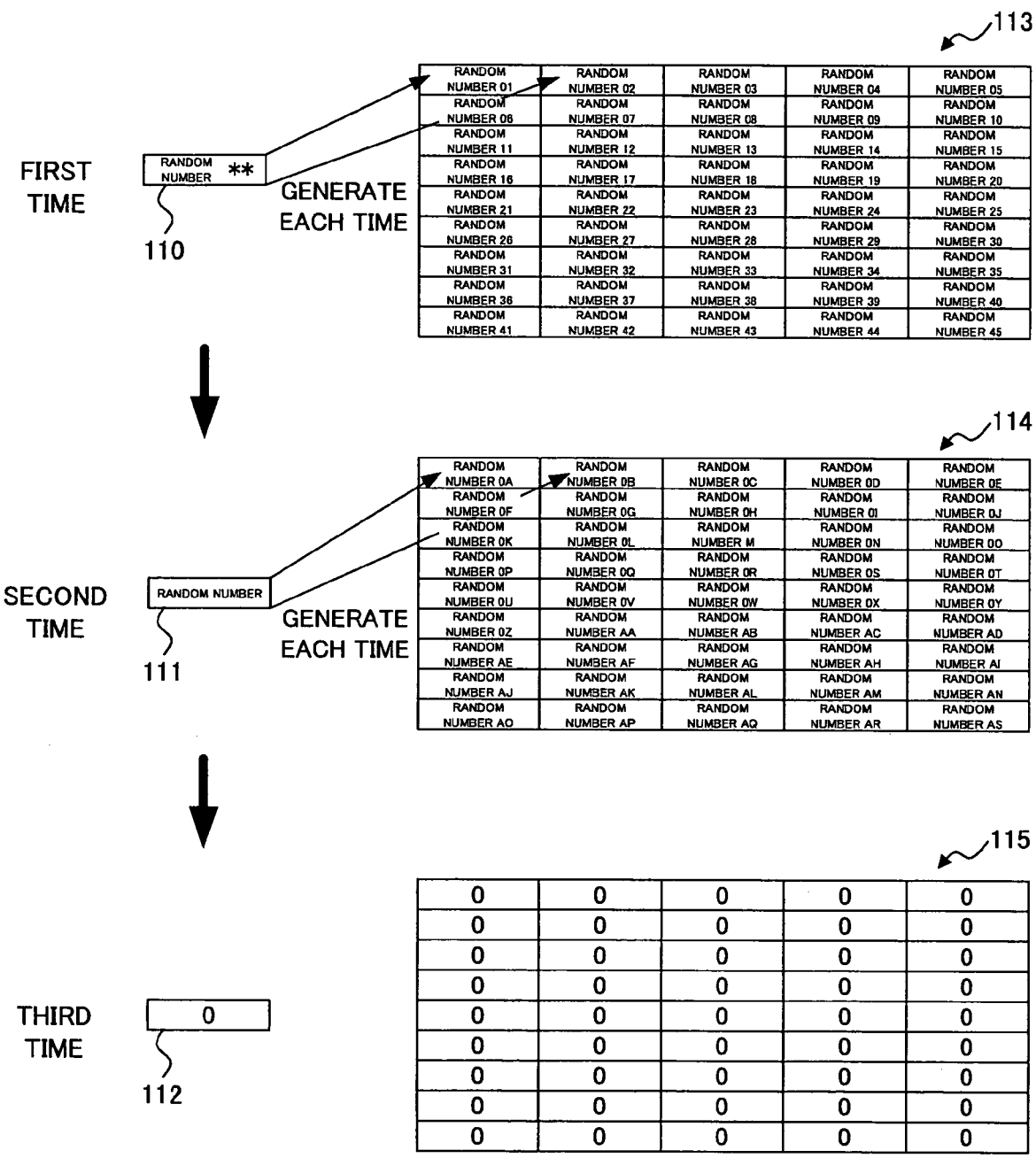
FIG. 26 is a diagram showing a second example of the erasing method of the hard disk according to the second embodiment of the present invention.

In FIG. 26, sector/cluster groups 113, 114, and 115 and cells 110, 111, and 112 are used in the same manner as FIG. 25, and explanations thereof will be omitted.

In FIG. 26, at a first time, a random number shown in the cell 110 is generated for each of the sector/clusters 102 in the sector/cluster group 113, and all sectors/clusters 102 in the sector/cluster group 113 are overwritten by generated "RANDOM NUMBER 01", "RANDOM NUMBER 02", . . . , and "RANDOM NUMBER 45".

Similar to the first time, at a second time, a random number shown in the cell 111 is generated for each of the sectors/clusters 102 in the sector/cluster group 114, and all sectors/clusters 102 in the sector/cluster group 114 are overwritten by generated "RANDOM NUMBER 0A", "RANDOM NUMBER 0B", . . . , and "RANDOM NUMBER AS".

At a third time, a constant number "0" shown in the cell 112 is written to the hard disk. At the third time, all sectors/clusters 102 in the sector/cluster group 115 are overwritten by the constant number "0", instead of a random number.

As described above, in the second example shown in FIG. 26, random numbers are generated for each sector/cluster 102 at each of the first time and the second time, and all sectors/clusters 102 are overwritten by generated random numbers. Then, all sectors/clusters 102 are overwritten by the constant number "0" at the third time.

In FIG. 26 described above, "RANDOM NUMBER 01", "RANDOM NUMBER 02", . . . , and "RANDOM NUMBER 45", "RANDOM NUMBER 0A", "RANDOM NUMBER 0B", . . . , and "RANDOM NUMBER AS", and the constant number "0" correspond to the erase information.

Next, a third example will be described with reference to FIG. 27. In the third example, random numbers corresponding to the information amount necessary to overwrite one sector/cluster 102 are generated for each sector/cluster 102. A calculation is further conducted for the random numbers, and then each sector/cluster 102 is overwritten by values obtained from the calculation. Hereinafter, these values are called random numbers, again. In detail, to conduct the calculation for the random numbers is to conduct a mapping process for the random numbers. As this mapping process, for example, an unidirectional hash function, a Triple DES (Data Encryption Standard), and an AES (Advanced Encryption Standard) may be used.

Figure 27:
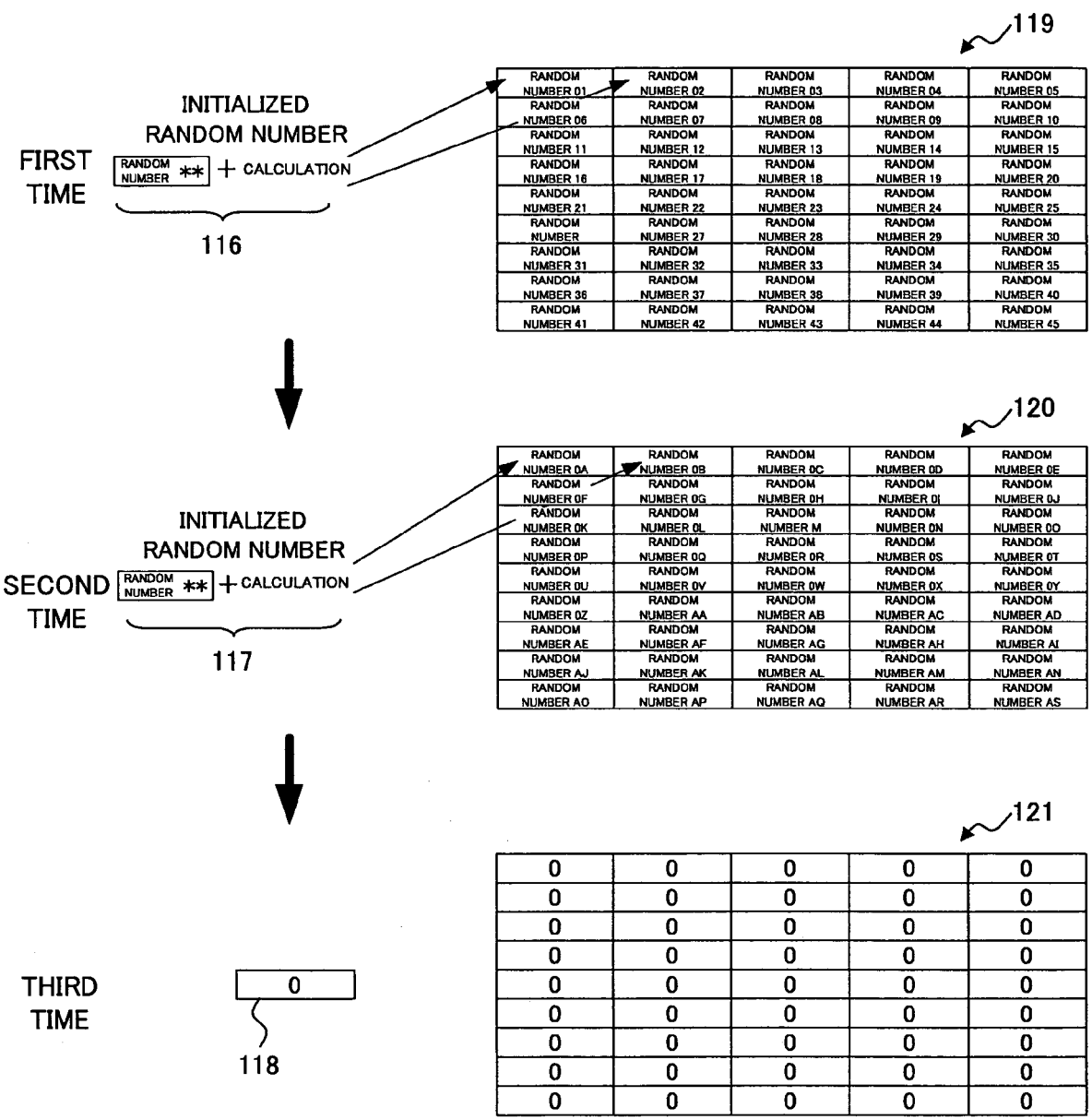
FIG. 27 is a diagram showing a third example of the erasing method of the hard disk according to the second embodiment of the present invention.

In FIG. 27, sector/cluster groups 119, 120, and 121 and a cell 118 are used in the same manner as in FIG. 25, and explanations thereof will be omitted. Cells 116 and 117 shows values after the calculation is conducted for the random number which is generated.

In FIG. 27, at a first time, a value shown in FIG. 116 is generated for each sector/cluster 102 in the sector/cluster group 119, and then all sectors/clusters in the sector/cluster group 119 are overwritten by "RANDOM NUMBER 01'", "RANDOM NUMBER 02'", . . . , and "RANDOM NUMBER 45'".

Similar to the first time, at a second time, a random number shown in the cell 117 is generated for each sector/cluster in the sector/cluster group 120, and then all sectors/clusters in the sector/cluster group 120 are overwritten by generated "RANDOM NUMBER 0A'", "RANDOM NUMBER 0B'", . . . , and "RANDOM NUMBER AS'".

At a third time, a constant number "0" shown in the cell 118 is overwritten. At the third time, all sectors/clusters 102 in the sector/cluster group 121 are overwritten by the constant number "0", instead of the random numbers.

As described above, in the third example, the random numbers are generated for each sector/cluster 102 at each of the first time and the second time, and the all sectors/clusters 102 are overwritten by generated random numbers. Then, the constant number "0" is overwritten at the third time.

In FIG. 27 described above, "RANDOM NUMBER 01'", "RANDOM NUMBER 02'", . . . , and "RANDOM NUMBER 45'", "RANDOM NUMBER 0A'", "RANDOM NUMBER 0B'", . . . , and "RANDOM NUMBER AS'", and the constant number "0" correspond to the erase information.

In the first, second, and third examples, an operator can selectively set to overwrite the constant number "0" at the third time.

Figure 28:
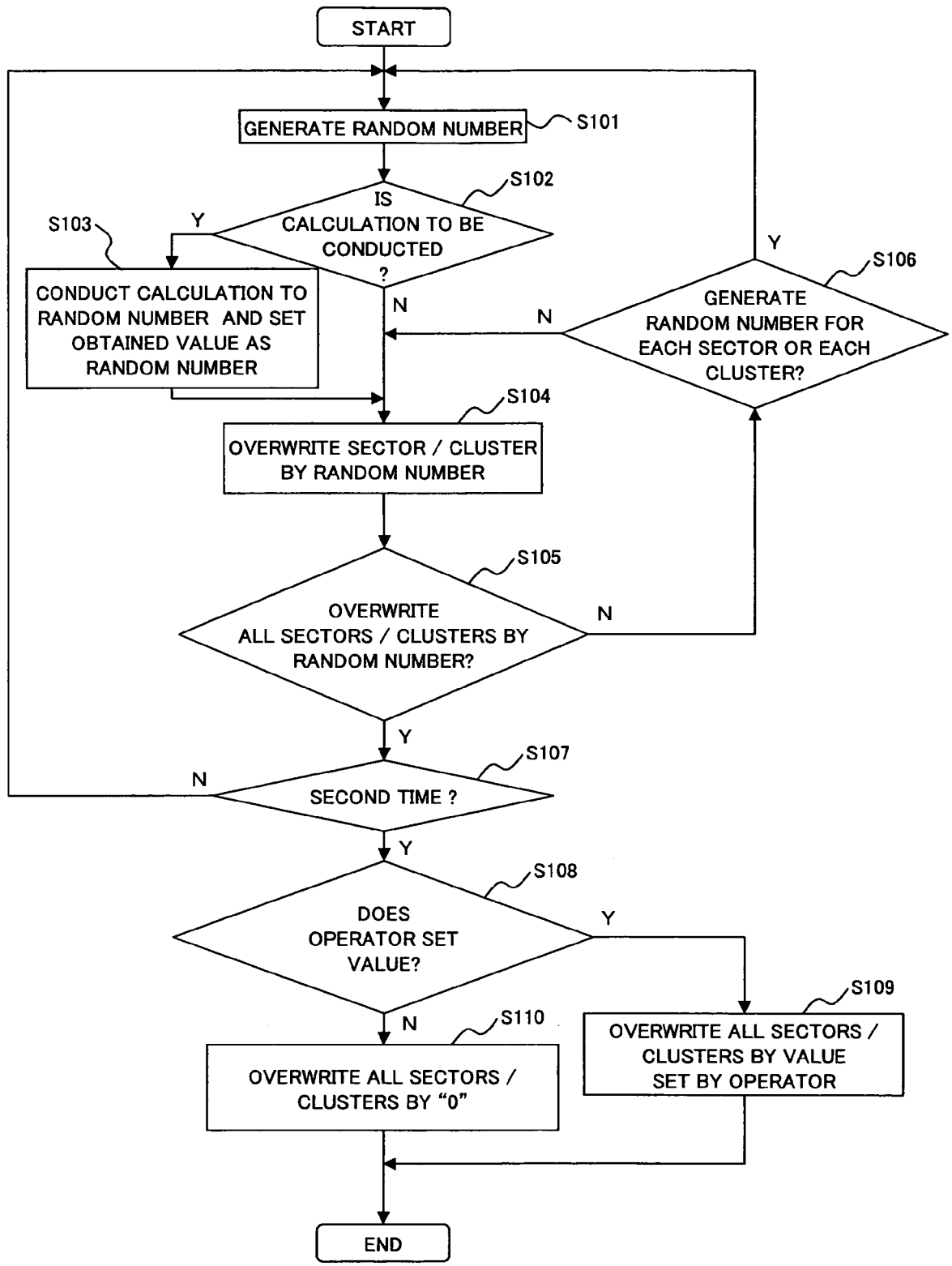
FIG. 28 is a flowchart for explaining the erasing method of the hard disk according to the second embodiment of the present invention.

Next, the above three examples will be described with reference to a flowchart shown in FIG. 28. In step S101 for generating a random number, the HSM 44 generates a random number. Next, the HSM 44 determines whether or not the calculation is to be conducted in step S102. When it is determined that the calculation is conducted, the HSM 44 conducts the calculation to the random number and sets a value obtained from the calculation as the random number in step S103. In step S104, the HSM 44 overwrites the random number on the sector/cluster 102.

The HSM 44 determines whether or not all sectors/clusters 102 are overwritten by the random number. When all sectors/clusters 102 are not overwritten, the HSM 44 determines whether or not the random number is generated for each the sector/cluster 102 in step S106. When it is determined that the random number is generated for each sector/cluster 102, the HSM 44 goes back to step S101 to conduct the same process again. When it is determined that the random number is not generated for each sector/cluster 102, the HSM 44 goes back to step S104 to conduct the same process again.

When the HSM 44 goes back to step S105 and determines that all sectors/clusters 102 are overwritten, the HSM 44 determines whether or not an overwriting process for the second time is completed in step S107. When it is determined that the overwriting process for the second time is not completed, the HSM 44 goes back to step S101 to conduct the same process again. When it is determined that the overwriting process for the second time is completed, the HSM 44 checks whether or not the operator sets a value to overwrite in step S108. When the operator sets the value to overwrite, the HSM 44 overwrites the value set by the operator on all sectors/clusters in step S109, and then terminates this overwriting process.

When the value is not set by the operator, the HSM 44 overwrites the constant number "0" on all sectors/clusters 102 in step S110.

Steps S104, 109, and 110 are to overwrite the erase information.

As described above, according to the second embodiment of the present invention, information recorded to the hard disk can be erased so as to be unreadable.

Third Embodiment

Figure 29:
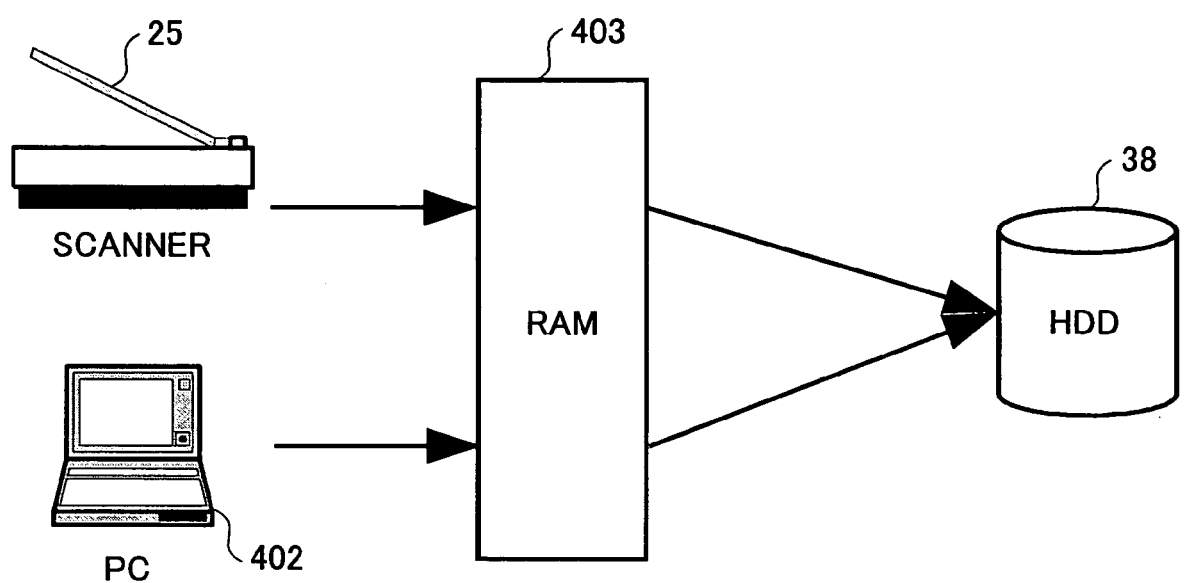
FIG. 29 is a diagram showing an image input according to a third embodiment of the present invention.

In the following, a method for managing and overwriting the HDD 38 will be described. First, for example, as shown in FIG. 29, an image to record to the HDD 38 is input by the scanner 25 mounted in the multi-functional apparatus 1 or a PC 402 connected through a network. The image being input is recorded in a RAM 403 and then recorded in the HDD 38.

Figure 30:
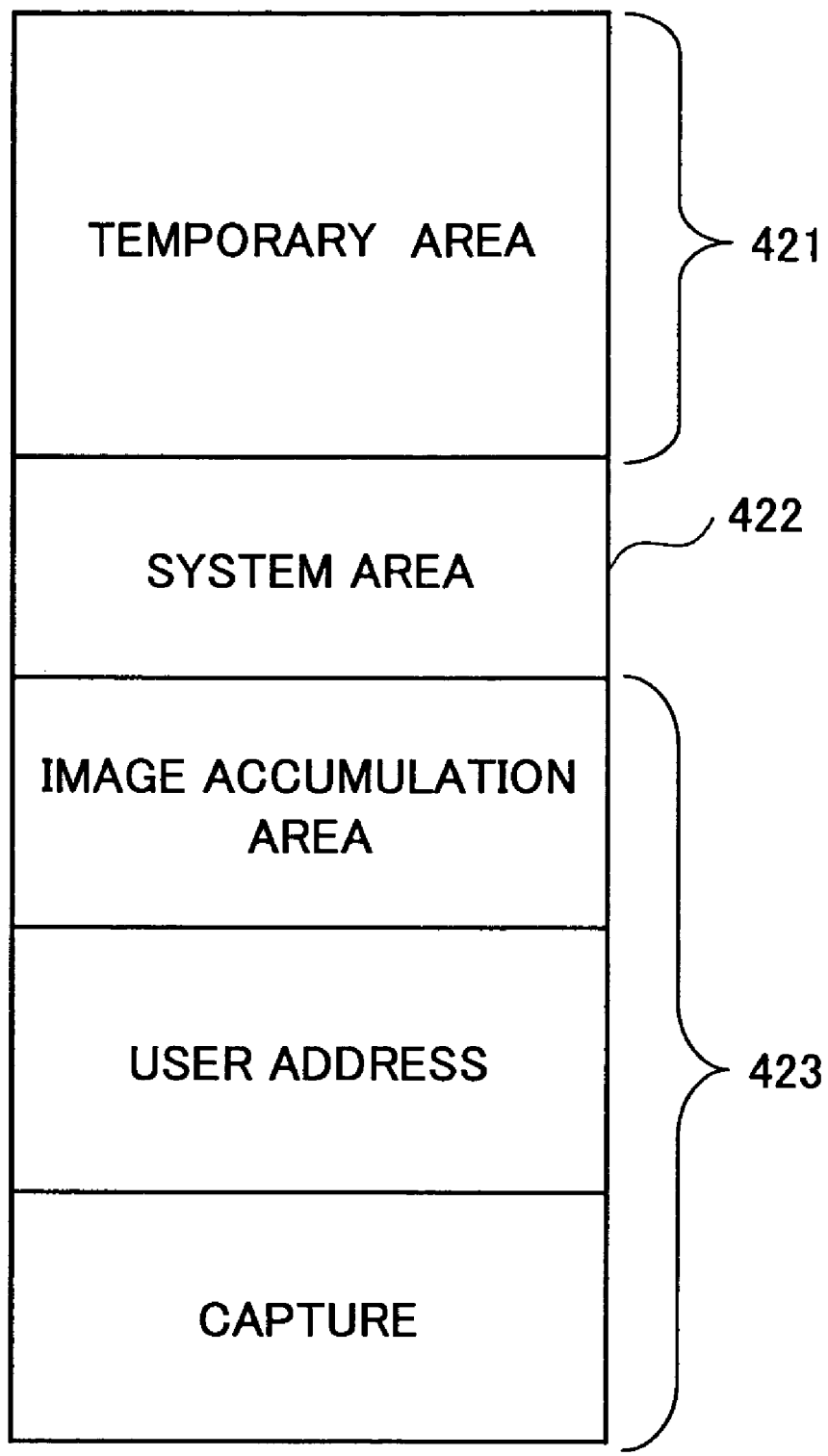
FIG. 30 is a diagram showing an area structure of the hard disk according to a third embodiment of the present invention.

In the HDD 38, areas are defined based on a type of information to record. FIG. 30 shows the areas. As shown in FIG. 30, the areas are defined as a temporary area 421, a system area 422, and other areas 423.

The temporary area 421 is used to record a temporary image. For example, the temporary image is an image read at a copy. In general, the read image is recorded in the HDD 38 once and deleted after the read image is printed on a paper sheet.

The system area 422 is used by a system of the multi-functional apparatus 1. The other areas 423 include an image accumulation area, a user address book, and a capture. The other areas 423 are used to record information necessary to be recorded for a relatively longer term. For example, an image accumulated in the image accumulation area is an image which an operator desires to record. For example, an image of a document such as a standard document which is frequently printed may be accumulated in the image accumulation area of the other areas 423.

Next, a method for recording an image to the HDD 38 will be described. The HDD 38 is managed for each area such as a sector or a cluster. The cluster is a set of sectors. A set of information is recorded at a cluster unit. The number of bits for one cluster is different since the number of bits for one cluster is defined based on a management specification. If the set of information cannot be recorded within one cluster, the set of information is recorded by using a plurality of clusters. In this case, the set of information is divided into the plurality of clusters to record. It is not necessary for these clusters to be successive areas physically.

As described above, in a case in that the set of information is recorded in discontinuous areas, it is required to manage information concerning clusters where the set of information is divided and recorded. Management information for managing the information concerning clusters will be described with reference to FIG. 31.

In FIG. 31, a relationship between a cluster map 431 recorded in the RAM 403 and data 434 recorded in the HDD 38 is shown. In addition, in FIG. 31, information (hereinafter, called link information) 430 showing a linkage of information is shown.

The cluster map 431 shows a state of one cluster by one bit. For example, the state of one cluster shows a cluster being used or unused to record information.

In a case shown in FIG. 31, one square represents one bit, and is filled with oblique lines such as a square 433 or filled with black such as a square 432. Each square corresponds to each square in the data 434 of the HDD 38. It should be noted that each square of the data 434 shows one cluster but not one bit.

The link information 430 shows clusters recording one set of information and a sequential order of the clusters. In the case shown in FIG. 31, the clusters recording the set of information starts from a cluster corresponding to a bit 19, the cluster links to a next cluster corresponding to a bit 20, and then the set of information is sequentially recorded until a cluster corresponding to a bit 53.

As described above, it is possible to discontinuously record the set of information by managing the clusters recording the set of information and the sequential order of the clusters. A bit number corresponds to specification information and an arrow is information relating specification information each other. In practice in software, a chain or a pointer is applied as the arrow.

Next, the cluster map 431 used to erase information is shown in FIG. 32. In FIG. 32, parts that are the same as the ones in FIG. 31 are indicated by the same reference numerals and explanations thereof will be omitted.

A square 435 shows a bit corresponding to a cluster to erase. In a case of erasing information, the set of information recorded in the clusters can be erased in accordance with the sequential order of the clusters shown by the link information created when the set of the information is recorded in the clusters.

In FIG. 31 and FIG. 32 described above, the link information 430 and the cluster map 431 are used to record and erase the set of information, but are not limited to record and erase the set of information. In the following, a file system (FS) includes the link information 430 and the cluster map 431. In a case in that the link information 430 is relevant to the following explanation, the cluster map 431 is shown alone in the following figures.

Moreover, an overwrite FS, which will be described in the following, is used to erase information recorded on the HDD 38 so as to be unreadable. In the following, erasing information, which the operator cannot know, is described as overwriting.

Figure 33:
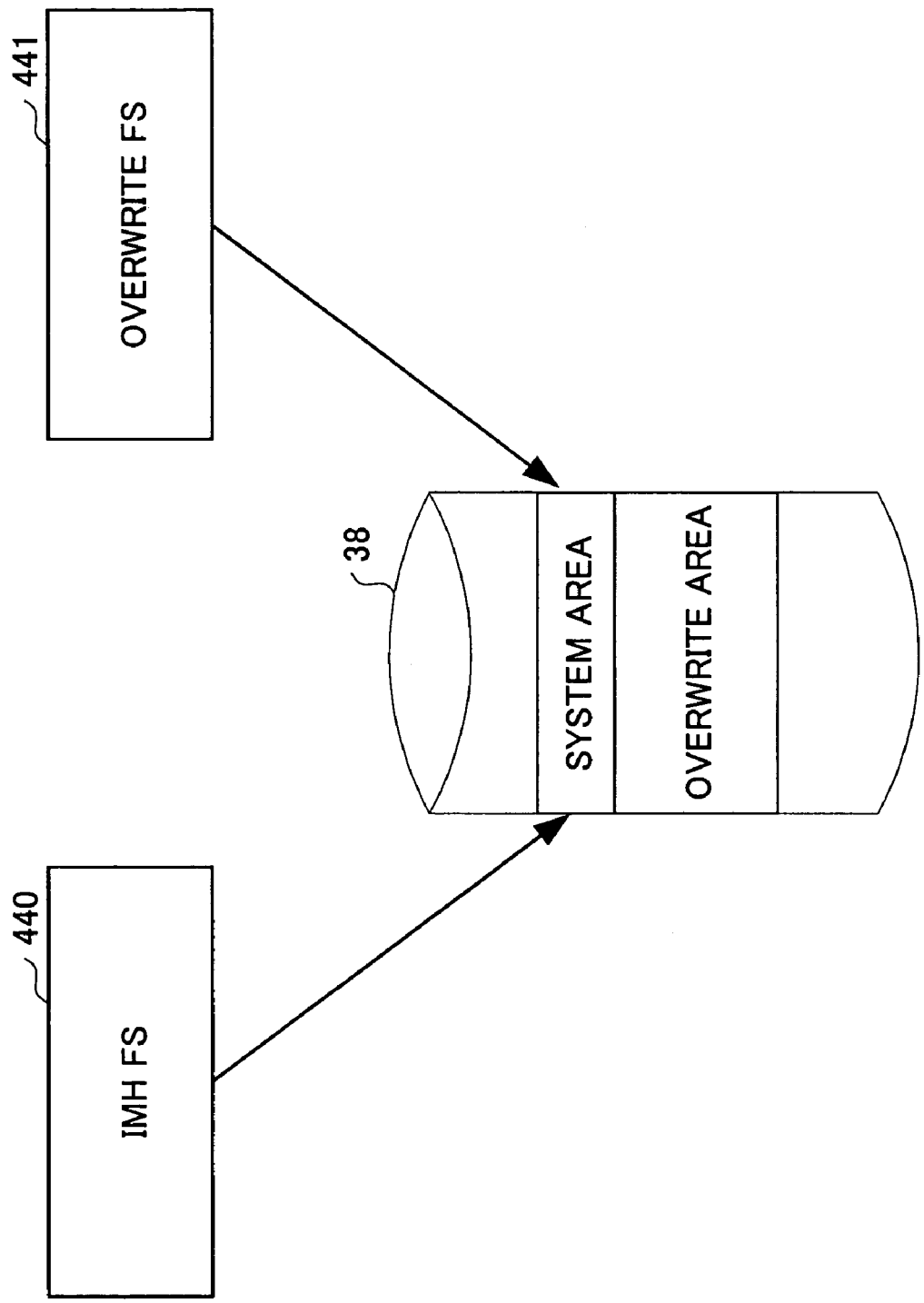
FIG. 33 is a diagram showing an overwrite state according to the third embodiment of the present invention.

First, the overwriting will be described with reference to FIG. 33. In FIG. 33, an IMH FS (FS for the IMH 23) 440, an overwrite FS (FS to overwrite) 441, and the HDD 38 are shown, and the overwriting by using the IMH FS 440 and the overwrite FS 441 is shown.

The IMH FS 440 corresponding to usable area information is a file system (FS) for the IMH 23, which shows whether or not a cluster has been used and records and erases information with respect to the HDD 38. The overwrite FS 441 corresponding to erase execution information is a file system (FS) used when the HSM 44 overwrites the HDD 38. Next, a procedure to use theses file systems will be described.

Figure 34:
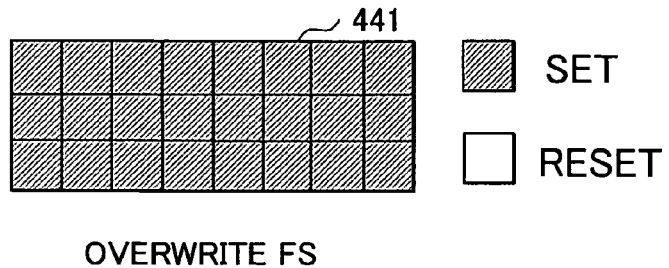
FIG. 34 is a diagram showing an overwrite FS according to the third embodiment of the present invention.
Figure 35:
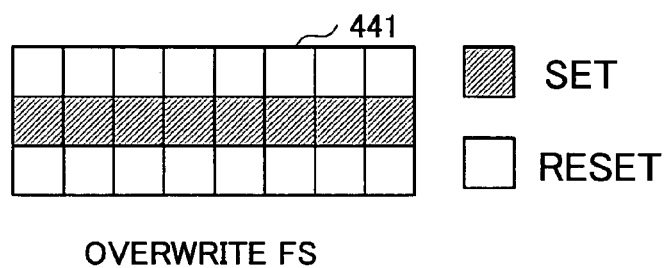
FIG. 35 is a diagram showing the overwrite FS according to the third embodiment of the present invention.

First, the overwrite FS 441 will be described with reference to FIG. 34 through FIG. 36. In FIG. 34, the overwrite FS 441 is shown. The overwrite FS 441 in FIG. 34 shows a state when the multi-functional apparatus 1 is activated. In this case, "activate" means a first "activate" since the multi-functional apparatus 1 is delivered.

In this case, a copy is not conducted at all so that the multi-functional apparatus 1 has been unused. Thus, it is required to overwrite all subject areas in the HDD 38 as shown in FIG. 33. Accordingly, a square being filled with oblique lines is shown to indicate a necessity to overwrite.

Next, the overwrite FS 441 in a case in that subject areas to overwrite are indicated by the IMH FS 440 will be described with reference to FIG. 35. In a case in that the subject areas are indicted by the squares being filled with oblique lines, the overwrite FS 441 is shown in FIG. 35. The HSM 44 erases the subject areas being indicated.

Figure 36:
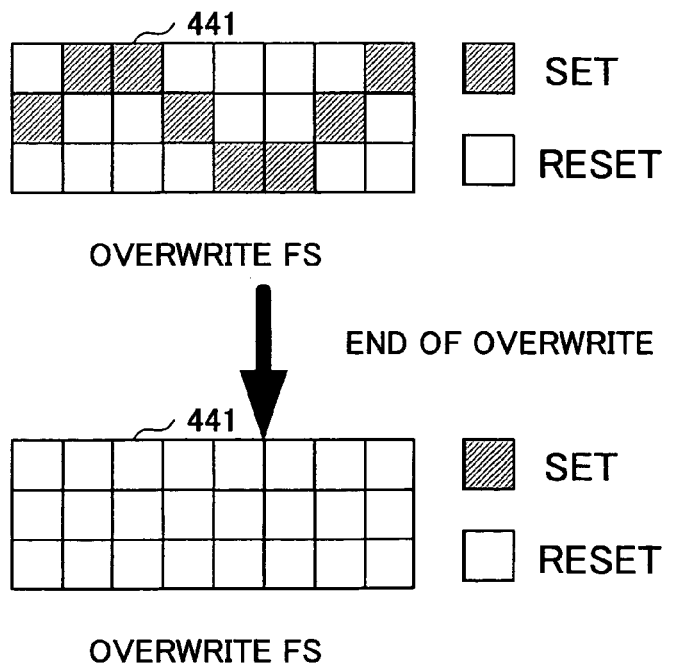
FIG. 36 is a diagram showing the overwrite FS according to the third embodiment of the present invention.

FIG. 36 shows the overwrite FS 441 where the subject areas to overwrite are indicated and the overwrite FS 441 after the subject areas are overwritten. As shown in FIG. 36, there is no square being filled with oblique lines to indicate overwriting in the overwrite FS 441 after the overwriting ends.

Figure 37:
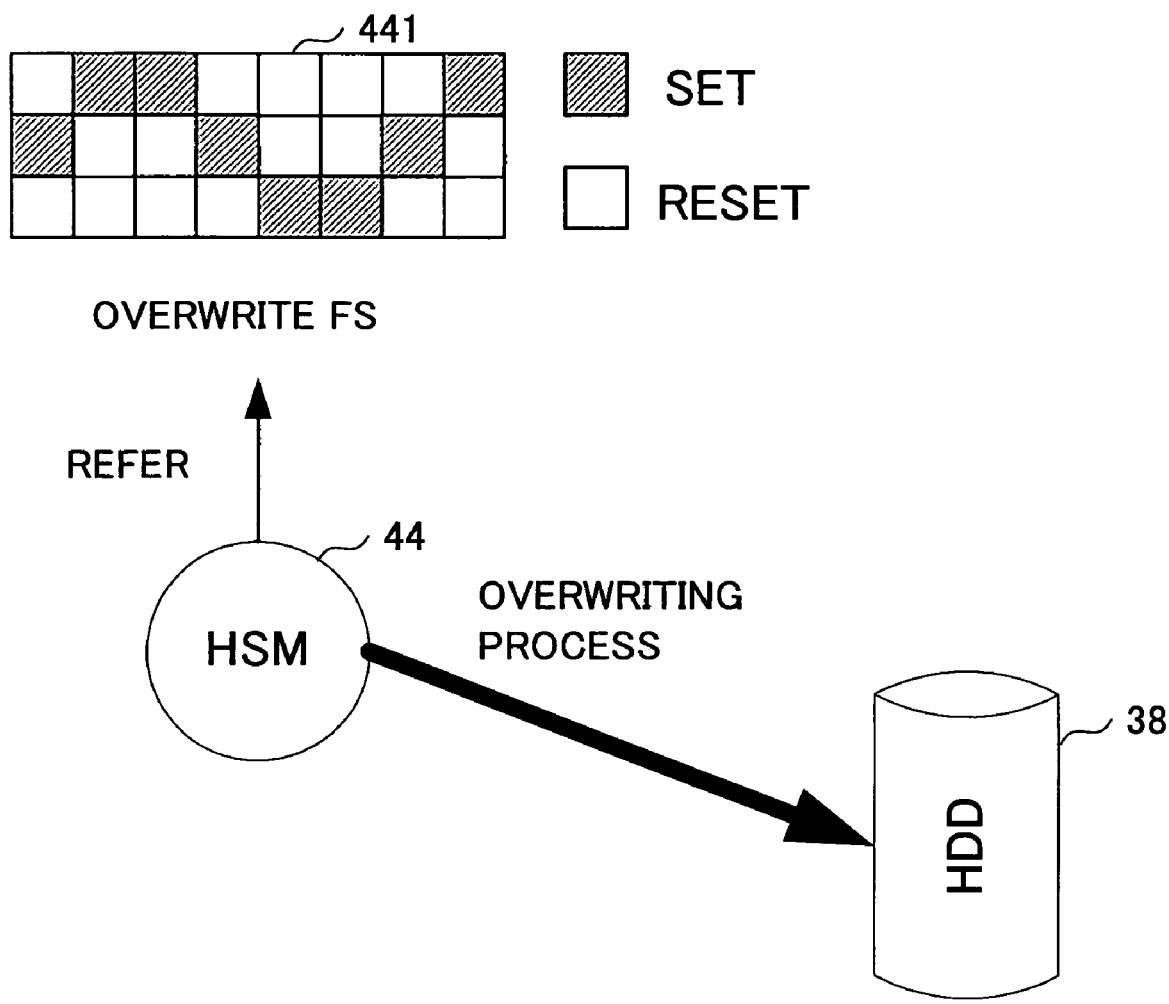
FIG. 37 is a diagram showing the overwrite state in that a HSM overwrites the hard disk according to the third embodiment of the present invention.

This overwriting function described above can be applied to the multi-functional apparatus 1 as an option. In a case of enabling this overwriting function, as shown in FIG. 37, the HSM 44 refers to the overwrite FS 441 and conducts an overwriting process to the HDD 38 as described above.

Figure 38:
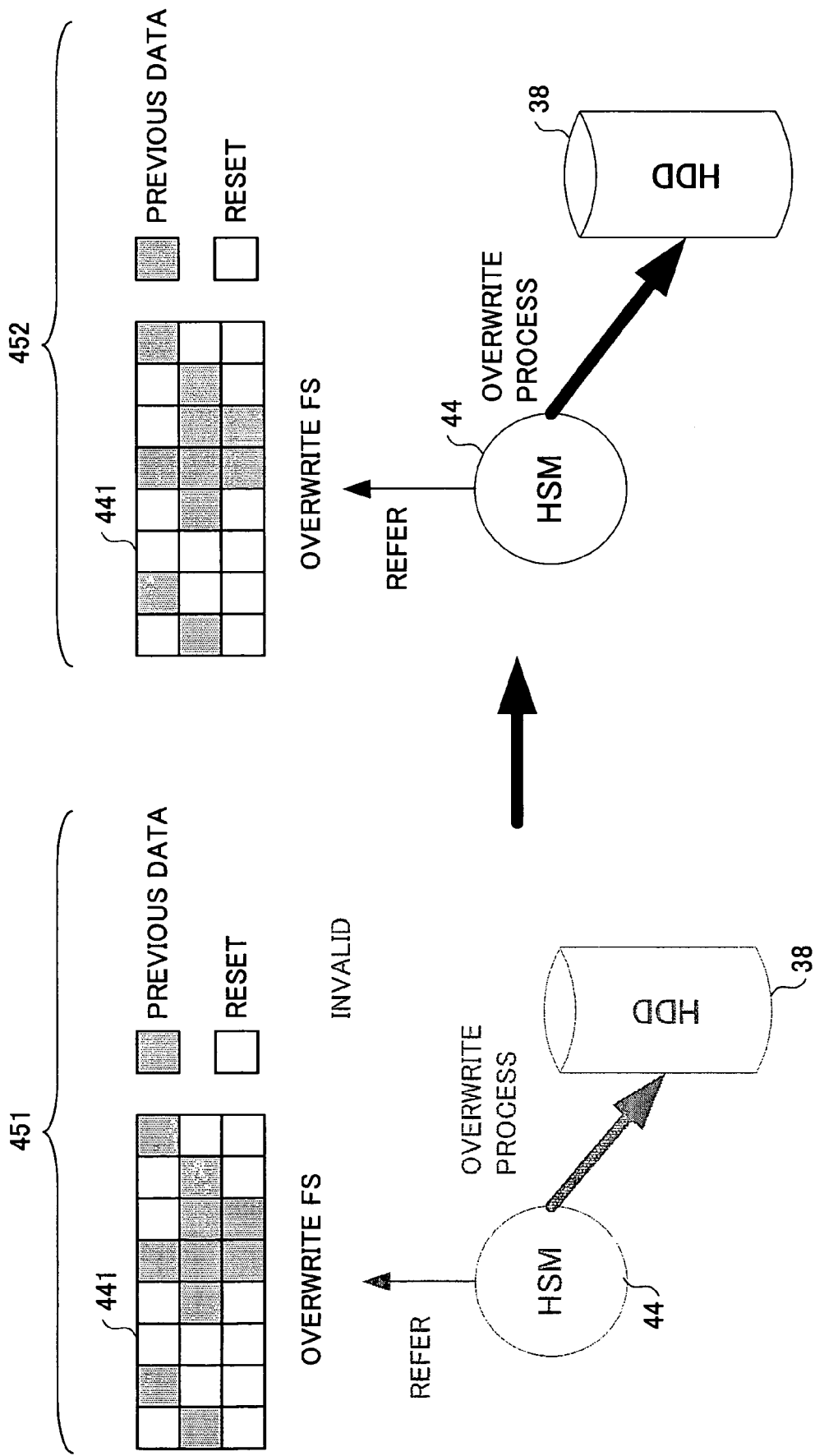
FIG. 38 is a diagram showing a state in that an overwriting function becomes from invalid to valid according to the third embodiment of the present invention.

There are cases in that the overwriting function is not valid and thus the overwrite FS 441 is not simply created, and a case in that the overwrite FS 441 is tentatively created. The latter case will be described with reference to FIG. 38. FIG. 38 is a diagram showing a case in that the overwriting function is invalid and then becomes valid. In FIG. 38, an invalid state 451 showing a case in that the overwriting function is set to be invalid and a valid state 452 showing a case in that the overwriting function is set to be valid.

Since the invalid state 451 indicates that the HSM 44 does not overwrite the HDD 38, the HSM 44 and the HDD 38 are drawn in light color. Even in a state in that the overwriting function is invalid, the overwrite FS 441 is created. Thus, when the overwriting function becomes valid, it is possible to overwrite with respect to information before the overwriting function becomes valid, in accordance with the valid state 452.

Figure 39:
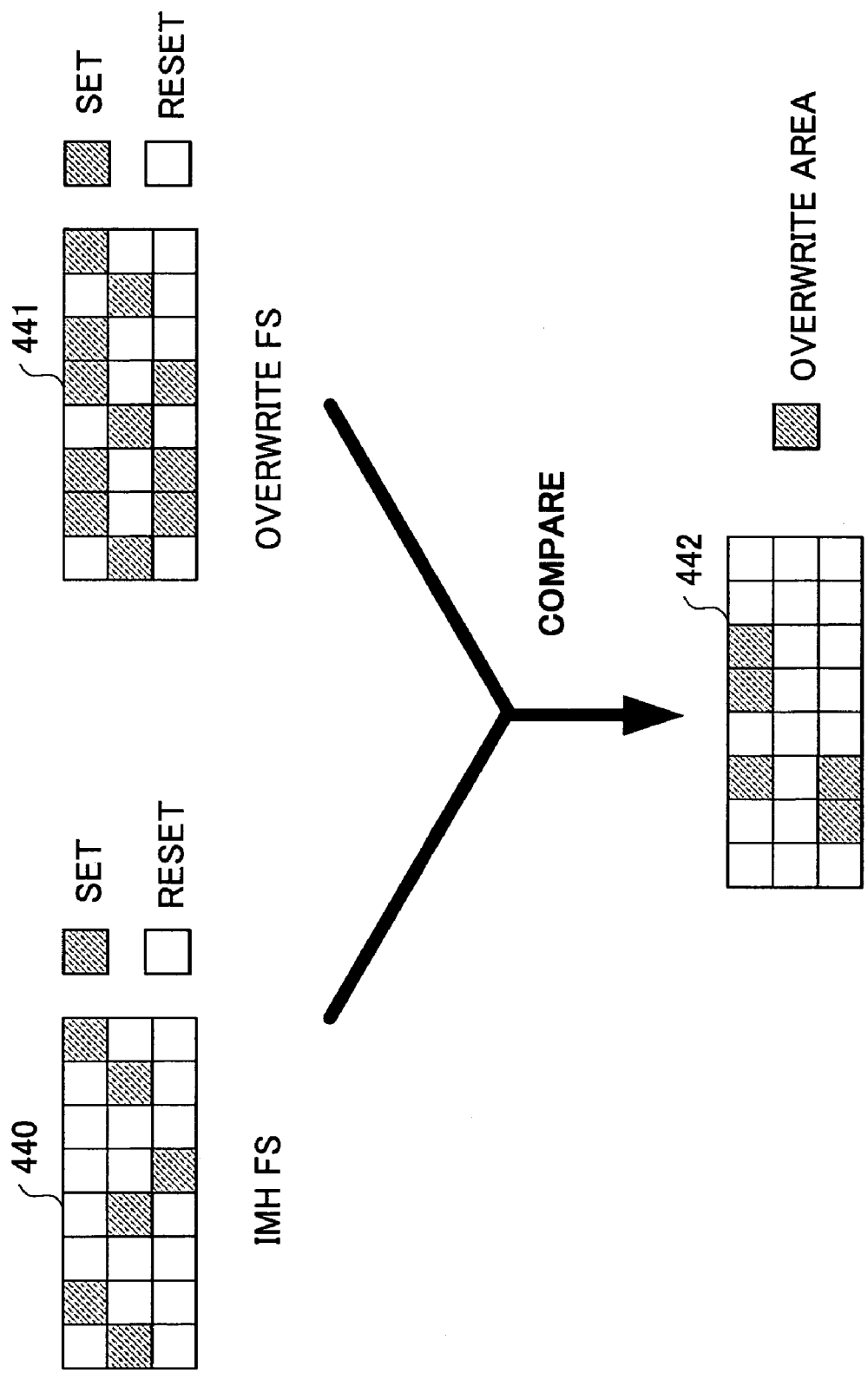
FIG. 39 is a diagram showing a determining process for determining an area subject to overwrite according to the third embodiment of the present invention.

Next, a determining process for determining the subject areas to overwrite by using the overwrite FS 441 will be described with reference to FIG. 39. FIG. 39 shows the IMH FS 440, the overwrite FS 441, and a determination result 442. The determining process determines to overwrite for a square where the IMH FS 440 indicates "RESET" and the overwrite FS 441 indicates "SET". Accordingly, the determination result 442 is based on a result from the determining process.

Next, a table showing a state of each FS and a process in each state of an operation of the multi-functional apparatus 1 will be described with reference to FIG. 40. In the table in FIG. 40, a horizontal axis shows a state of the operation or after the operation of the multi-functional apparatus and a longitudinal axis shows the state of the FS corresponding to each state of the operation. The state of the operation shows a state from an input of an image to an erase of the image.

"IMAGE INPUT" of the horizontal axis shows an operation of recording the image to the HDD 38. Two "AFTER FS BACKUP"s show a state in that the IMH FS 440 in the RAM 403 is backed up to the HDD 38. "IMAGE ERASE" shows a state of erasing the image. "IN OVERWRITING" shows that the overwriting process is being processed and "END OF OVERWRITING" shows that the overwriting process ends.

"IMH FS (RAM)" of the longitudinal axis shows a state of the IMH FS 440 recorded in the RAM 403. "IMH FS (HDD)" shows a state of backing up the IMH FS 440 recorded in the RAM 403 to the HDD 38. "OVERWRITE FS" shows a state of the overwrite FS 441. "OVERWRITE DETERMINATION" indicates whether or not to conduct an overwrite determination at each state shown on the horizontal axis. "AFTER OFF/ON" indicates whether or not to conduct an overwrite determination when the multi-functional apparatus 1 is activated again after the multi-functional apparatus 1 turned off in each state shown on the horizontal axis.

Next, contents in the table will be described along the horizontal axis. First, the image is input. The bit of the IMH FS 440 in the RAM 403 corresponding to a cluster where the image is input is set to be "1". Simultaneously, the bit of the overwrite FS 441 corresponding to the cluster where the image is input is set to be "1". In this case, the overwrite determination is not conducted. If the power is shut down, the overwriting process is conducted after the multi-functional apparatus 1 is activated again.

Next, at "AFTER FS BACKUP", since the IMH FS 440 recorded in the RAM 403 is backed up to the HDD 38, the state of "IMH FS (HDD)" is set to be "1". Also, in this case, the overwrite determination is not conducted.

Next, at "IMAGE ERASE", the state of "IMH FS (RAM)" is set to be "0", and the states of other FSs are not changed. However, the state of "OVERWRITE DETERMINATION" becomes "EXE" showing an execution. Thus, if the power is shut down, the overwriting process is conducted after the multi-functional apparatus 1 is activated again.

Next, at "AFTER FS BACKUP", since the IMH FS 440 recorded in the RAM 403 is not backed up to the HDD 38, the state of "IMH FS (HDD)" is set to be "0". In this case, the overwriting process is not conducted.

Next, at "IN OVERWRITING", since a sector subject to overwrite is in the overwriting process, the state of "IMH FS (RAM)" is set to be "1" and the states of other FSs are not changed. If the power is shut down in this case, the overwriting process is conducted after the multi-functional apparatus 1 is activated again.

When the overwriting process ends, each state of all FSs are set to be "0".

Figure 41:
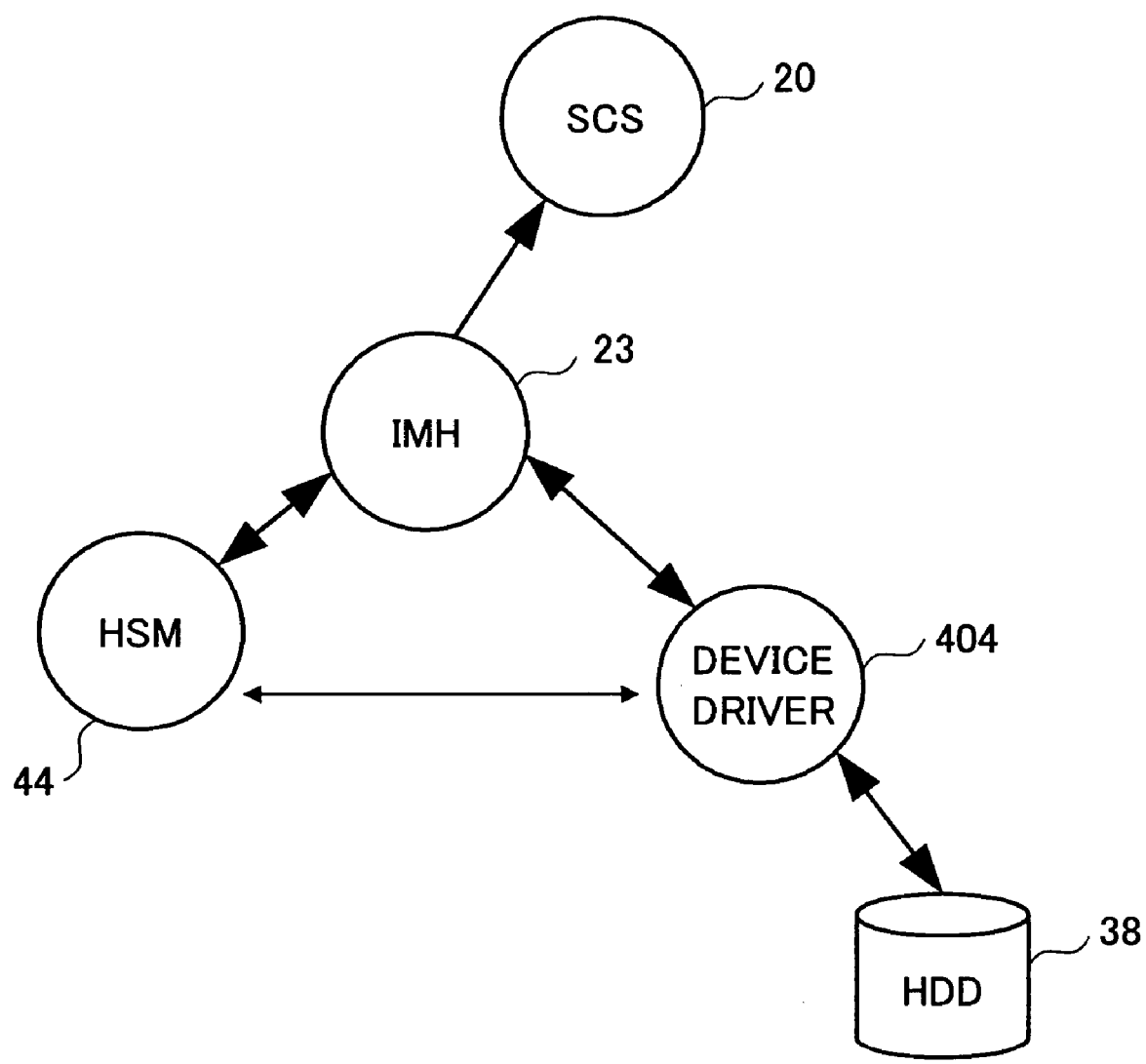
FIG. 41 is a diagram showing a program and a driver for managing and overwriting the hard disk according to the third embodiment of the present invention.

The method for managing and overwriting the HDD 38 is described above. In the following, a program conducting to manage and overwrite the HDD 38 will be described. The program shown in FIG. 41 is a program or a driver concerning managing and overwriting the HDD 38 in programs described in FIG. 5. The SCS 20 controls to display information at the operation panel 39, which will be described. The IMH 23 manages each of the FSs, compares the FSs, and records an image to the HDD 38 or the RAM 403. The HSM 44 conducts the overwriting process. The device driver 404 is a driver for the HDD 38, and the OS manages the device driver 404.

Figure 42:
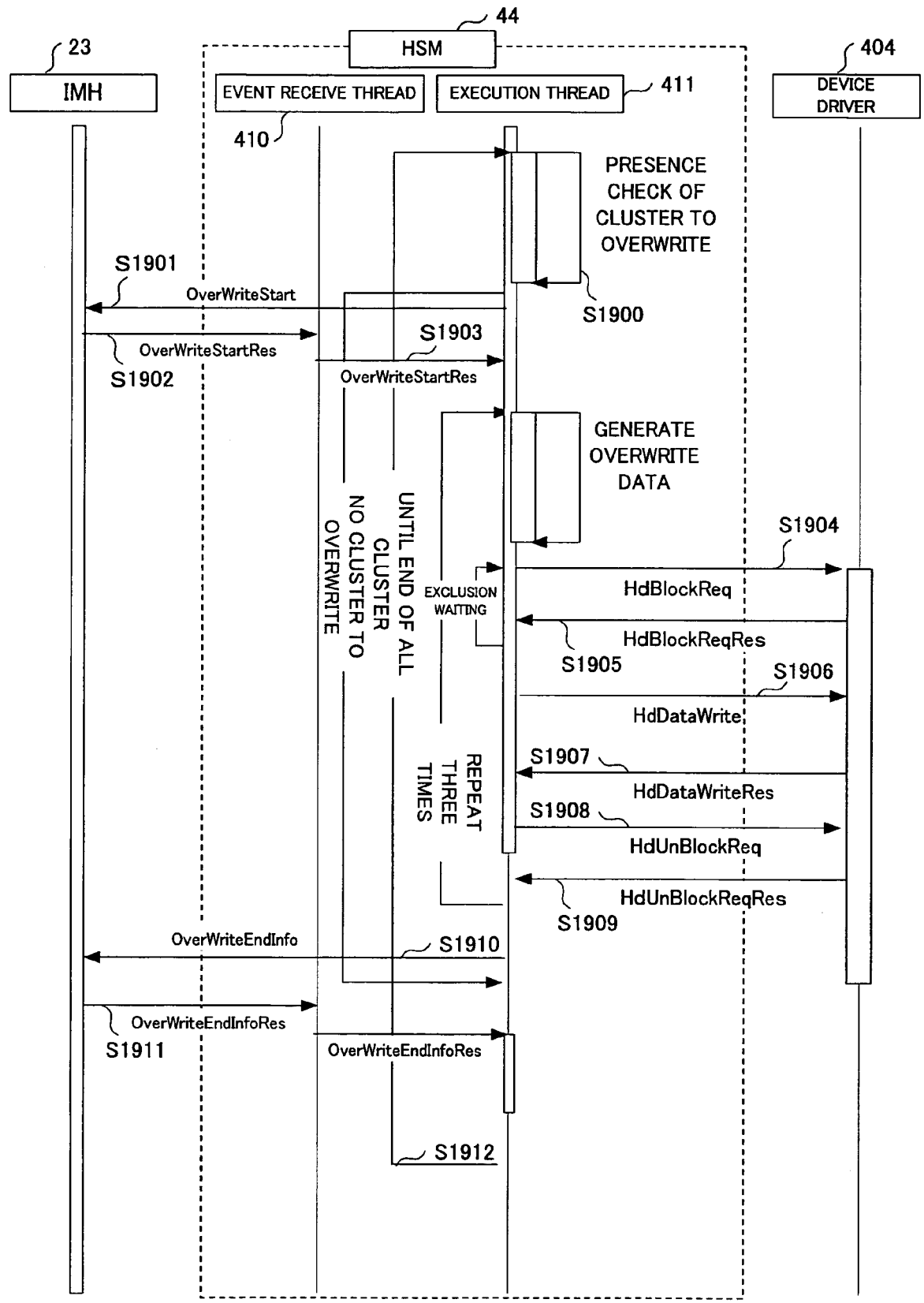
FIG. 42 is a diagram showing a sequence of the overwriting process according to the third embodiment of the present invention.

Next, the overwriting process conducted by the IMH 23, the HSM 44, and the device driver 404 will be described with reference to FIG. 42. The HSM 44 shown in FIG. 42 includes an event receive thread 410 and an execution thread 411 inside the HSM 44. The event receive thread 410 is a thread to receive an event from the IMH 23. The execution thread 411 is a thread to execute a process according to the overwriting process.

It is assumed that the IMH FS 440 is set to be unused by the IMH 23. This process corresponds to setting usable area information. First, the execution thread 411 checks a presence of a cluster to overwrite in step S1900. When it is determined that the cluster to overwrite exists, the execution thread 411 sends "OverWriteStart" indicating an execution start of the overwriting process with respect to the IMH 23 in step S1901. The IMH 23 makes the event receive thread send "OverWriteStartRes" as a response in step S1902. The event receive thread 410 passes the response to the execution thread 411 without any process in step S1903.

When the execution thread 411 receives the response, the execution thread 411 generates data to overwrite as overwrite data. The overwrite data are predetermined data, and for example, may be a random number. When the overwrite data are generated, the execution thread 411 sends "HdBlockReq" as a request to request an exclusion control for a use of the HDD 38 with respect to the device driver 404 in step S1904. When the device driver 404 receives the request, the device driver 404 sends "HdBlockReqRes" as a response to the execution thread 411 in step S1905. If the response indicates that the IMH 23 cannot use the HDD 38 because the HDD 38 is being used by another process, the above described step S1904 and step S1905 are repeated until the exclusion control becomes available.

If the exclusion control is available, the execution thread 411 sends "HdDataWrite" as a request to overwrite the HDD 38, to the device driver 404 in step S1906. In response to the request, the device driver 404 sends "HdDataWriteRes" as a response in step S1907.

When it ends to overwrite HDD 38, the execution thread 411 sends "HdUnblockReq" as a request to release the exclusion control to the device driver 404 in step S1908. When the device driver 404 releases the exclusion control, the device driver 404 sends "HdUnblockReqRes" to the execution thread 411 in step S1909.

A process from a generation of the overwrite data to step S1909 corresponds to overwriting, and overwriting on one cluster repeats three times. A repeat number is not limited to three times but may be equal to or more than two times based on performance of the multi-functional apparatus 1 and necessity.

When this process ends, the execution thread 411 sends "OverWriteEndInfo" indicating an end of overwriting on one cluster, to the IMH 23 in step S1910. The IMH 23 sends "OverWriteEndInfoRes" as a response to "OverWriteEndInfo", to the event receive thread 410 in step S1911. This response is sent from the event receive thread 410 to the execution thread 411 in step S1912. The execution thread 411 repeats a process from a check of the presence of the cluster subject to overwrite in step S1900 to step S1912, until all clusters subject to overwrite are overwritten. The overwriting process is terminated when all clusters subject to overwrite are processed.

Figure 43:
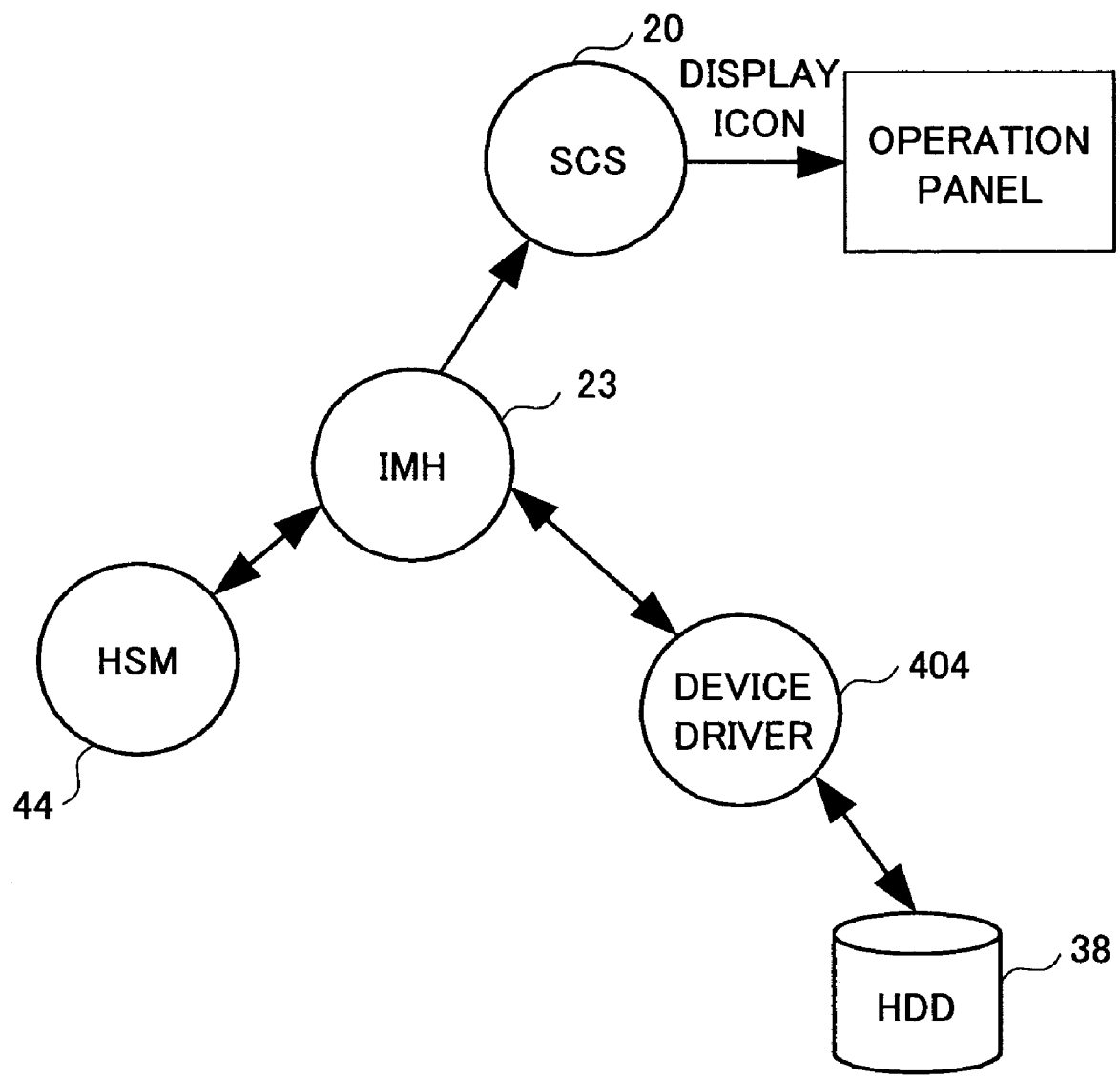
FIG. 43 is a diagram showing that information is displayed at an operation panel by a SCS according to the third embodiment of the present invention.

Next, a case of displaying at the operation panel 39 that there is a cluster subject to overwrite will be described. FIG. 43 is a diagram for explaining the display at the operation panel 39 by the SCS 20. The SCS 20 corresponding to the presence information providing part conducts a display control for the operation panel 39. The IMH 23 sends information showing the presence of the overwriting function and information showing the presence of the cluster subject to overwrite, to the SCS 20. The IMH 23 determines the presence of the overwriting function and the presence of the cluster subject to overwrite when the multi-functional apparatus 1 is activated, and then sends relative information to the SCS 20.

Figure 44:
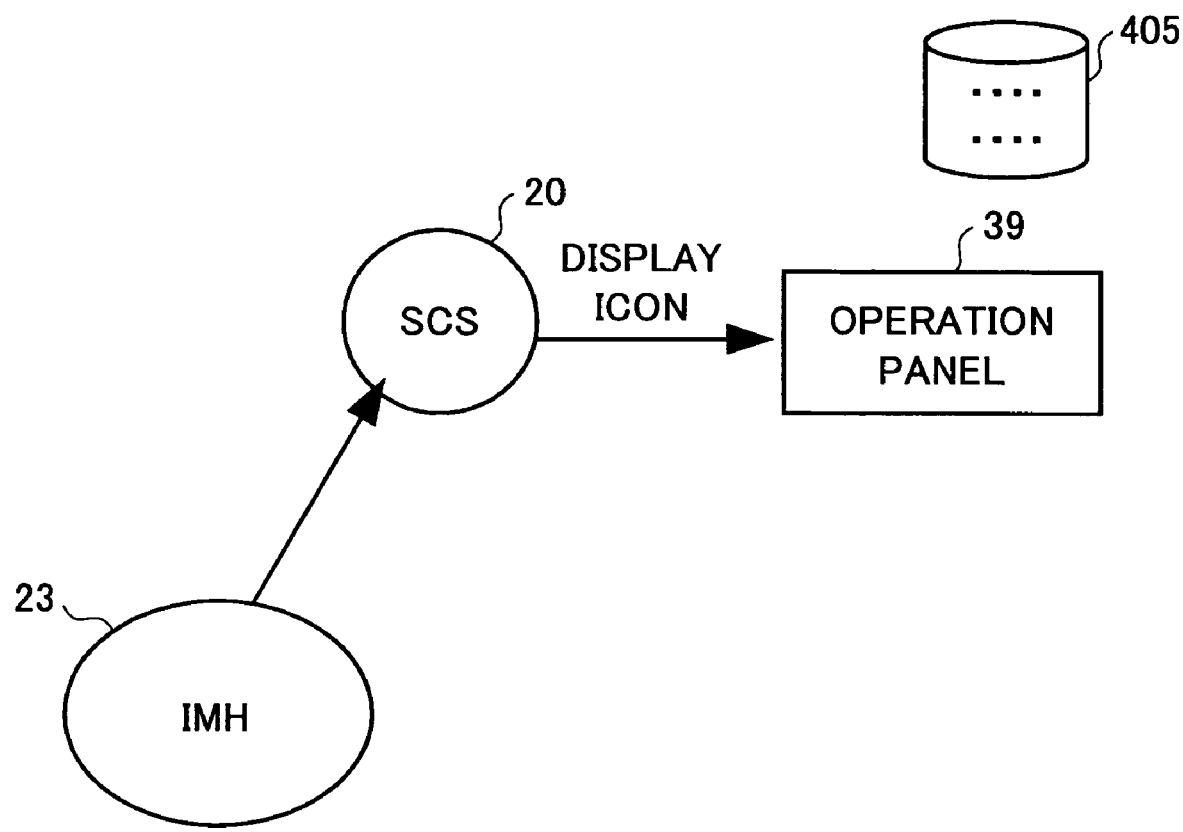
FIG. 44 is a diagram showing a dirty icon according to the third embodiment of the present invention.

When there is the cluster subject to overwrite, as shown in FIG. 44, the IMH 23 sends the SCS 20 that there is the cluster subject to overwrite. When the SCS 20 receives that there is the cluster subject to overwrite, the SCS 20 displays a dirty icon 405 showing the presence of the cluster subject to overwrite at the operation panel 39.

Figure 45:
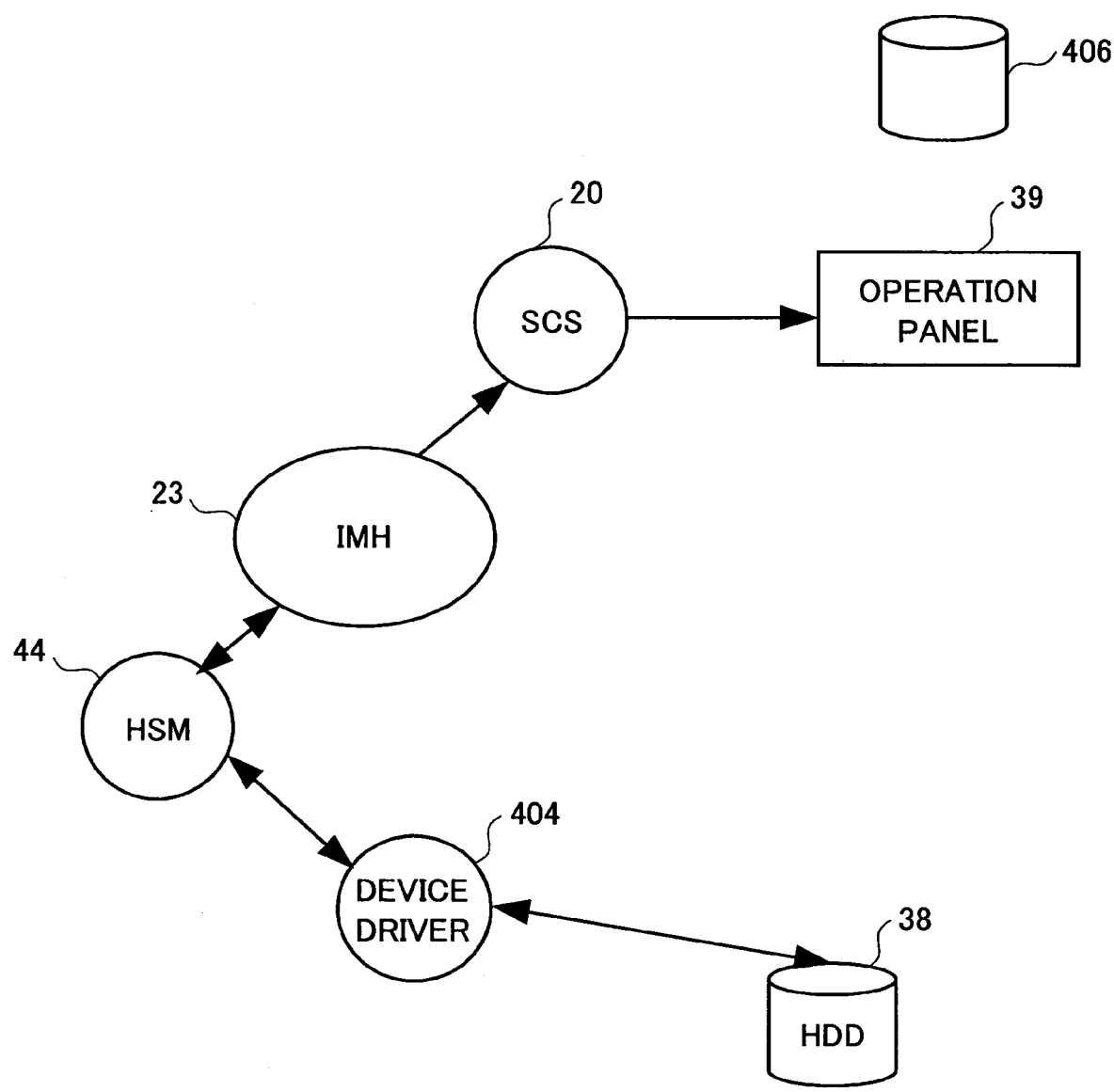
FIG. 45 is a diagram showing a clean icon according to the third embodiment of the present invention.

A case in that the cluster subject to overwrite is overwritten by the HSM 44 will be described with reference to FIG. 45. When the cluster subject to overwrite is overwritten by the HSM 44, the IMH 23 sends the SCS 20 that there is no cluster subject to overwrite. When the SCS 20 receives that there is no cluster subject to overwrite, the SCS 20 displays a clean icon 406 at the operation panel 39.

As described above, according to the third embodiment of the present invention, it is possible to erase information recorded in the hard disk (HDD 38) so as to be unreadable.

Fourth Embodiment

In the following, a management of information in the HDD 38 will be described. Hereinafter, erasing information recorded in the hard disk (for example, HDD 38 in FIG. 6) may be expressed as erasing or overwriting information recorded in the hard disk.

Figure 46:
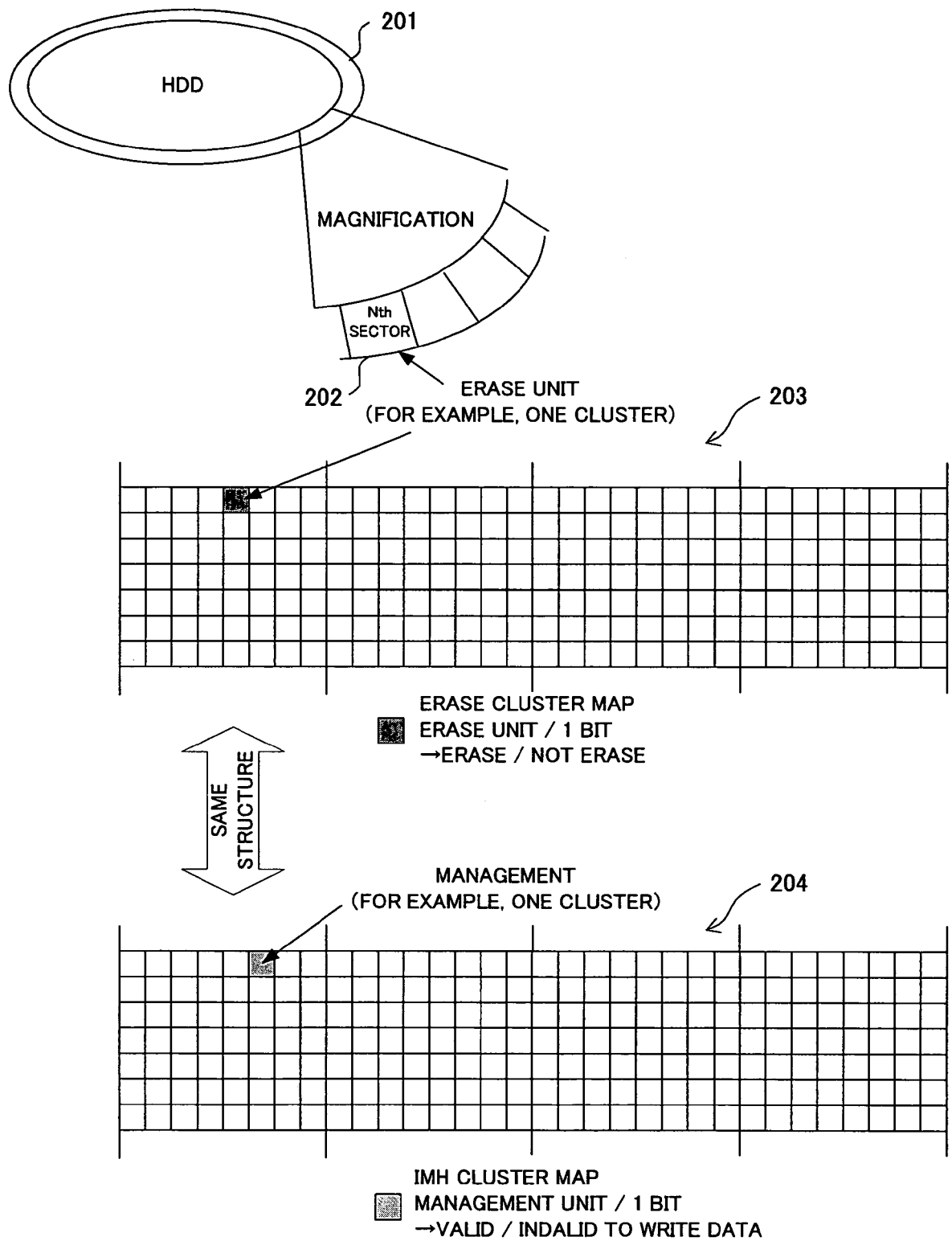
FIG. 46 is a diagram for explaining management contents of a hard disk according to a fourth embodiment of the present invention.

FIG. 46 is a diagram for explaining management contents of the HDD 38 according to a third embodiment of the present invention. In FIG. 46, a disk 201 of the HDD 38, Nth sector 202 being magnified, an erase cluster map 203, and an IMH cluster map 204 are shown. The erase cluster map 203 shows an erase unit by one bit in that the one bit indicates by showing "0" or "1" whether or not to erase a cluster corresponding to the one bit.

The IMH cluster map 203 shows a management unit by one bit in that the one bit indicates by showing "0" or "1" whether or not it is possible to write to a cluster corresponding to the one bit.

The erase cluster map 203 and the IMH cluster map 204 have the same structure in that the erase unit is equal to the management unit, and are backed up to the HDD 38. A backup of the IMH cluster map 204 in the HDD 38 corresponds to backup information.

Figure 47:
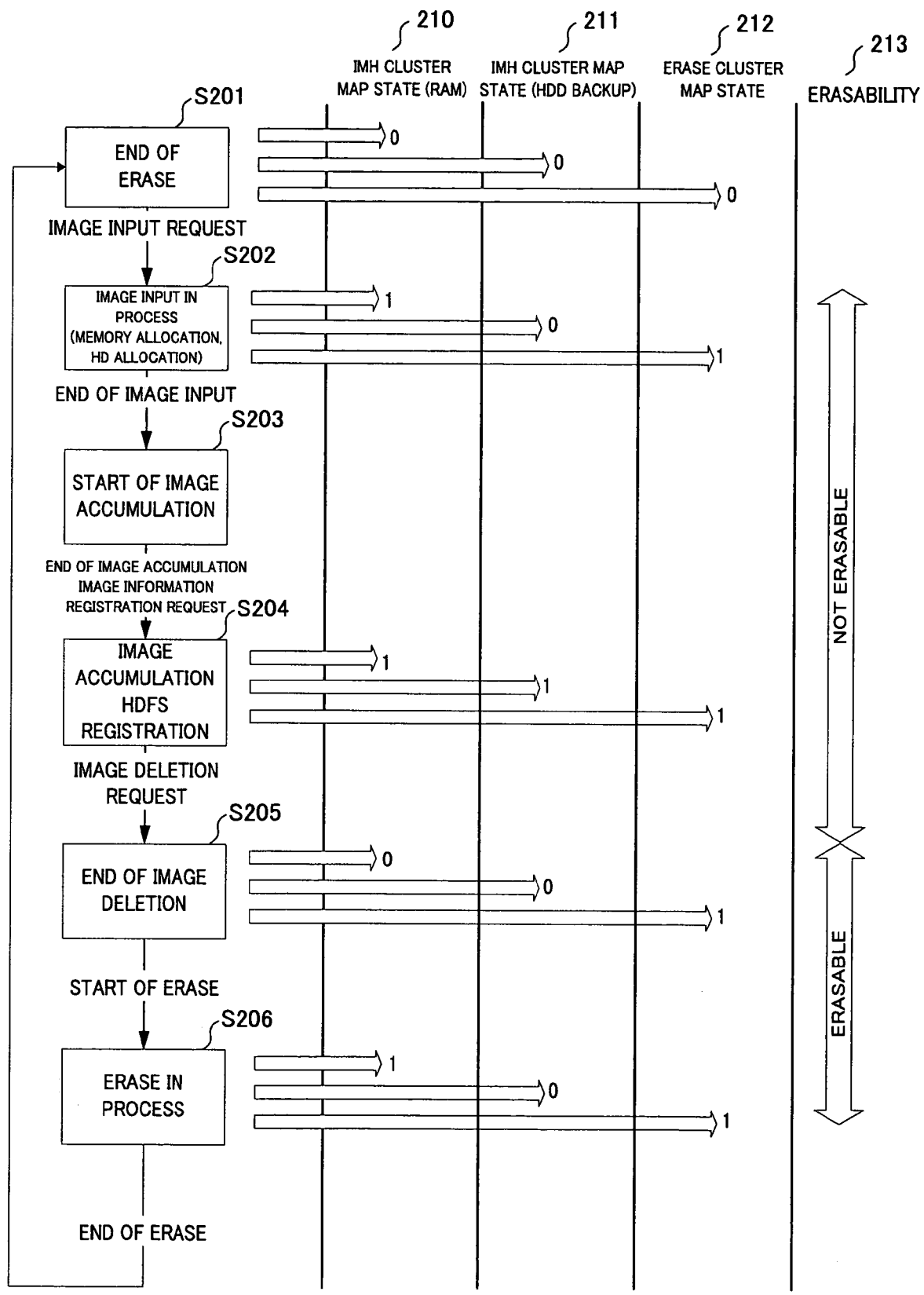
FIG. 47 is a diagram showing changes of each state of cluster maps according to the fourth embodiment of the present invention.

Changes of each state of the erase cluster map 203 and the IMH cluster map 204 will be described with reference to FIG. 47. In FIG. 47, a flowchart, an IMH cluster map state 210 in RAM corresponding to each step of the flowchart, an IMH cluster map state 211 being backed up in HDD 38, an erase cluster map state 212, and an erasability 213 are shown.

The IMH cluster map state 210s, the IMH cluster map state 211, and the erase cluster map state 212 are shown by "0" or "1". Each arrow shows a correspondence of the step and "0" or "1".

The erasability 213 shows "ERASABLE" or "NOT ERASABLE" in an arrow. A length of each arrow corresponds to a range of steps of the flowchart.

In the following, a process shown in FIG. 47 will be described. The process shown in FIG. 47 shows a process of the IMH 23, and shows a process flow in a case of a temporary storage. For example, the temporary record is erase information being recorded when a process ends, that is, to erase information concerning a copy when the copy ends in a case of conducting a simply copy. On the other hand, a record which is requested by an operator is simply called a record, and this case will be described later.

Step S201 is a step conducted when an erasing process ends. However, when step S201 is a first step of the entire process shown in FIG. 47, step S201 is simply a start step for the entire process, instead of the end of the entire process. In this case, step S201 is the start of the entire process. All the IMH cluster map state 210, the IMH cluster map state 211, and the erase cluster map state 212 are set to be "0".

In step S202, a process for inputting an image is being conducted by an image input request. In this case, both the IMH cluster map state 210 and the erase cluster map state 212 are set to be "!", and the IMH cluster map state 211 set to be "0". From step S202, it becomes impossible to erase information.

When the image input ends, a process for an image accumulation start is conducted in step S203. When the image accumulation ends, a process for an image accumulation HDFS registration is conducted in step S204. Then, the IMH cluster map state 211 is set to be "1".

Next, in step S205, an image deletion ends after an image deletion request. Then, the IMH cluster map state 210 and the IMH cluster map state 211 are set to be "0". In addition, from step S205, it becomes possible to conduct the erasing process. When the erasing process is started and is being conducted in step S206, the IMH cluster map state 210 is set to be "1". When the erasing process ends, step S201 is processed again and all the IMH cluster map state 210, the IMH cluster map state 211, and the erase cluster map state 212 are set to be "0".

Figure 48:
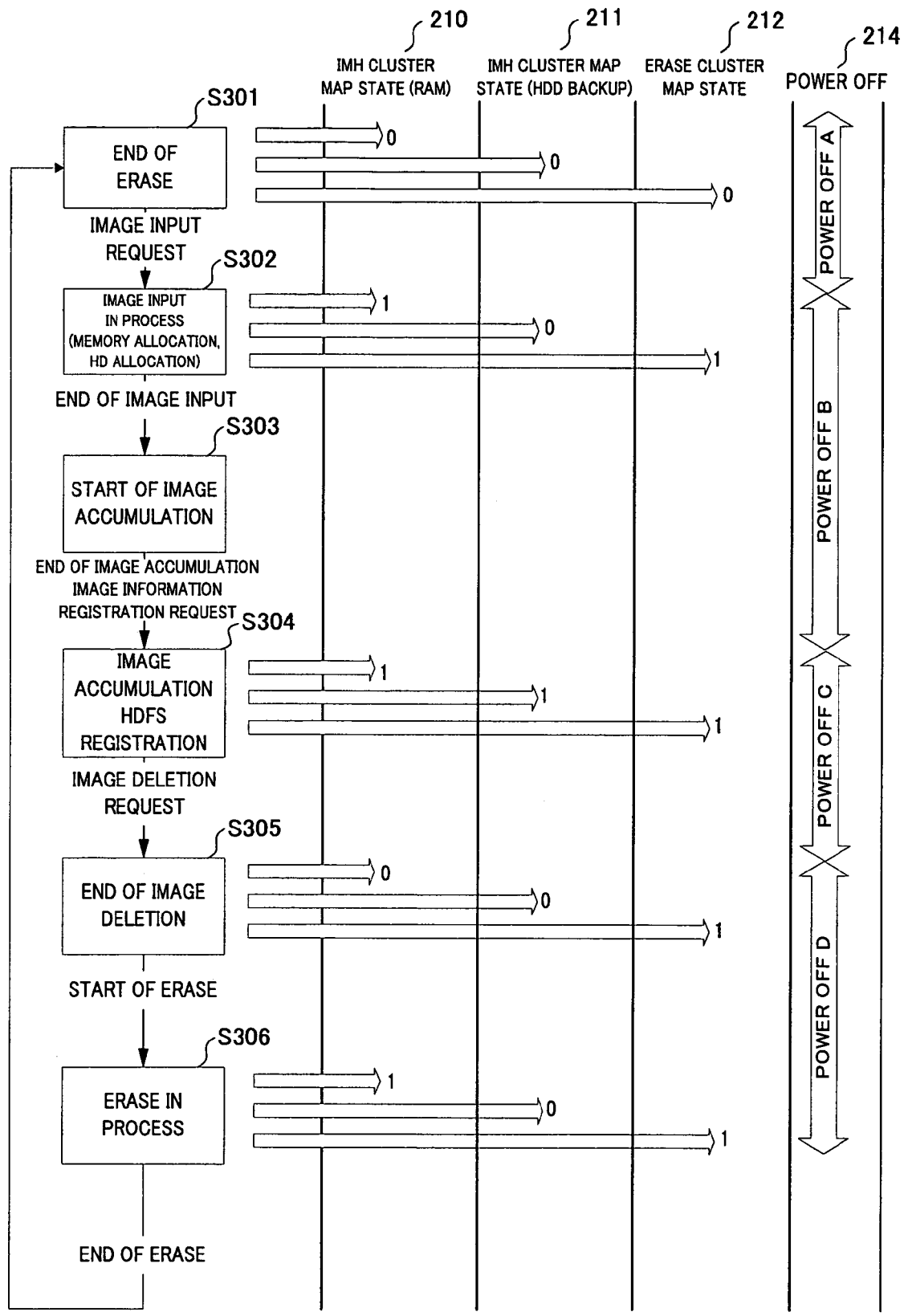
FIG. 48 is a diagram changes of each state of cluster maps according to the fourth embodiment of the present invention.

Next, a relationship between each of the IMH cluster map state 210, the IMH cluster map state 211, and the erase cluster map state 212 and power will be described with reference to FIG. 48. In this case, a process for each of the IMH cluster map state 210, the IMH cluster map state 211, and the erase cluster map state 212 is different when the power is shut down. Moreover, a power off 214 in FIG. 48 shows a range where the same process is conducted when the power is shut down.

Step S301 shows a step when the erasing process ends. However, similar to step S201 in FIG. 47, when step S301 is a first step of the entire process shown in FIG. 48, step S301 is simply a start step for the entire process, instead of the end the entire process. In this case, step S301 is the start of the entire process. All the IMH cluster map state 210, the IMH cluster map state 211, and the erase cluster map state 212 are set to be "0". The power OFF 214 shows a range "POWER OFF A".

In step S302, a process for inputting an image is being conducted by an image input request. In this case, both the IMH cluster map state 210 and the erase cluster map state 212 are set to be "1", and the IMH cluster map state 211 set to be "0". From step S302, the power OFF 214 shows a range "POWER OFF B".

When the image input ends, a process for an image accumulation start is conducted in step S303. When the image accumulation ends, a process for an image accumulation HDFS registration is conducted in step S304. Then, the IMH cluster map state 211 is set to be "1". From step S304, the power OFF 214 shows a range "POWER OFF C".

Next, in step S305, an image deletion ends after an image deletion request. Then, the IMH cluster map state 210 and the IMH cluster map state 211 are set to be "0". From step S305, the power OFF 214 shows a range "POWER OFF D". The erasing process starts and is being conducted in step S306, and the IMH cluster map state 210 is set to be "1". When the erasing process ends, step S301 is processed again and all the IMH cluster map state 210, the IMH cluster map state 211, and the erase cluster map state 212 are set to be "0". The power OFF 214 shows the range "POWER OFF A" again.

Figure 49:
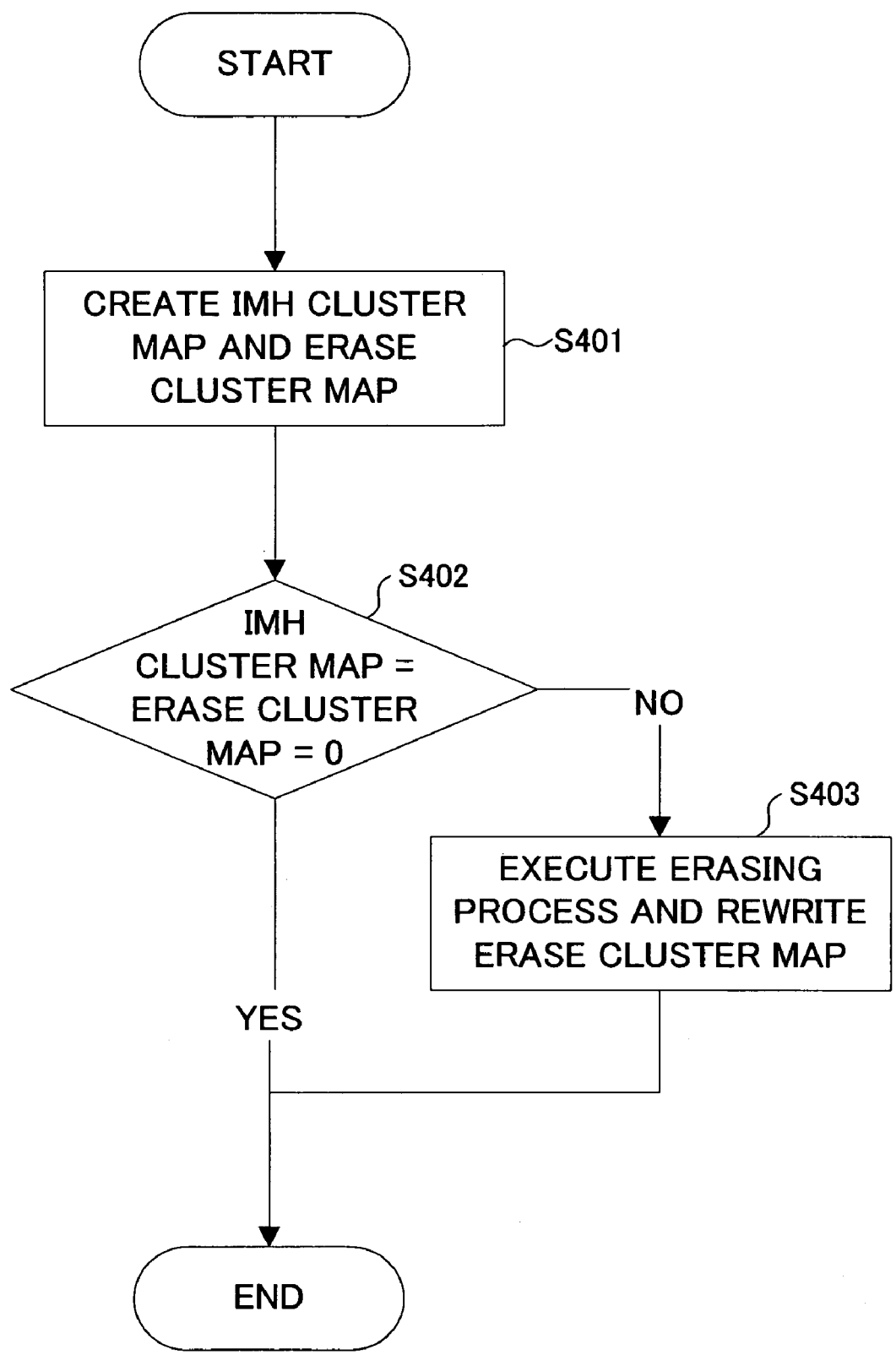
FIG. 49 is a flowchart for explaining an erase determination process according to the fourth embodiment of the present invention.

Next, an erase determination process for the temporary record after the power is shut down and is turned on again will be described based on the ranges described above with reference to a flowchart shown in FIG. 49.

In step S401, the IMH cluster map 204 and the erase cluster map 203 are created in the RAM. In step S402, it is determined whether or not both the IMH cluster map 204 and the erase cluster map 203 are equal to "0". That is, it is determined whether or not the power is shut down in the range "POWER OFF A".

When both the IMH cluster map 204 and the erase cluster map 203 are equal to "0", the erase determination process is terminated. On the other hand, when both the IMH cluster map 204 and the erase cluster map 203 are not equal to "0", the erasing processing is executed, the erase cluster map 204 is rewritten in step S403, and the erase determination process is terminated. Step S403 corresponds to erasing a hard disk.

Figure 50:
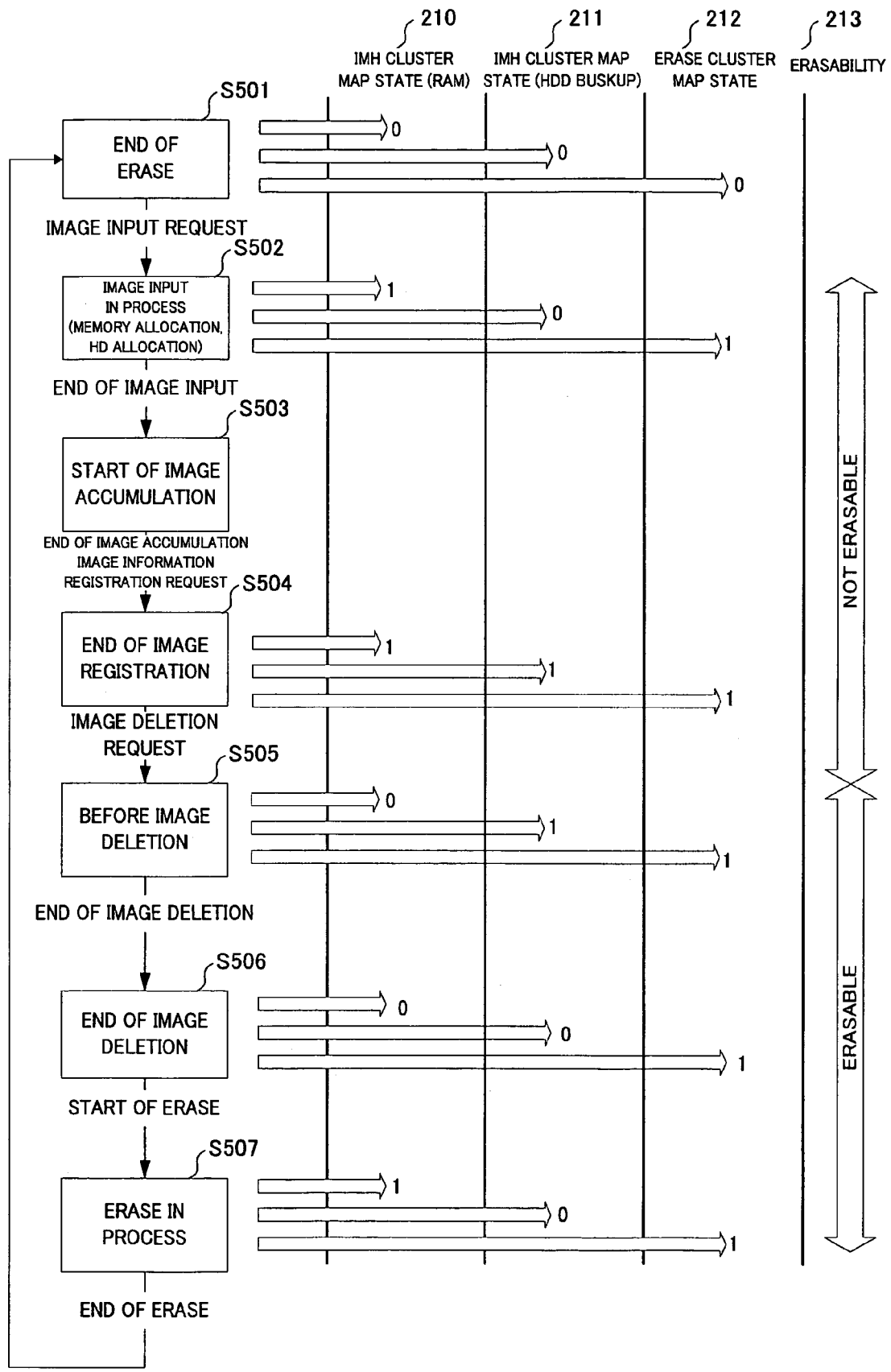
FIG. 50 is a diagram showing changes of each state of the cluster maps according to the fourth embodiment of the present invention.

In the following, instead of the temporary record described above, a process for a record (other than the temporary record) will be described with reference to FIG. 50.

Step S501 shows a step when the erasing process ends. However, when step S501 is a first step of the entire process shown in FIG. 50, step S501 is simply a start step for the entire process, instead of the end the entire process. In this case, step S501 is the start of the entire process. All the IMH cluster map state 210, the IMH cluster map state 211, and the erase cluster map state 212 are set to be "0".

In step S502, a process for inputting an image is being conducted by an image input request. In this case, both the IMH cluster map state 210 and the erase cluster map state 212 are set to be "!", and the IMH cluster map state 211 set to be "0". From step S502, it becomes impossible to conduct the erasing process.

When the image input ends, a process for an image accumulation start is conducted in step S503. When the image accumulation ends, a process for an image accumulation HDFS registration is conducted in step S504. Then, the IMH cluster map state 211 is set to be "1".

Next, in step S505, each of the IMH cluster map state 210, the IMH clustermap state 211, and the erase cluster map state 212 is shown before the image deletion by an image deletion request. In this case, the IMH cluster map state 210 is set to be "0". From step S505, it becomes possible to conduct the erasing process. In step S506, the image deletion is terminated. In this case, the IMH cluster map state 210 and the IMH cluster map state 211 are set to be "0". When the erasing process starts and the erasing process is being conducted in step S507, the IMH cluster map state 210 is set to be "1". Then, the erasing process is terminated, and then step S501 is conducted again. All the IMH cluster map state 210, the IMH cluster map state 211, and the erase cluster map state 212 are set to be "0".

Figure 51:
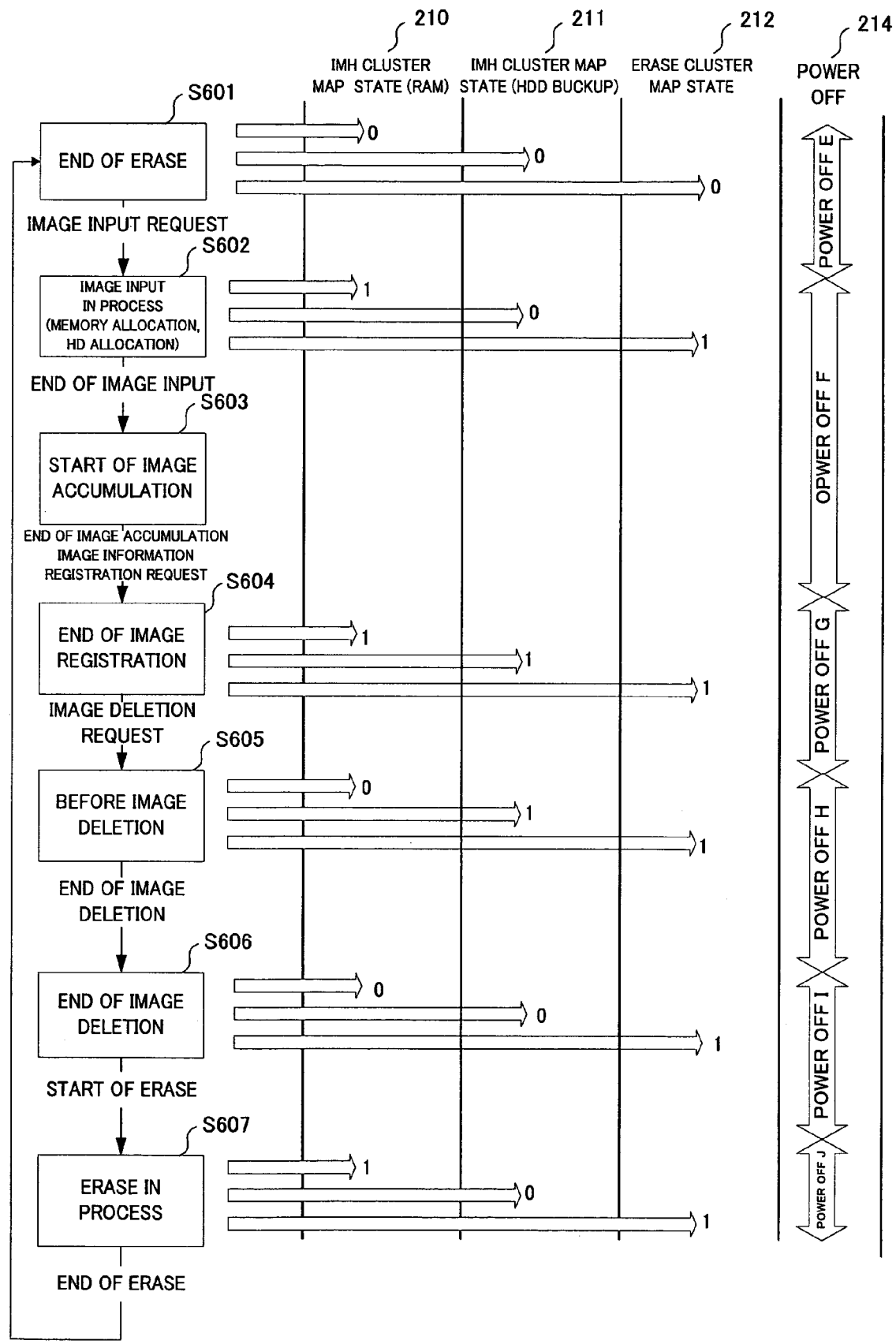
FIG. 51 is a diagram showing changes of each state of the cluster maps according to the fourth embodiment of the present invention.

Next, a relationship between each of the IMH cluster map state 210, the IMH cluster map state 211, and the erase cluster map state 212 and power in the record (other than the temporary record) will be described with reference to FIG. 51.

Step S601 shows a step when the erasing process ends. However, when step S601 is a first step of the entire process shown in FIG. 51, step S601 is simply a start step for the entire process, instead of the end the entire process. In this case, step S601 is the start of the entire process. All the IMH cluster map state 210, the IMH cluster map state 211, and the erase cluster map state 212 are set to be "0". The power OFF 214 shows a range "POWER OFF E".

In step S602, a process for inputting an image is being conducted by an image input request. In this case, both the IMH cluster map state 210 and the erase cluster map state. 212 are set to be "!", and the IMH cluster map state 211 set to be "0". From step S602, the power OFF 214 shows a range "POWER OFF F".

When the image input ends, a process for an image accumulation start is conducted in step S603. When the image accumulation ends, a process for an image accumulation HDFS registration is conducted in step S604. Then, the IMH cluster map state 211 is set to be "1". From step S604, the power OFF 214 shows a range "POWER OFF G".

Next, in step S605, each of the IMH cluster map state 210, the IMH cluster map state 211, and the erase cluster map state 212 is shown before the image deletion by an image deletion request. In this case, the IMH cluster map state 210 is set to be "0". From step S605, the power OFF 214 shows a range "POWER OFF H".

In step S506, the image deletion is terminated. The IMH cluster map state 211 is set to be "0". From step S606, the power OFF 214 shows a range "POWER OFF I". When the erasing process starts and the erasing process is being conducted in step S607, the IMH cluster map state 210 is set to be "1". Then, the erasing process is terminated, and then step S601 is conducted again. All the IMH cluster map state 210, the IMH cluster map state 211, and the erase cluster map state 212 are set to be "0". The power OFF 214 shows a range "POWER OFF E".

Figure 52:
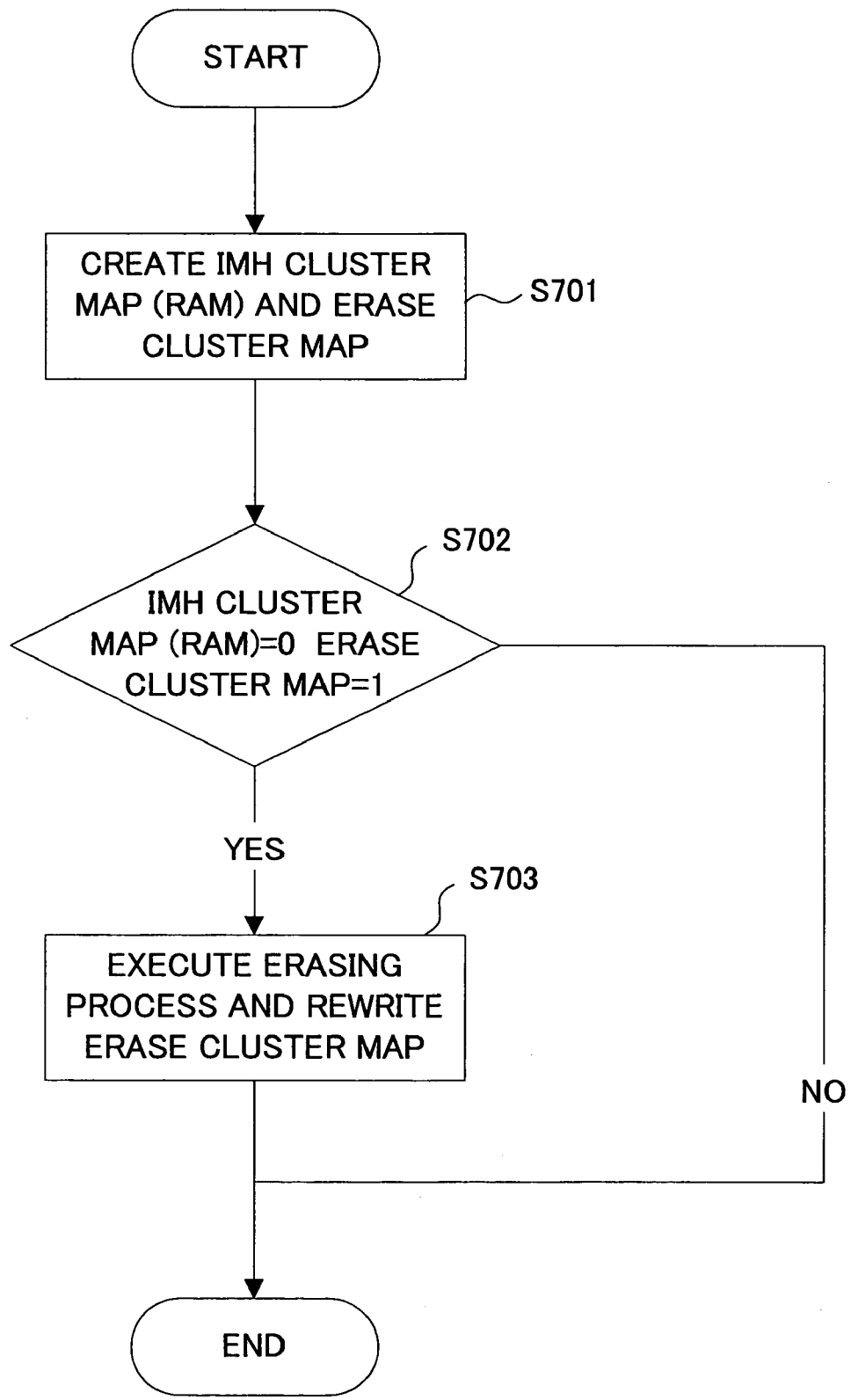
FIG. 52 is a flowchart for explaining an erase determination process according to the fourth embodiment of the present invention.

Next, an erase determination process for the record after the power is shut down and is turned on again will be described based on the ranges described above with reference to a flowchart shown in FIG. 52.

In step S701, the IMH cluster map 204 and the erase cluster map 203 are created in the RAM. In step S702, it is determined whether or not the IMH cluster map 204 is equal to "0" and the erase cluster map 203 is equal to "1". That is, it is determined whether or not the power is shut down in the range "POWER OFF F", "POWER OFF I", and "POWER OFF J".

When a determination result in step S702 shows "NO", the erase determination process is terminated. On the other hand, when the determination result shows "YES", the erasing process is executed and the erase cluster map 204 is rewritten and then the erase determination process is terminated. Step S703 corresponds to erasing hard disk.

Figure 53:
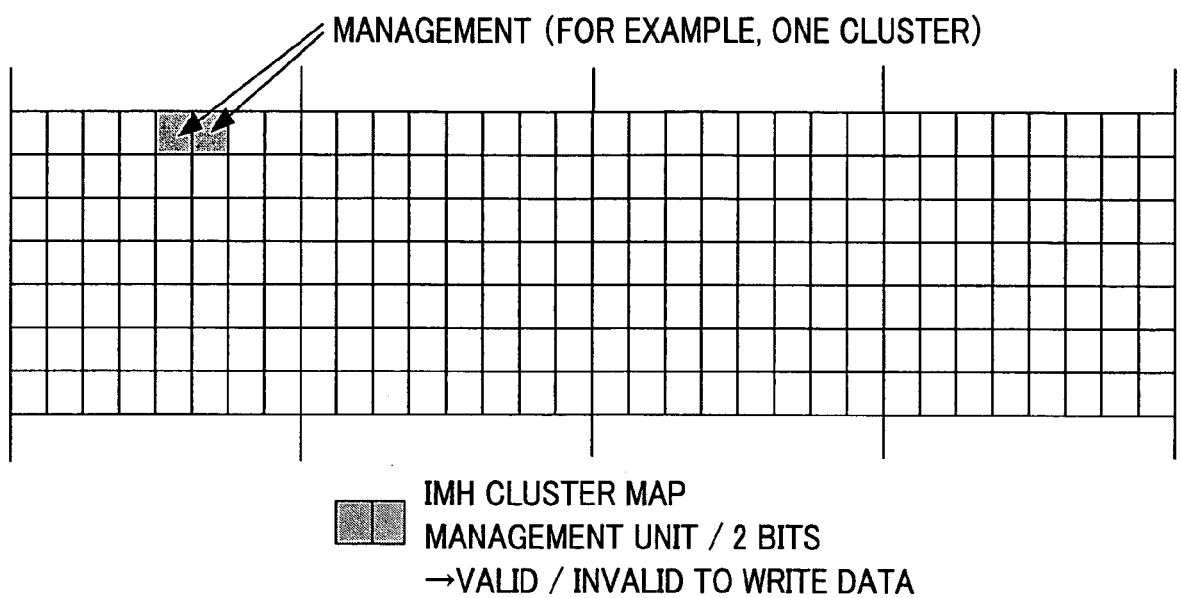
FIG. 53 is a diagram showing a management of one cluster by two bits according to the fourth embodiment of the present invention.

As described above, one bit is used as the management unit. In the following, a case in that two bits are used as the management unit will be described. In detail, as shown in FIG. 53, one cluster is managed by two bits in the IMH cluster map 204. A value can show four values from "0" to "4" by two bits. Thus, in the fourth embodiment, a value "0" shows that a cluster has been already erased and can be rewritten, a value "1" shows that a cluster is not fixed since an image is not recorded and cannot be rewritten, a value "2" shows that a cluster is fixed since the image is recorded and cannot be rewritten, a value "3" shows that a cluster is a subject to erase.

Figure 54:
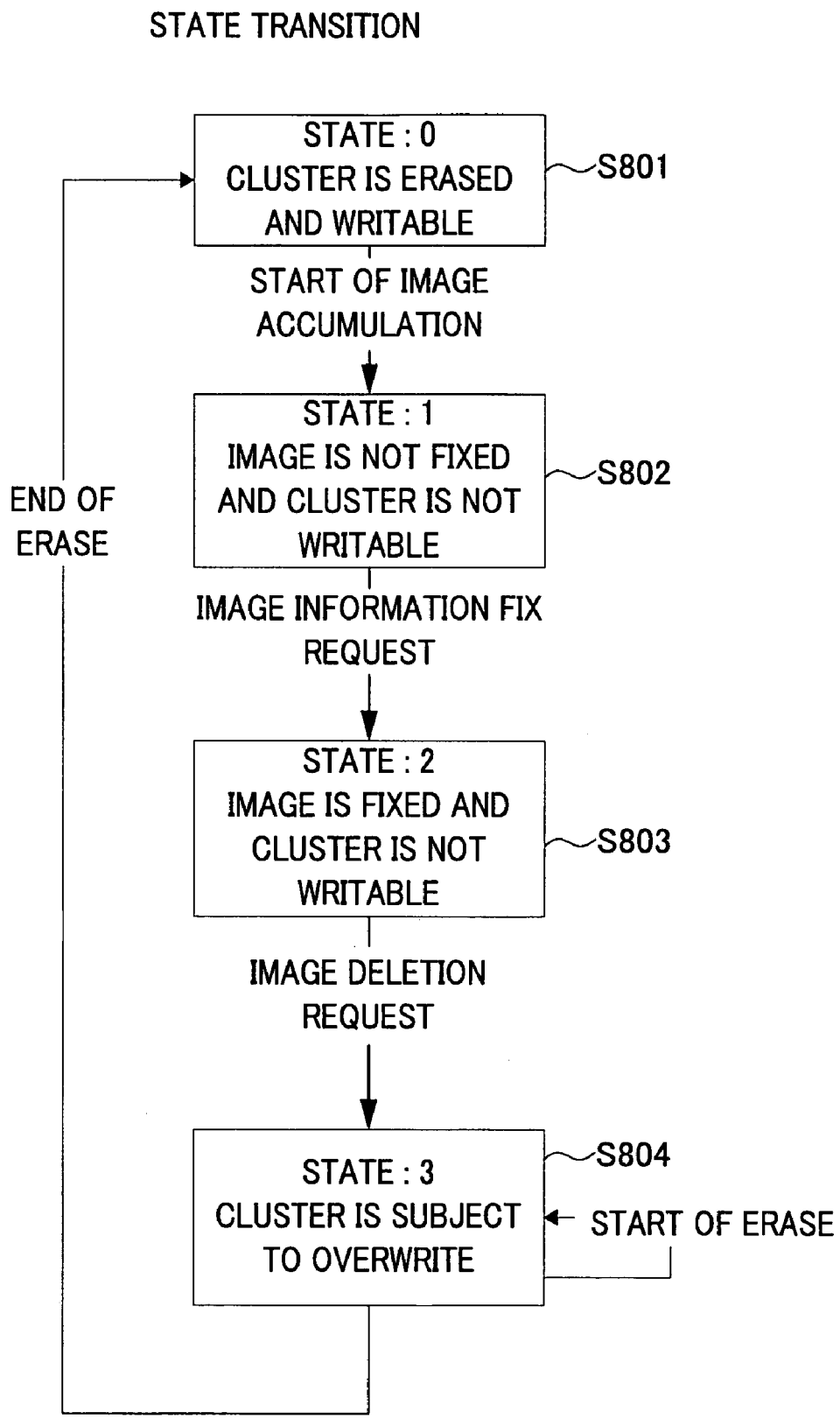
FIG. 54 is a flowchart for explaining a state transition according to the fourth embodiment of the present invention.

As described above, a process flow concerning a state transition in a case in that two bits are used as the management unit will be described with reference to FIG. 54, step S801 shows a state as a state 0 in that a cluster is erased and writable. When the image accumulation starts, in step S802, the state shows as a state 1 that the image is not fixed in the cluster and the cluster is not writable. By an image information fix request, the state shows as a state 2 that the image is fixed in the cluster and the cluster is not writable. By an image deletion request, in step S804, the state shows as a state 3 that the cluster becomes a subject to overwrite. When the erasing process is terminated, the state shows again that the cluster has been already erased and is writable.

Figure 55:
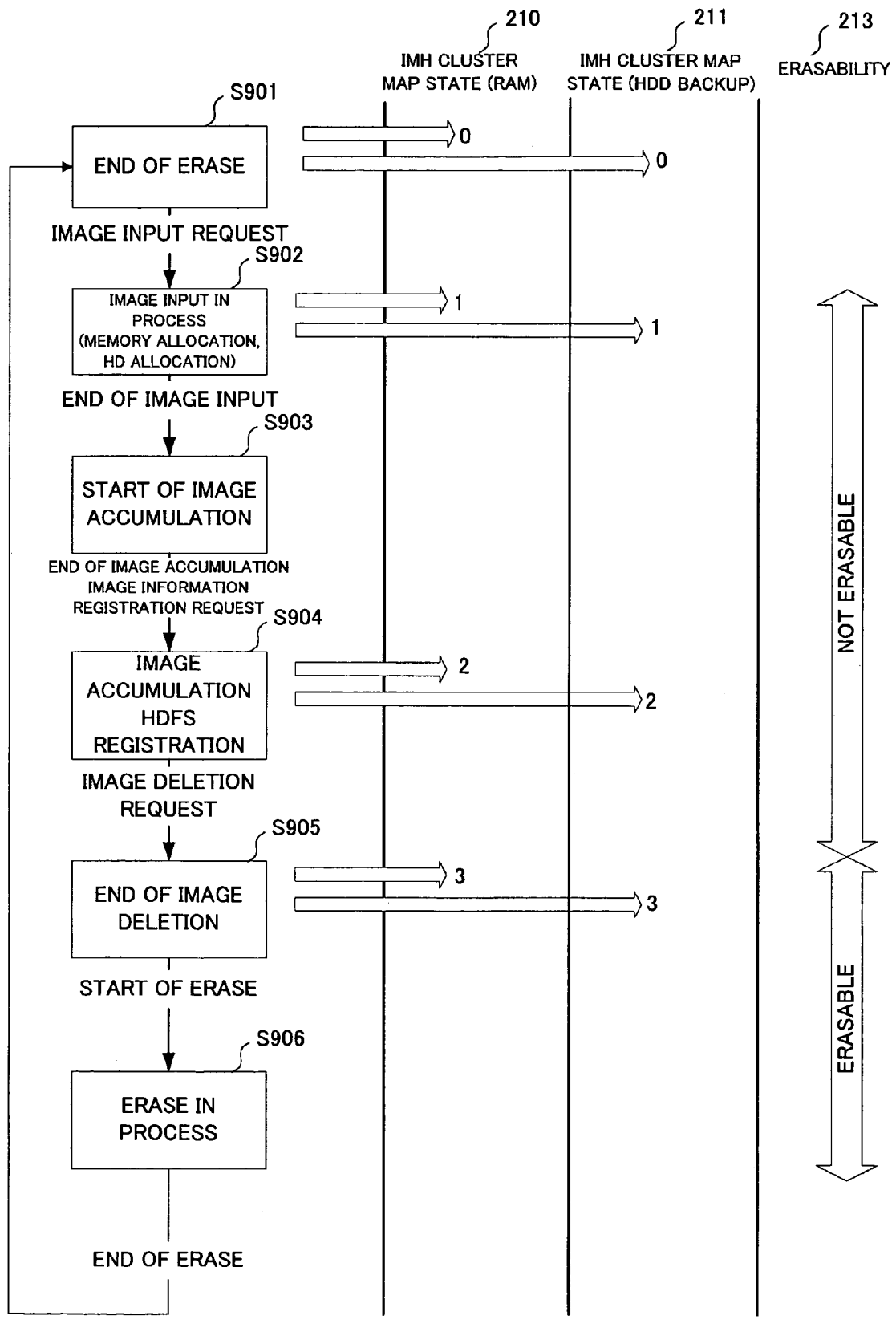
FIG. 55 is a diagram showing changes of each cluster maps according to the fourth embodiment of the present invention.

Changes of each state of the erase cluster map 203 and the IMH cluster map 204 in a case of using two bits as the management unit will be described with reference to FIG. 55. In FIG. 55, step S901 shows a step conducted when the erasing process ends. However, when step S901 is a first step of the entire process shown in FIG. 55, step S901 is simply a start step for the entire process, instead of the end of the entire process. In this case, step S901 is the start of the entire process. All the IMH cluster map state 210 and the IMH cluster map state 211 are set to be "0".

In step S902, a process for inputting an image is being conducted by an image input request. In this case, both the IMH cluster map state 210 and the erase cluster map state 212 are set to be "1". From step S902, it becomes impossible to erase information.

When the image input ends, a process for an image accumulation start is conducted in step S903. When the image accumulation ends, a process for an image accumulation HDFS registration is conducted in step S904. Then, the IMH cluster map state 210 and the IMH cluster map state 211 are set to be "2".

Next, in step S905, an image deletion ends after an image deletion request. In this case, the IMH cluster map state 210 and the IMH cluster map state 211 are set to be "3". In addition, from step S205, it becomes possible to conduct the erasing process. The erasing process is started and is being conducted in step S906. When the erasing process ends, step S901 is processed again and the IMH cluster map state 210 and the IMH cluster map state 211 are set to be "0".

Figure 56:
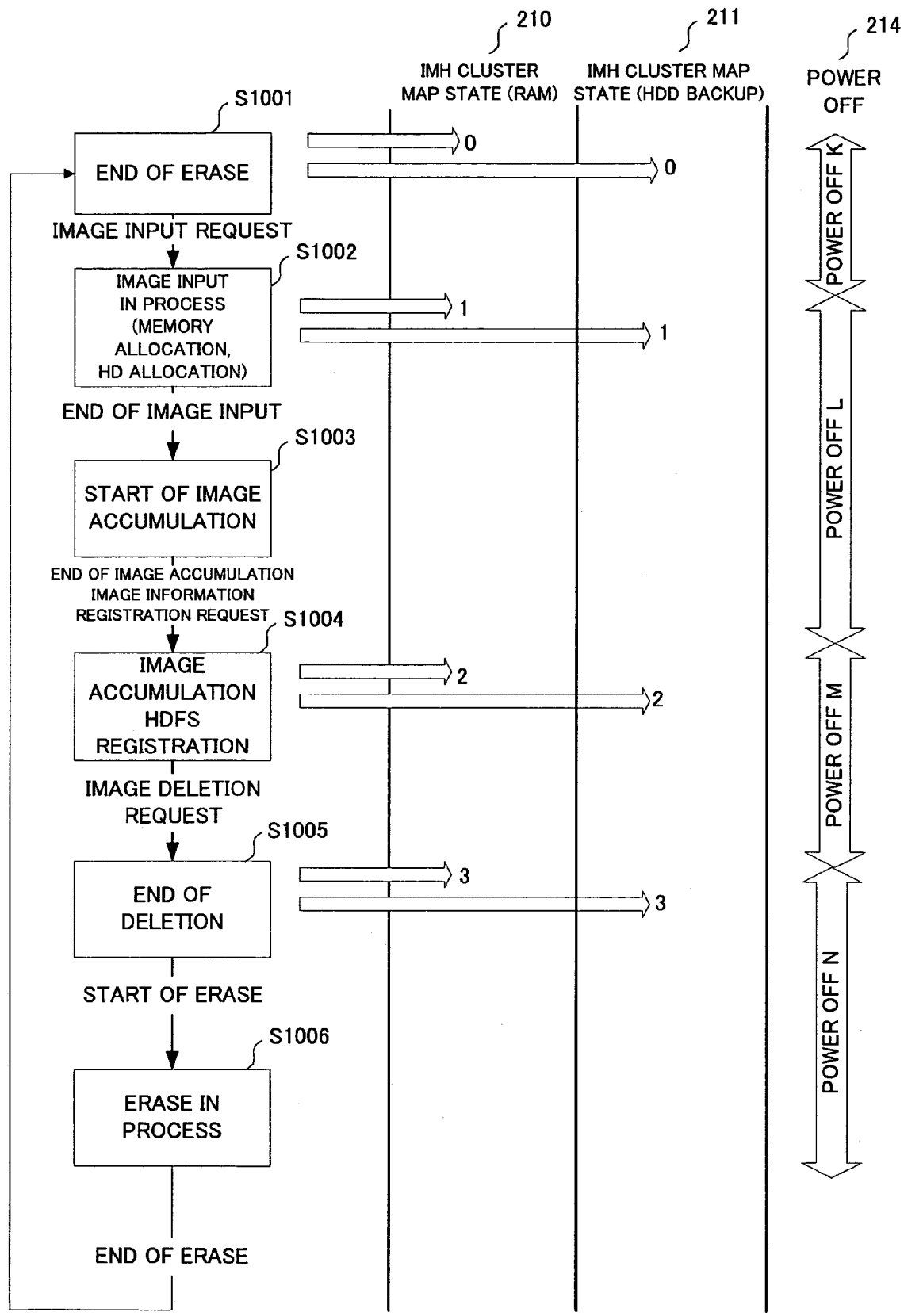
FIG. 56 is a diagram showing changes of each cluster maps according to the fourth embodiment of the present invention.

Next, a relationship between each of the IMH cluster map state 210 and the IMH cluster map state 211 and power will be described with reference to FIG. 56. Step S1001 shows a step when the erasing process ends. However, when step S1001 is a first step of the entire process shown in FIG. 56, step S1001 is simply a start step for the entire process, instead of the end the entire process. In this case, step S1001 is the start of the entire process the IMH cluster map state 210 and the IMH cluster map state 211 are set to be "0". The power OFF 214 shows a range "POWER OFF K".

In step S1002, a process for inputting an image is being conducted by an image input request. In this case, both the IMH cluster map state 210 and the erase cluster map state 212 are set to be "1". From step S1002, the power OFF 214 shows a range "POWER OFF L".

When the image input ends, a process for an image accumulation start is conducted in step S1003. When the image accumulation ends, a process for an image accumulation HDFS registration is conducted in step S1004. Then, the IMH cluster map state 210 and the IMH cluster map state 211 are set to be "2". From step S1004, the power OFF 214 shows a range "POWER OFF M".

Next, in step S1005, an image deletion ends after an image deletion request. Then, the IMH cluster map state 210 and the IMH cluster map state 211 are set to be "3". From step S1005, the power OFF 214 shows a range "POWER OFF N". The erasing process starts and is being conducted in step S1006.

When the erasing process ends, step S1001 is processed again and the IMH cluster map state 210 and the IMH cluster map state 211 are set to be "0". The power OFF 214 shows the range "POWER OFF K" again.

Figure 57:
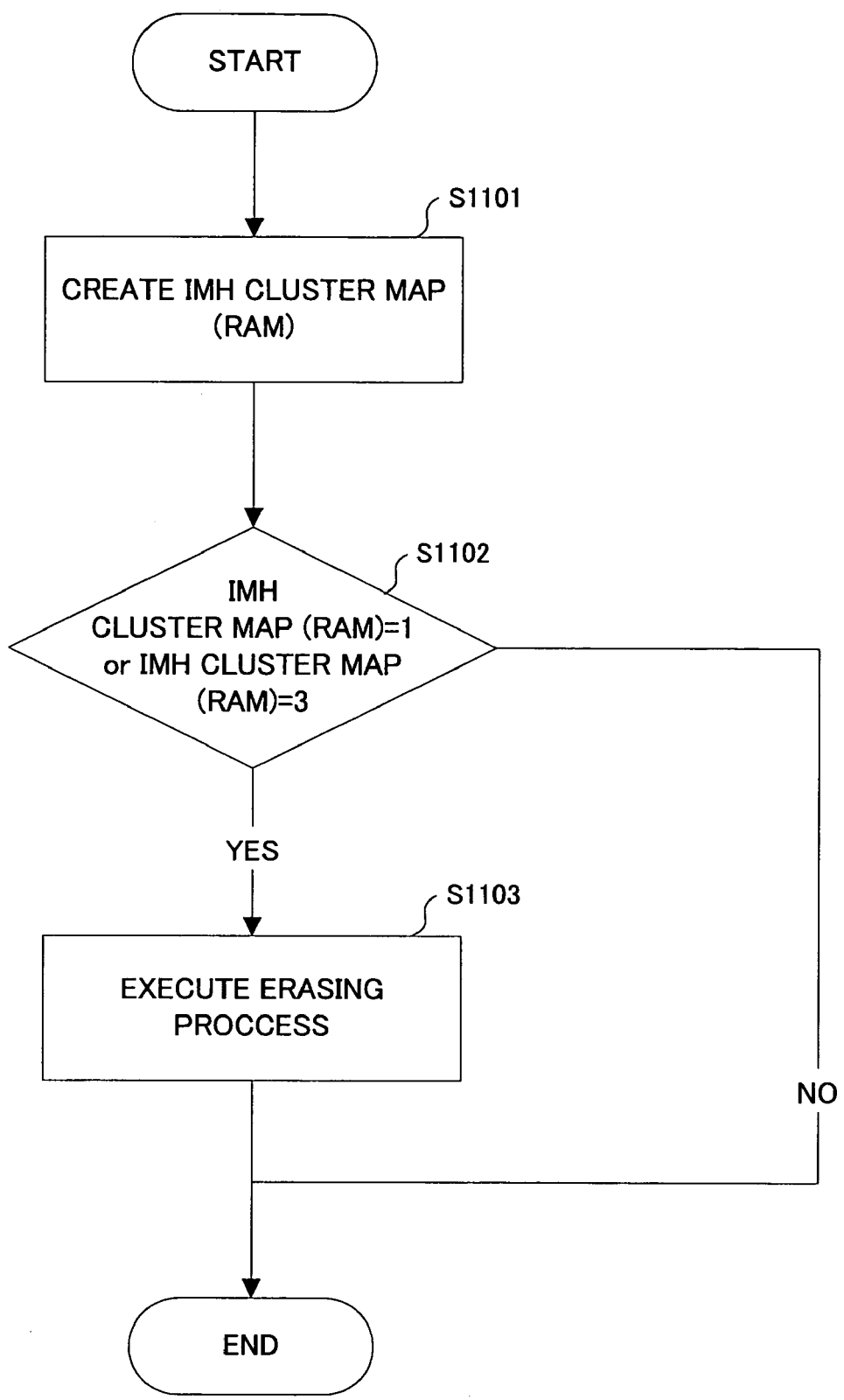
FIG. 57 is a flowchart for explaining an erase determination process according to the fourth embodiment of the present invention.

Next, an erase determination process for the temporary record after the power is shut down and is turned on again will be described based on the ranges described above with reference to a flowchart shown in FIG. 57.

In step S1101, the IMH cluster map 204 is created in the RAM. In step S1102, it is determined whether or not the IMH cluster map state 210 is equal to "1" or "3". That is, it is determined whether or not the power is shut down in the ranges "POWER OFF L" and "POWER OFF N".

When the IMH cluster map state 210 is not equal to "1" and "3", the erase determination process is terminated. On the other hand, when the IMH cluster map state 210 is equal to "1" or "3", the erasing processing is executed, the erase cluster map 204 is rewritten in step S1103, and the erase determination process is terminated.

Figure 58:
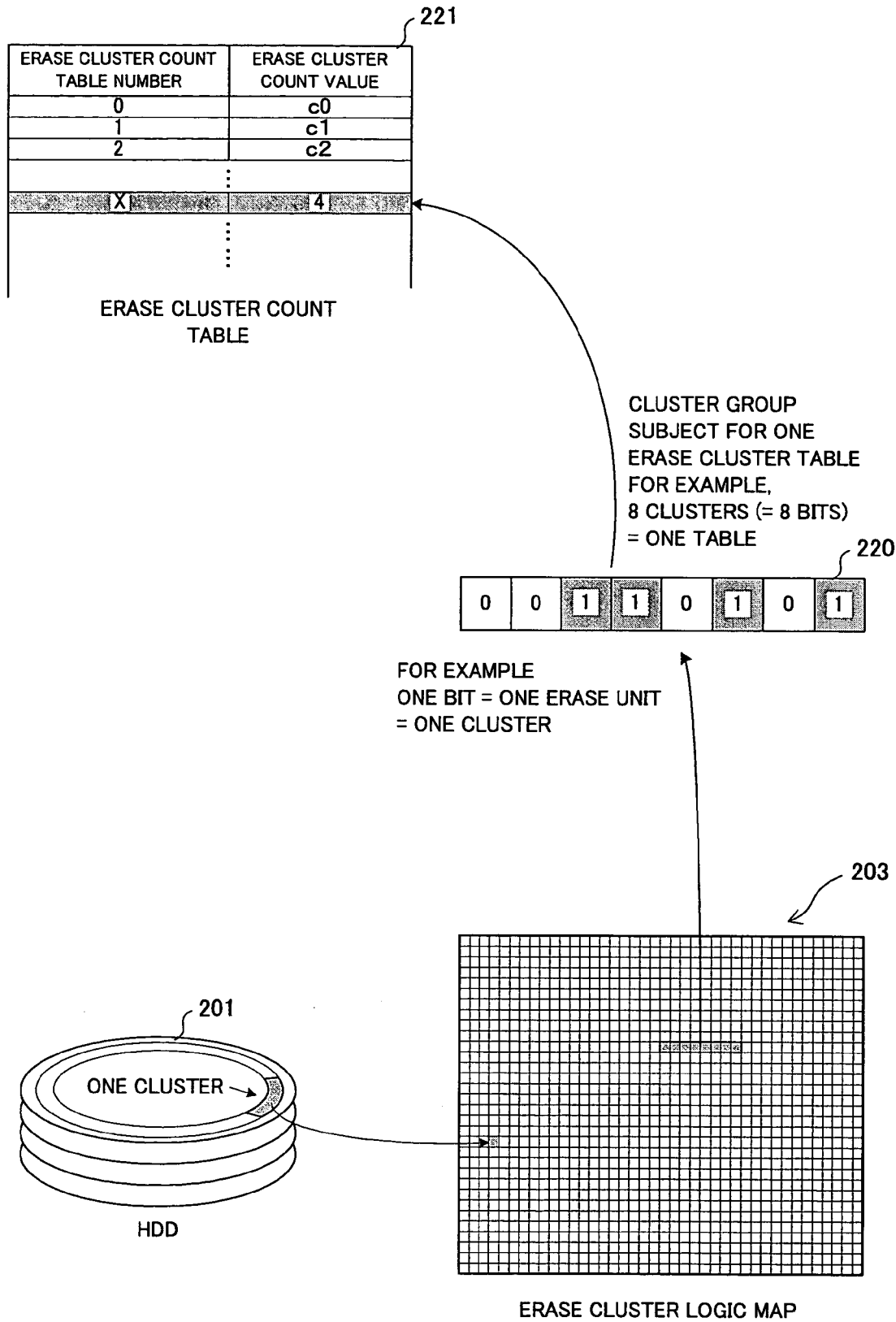
FIG. 58 is a diagram explaining how to determine validity of an erase cluster map according to the fourth embodiment of the present invention.

As described above, the case in that the erase cluster map 203 is used is described. In the following, a validity determination process for the erase cluster map 203 will be described from two different aspects. First, a first aspect of the validity determination process will be described with reference to FIG. 58. In FIG. 58, a check table 221 for an erase cluster count table corresponding to erase count check information, an erase cluster count table 220 corresponding to erase count information, the n erase cluster map 203, and the disk 201 of the HDD 38 are shown.

In FIG. 58, the erase clustermap 203 and the disk 201 are described above, and the explanation thereof will be omitted. The erase cluster count table 220 is a table where the erase cluster map 203 is sectioned every 8 clusters. In this case, since one bit represents one cluster, the erase cluster count table 220 is shown by one byte.

The check table 221 for the erase cluster count table 221 includes an erase cluster count table number, and an erase cluster count value. The erase cluster count table number shows a number which is assigned to each erase cluster count table 220. The erase cluster count value shows a total number of bits (hereinafter, called erase subject bits) which belongs to the erase cluster count table 220 and is "1". Accordingly, in a case of the erase cluster count table 220 in FIG. 58, the erase cluster count value is "4". Thus, in a case in that the erase cluster count table number of the erase cluster count table 220 shows "X", it is determined that the erase cluster count table 220 is valid from the check table 221.for the erase cluster count table 220.

Figure 59:
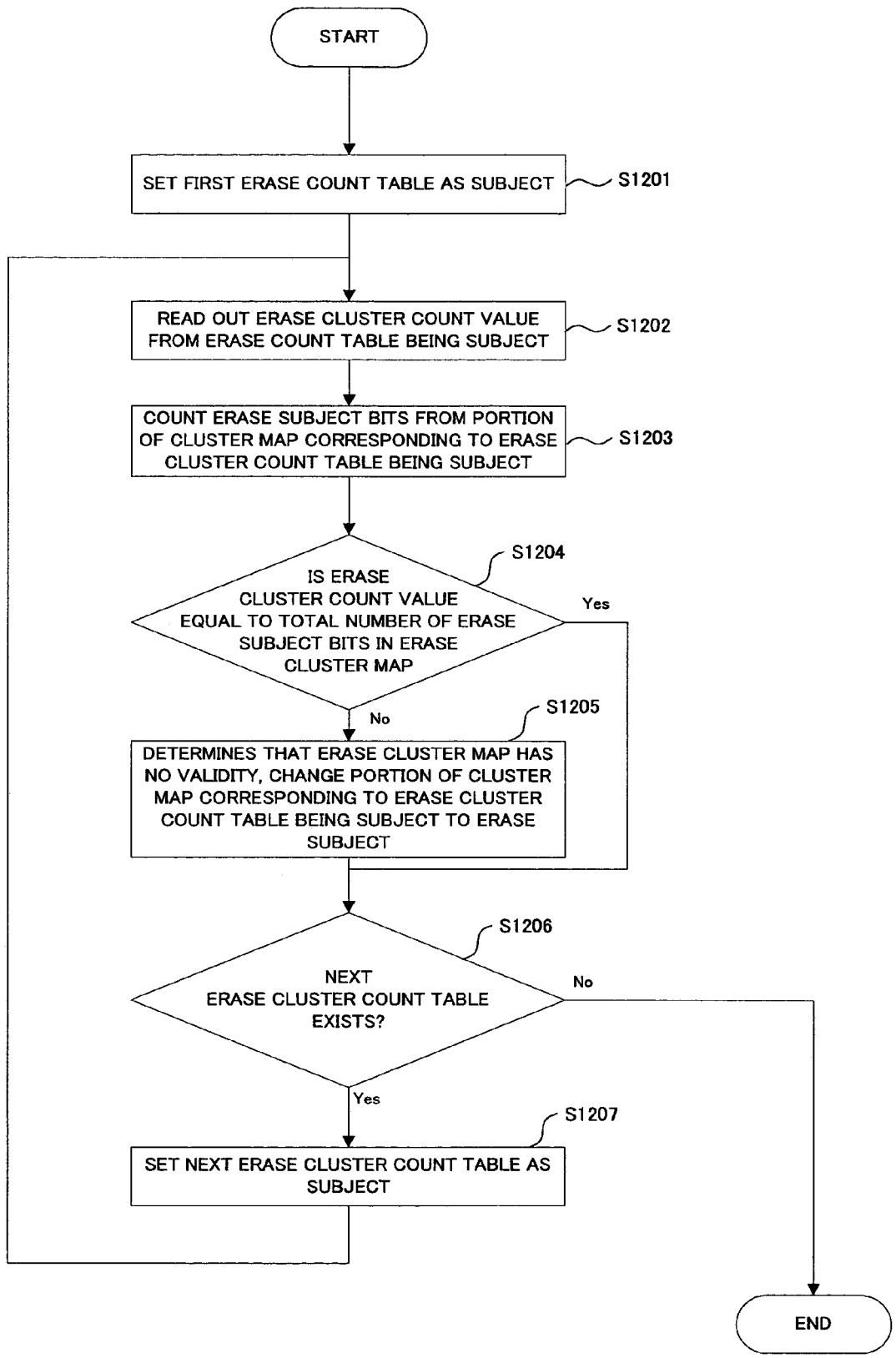
FIG. 59 is a flowchart for explaining a first aspect of a validity process according to the fourth embodiment of the present invention.

A flowchart for a process concerning validity using the check table 221 for the erase cluster count table 220 will be described with reference to FIG. 59. In step S1201, the HSM 44 sets a first erase cluster count table 220 of the check table 221 for the erase cluster count table 220 to be a subject to determine the validity. Next, the HSM 44 reads out the erase cluster count value of the erase cluster count table 220 set as the subject to determine the validity in step S1202. Subsequently, the HSM 44 counts the erase subject bits from a portion of a cluster map corresponding to the erase cluster count table 220 set as the subject to determine the validity in step S1203.

Next, the HSM 44 determines whether or not the erase cluster count value is equal to the total number of bits subject to erase in the erase cluster map in step S1204. When the erase cluster count value is equal to the total number of bits subject to erase in the erase cluster map, the process for determining the validity goes to step S1206. Step S1206 corresponds to determining validity. When the erase cluster count value is not equal to the total number of bits subject to erase in the erase cluster map, the HSM 44 determines that the erase cluster map has no validity and sets the portion of the cluster map corresponding to the erase cluster count table 220 being subject to erase as the subject to erase in step S1205.

Next, the HSM 44 determines whether or not a next erase cluster count table 220 exists in step S1206. When there is no next erase cluster count table 220, the HSM 44 terminates the process for determining the validity. On the other hand, when the next erase cluster count table 220 exists, the HSM 44 sets the next erase cluster count table 220 sets the next erase cluster count table as the subject to determine the validity in step S1207 and conducts a process of step S1202 again.

As described above, by determining the validity, it is possible to maintain the consistence of information recorded in the HDD 38.

Figure 60:
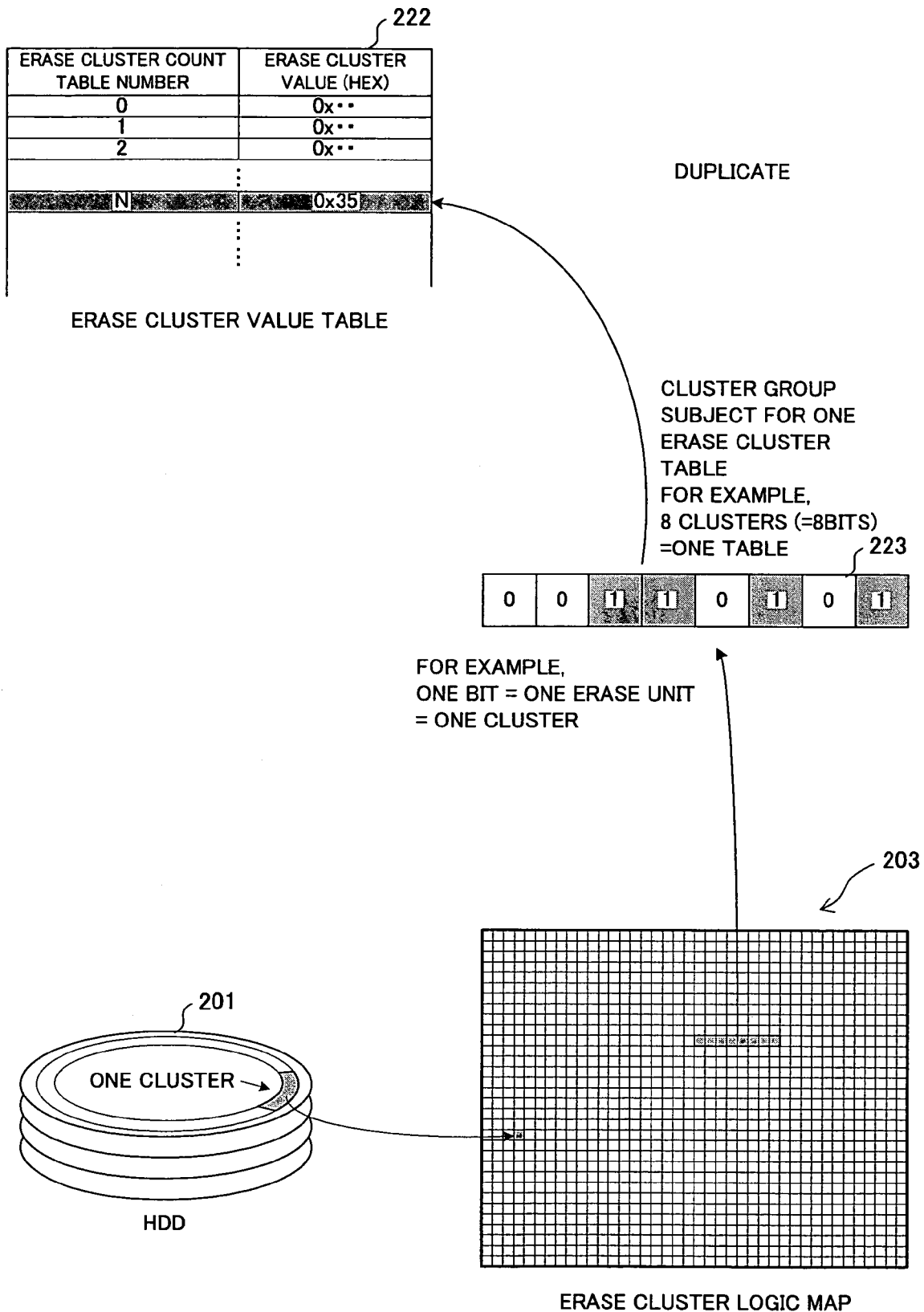
FIG. 60 is a diagram explaining how to determine validity of an erase cluster map according to the fourth embodiment of the present invention.

Next, a second aspect of the validity determination process will be described with reference to FIG. 60. FIG. 60 shows a diagram similar to the diagram shown in FIG. 58. Different from the diagram shown in FIG. 58, a check table 222 for an erase cluster value table corresponding to erase value check information and an erase cluster value table 223 corresponding to erase value information are shown. An erase cluster value shows the erase cluster value table 223 by hexadecimal. Accordingly, in a case of the erase cluster value table 223, as the erase cluster value is "0×35". Thus, in a case of the erase cluster value table number N of the erase cluster value table 223, from the check table 222 for the erase cluster value table 223, it is determined that the erase cluster value table 223 is valid.

Figure 61:
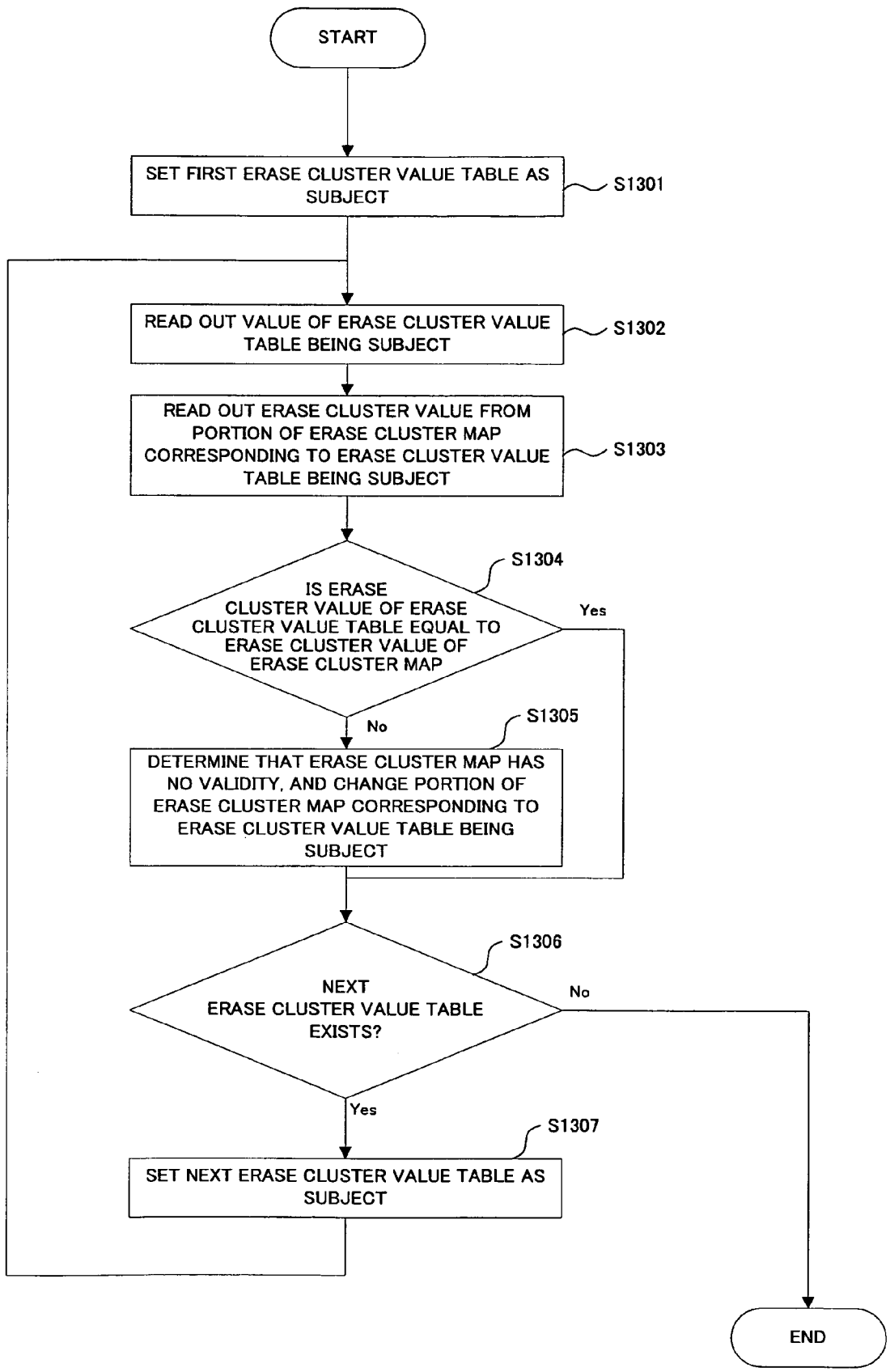
FIG. 61 is a flowchart for explaining a second aspect of a validity process according to the fourth embodiment of the present invention.

A flowchart for a process concerning validity using the check table 222 for the erase cluster value table 223 will be described with reference to FIG. 61. In step S1301, the HSM 44 sets a first erase cluster value table 223 of the check table 222 for the erase cluster value table 223 to be a subject to determine the validity. Next, the HSM 44 reads out the erase cluster value of the erase cluster value table 223 set as the subject to determine the validity in step S1302. Subsequently, the HSM 44 counts the erase cluster value from a portion of a cluster map corresponding to the erase cluster value table 223 set as the subject to determine the validity in step S1303.

Next, the HSM 44 determines whether or not the erase cluster value of the erase cluster value table 223 is equal to the erase cluster value in the erase cluster map in step S1304. Step S1304 corresponds to determining a validity. When the erase cluster value of the erase cluster value table 223 is equal to the erase cluster value in the erase cluster map, the process for determining the validity goes to step S1306. On the other hand, when the erase cluster value of the erase cluster value table 223 is not equal to the erase cluster value in the erase cluster map, the HSM 44 determines that the erase cluster map has no validity and sets the portion of the cluster map corresponding to the erase cluster value table 223 being subject to erase as the subject to erase in step S1305.

Next, the HSM 44 determines whether or not a next erase cluster value table 223 exists in step S1306. When there is no next erase cluster value table 223, the HSM 44 terminates the process for determining the validity. On the other hand, when the next erase cluster value table 223 exists, the HSM 44 sets the next erase cluster value table 223 sets the next erase cluster value table as the subject to determine the validity in step S1307 and conducts a process of step S1302 again.

As described above, according to the fourth embodiment of the present invention, it is possible to maintain the consistency of information recorded in the hard disk even after the power of the multi-functional apparatus 1 is shut down and turned on.

The present invention is not limited to the specifically disclosed embodiments, and variations and modifications may be made without departing from the scope of the present invention.

The present application is based on the Japanese Priority Applications No. 2004-011070 filed on Jan. 19, 2004, No. 2004-011071 filed on Jan. 19, 2004, No. 2004-011072 filed on Jan. 19, 2004, and No. 2004-011073 filed on Jan. 19, 2004, the entire contents of which are hereby incorporated by reference.

What is claimed is:

1. An image forming apparatus including hardware resources to use for an image forming process, at least one program for conducting a process concerning an image formation, and a hard disk for recording information including an image, said image forming apparatus comprising:

a plurality of hard disk clusters each cluster including erase information indicating whether or not the cluster has been designated for erasure;

an erase information map configured to manage the plurality of erase information each showing whether or not to erase data for the corresponding hard disk cluster;

an erase information grouping part configured to group the erase information into a plurality of sections, each section including a portion of the plurality of hard disk clusters;

an erase count information table configured to manage erase count information for each section, the erase count information being determined for each section based on the erase information of the plurality of hard disk clusters in the respective section, wherein the erase count information indicates a number of hard disk clusters designated for erasure in the respective section;

an erase determining part determining, based on the erase count information, whether or not there are any hard disk clusters including erase information indicating that the hard disk cluster is designated for erasure included in each of the plurality of sections; and an erasing part configured to erase each hard disk cluster that includes erase information indicating that the hard disk cluster is designated for erasure in each of the plurality of sections having at least one hard disk cluster designated for erasure when it is determined by the determining part that the respective section includes at least one hard disk cluster designated for erasure.

2. The image forming apparatus as claimed in claim 1, wherein the erase information is shown by one bit and either one of two values shown by the one bit indicates that the hard disk cluster is designated for erasure.

3. The image forming apparatus according to claim 1, wherein said erasing pan holds a process conducted thereby if there is another process having a priority order higher than the process conducted by the erasing pan, and the priority order is used to conduct processes in order.

4. The image forming apparatus according to claim 1, further comprising:

a replacement information generating part generating replacement information for erasing the information recorded in the hard disk; and a replacement information overwriting part overwriting the replacement information on the information currently stored on a sector unit or a cluster unit.

5. The image forming apparatus as claimed in claim 4, wherein the replacement information is a random number.

6. The image forming apparatus as claimed in claim 4, wherein the replacement information is a value obtained by conducting a calculation to the replacement information which is generated by said replacement information generating part.

7. The image forming apparatus as claimed in claim 4, wherein the replacement information is set by an operator of said image forming apparatus.

8. The image forming apparatus as claimed in claim 4, wherein the replacement information is a constant number.

9. The image forming apparatus as claimed in claim 4, wherein said replacement information overwriting part overwrites different replacement information for each sector or each cluster.

10. The image forming apparatus as claimed in claim 4, wherein said replacement information overwriting part repeatedly overwrites.

11. The image forming apparatus as claimed in claim 10, wherein said replacement information overwriting part overwrites the information by a random number as the replacement information at least twice while repeatedly overwriting.

12. An erasing method for erasing information in an image forming apparatus including hardware resources to use for an image forming process, at least one program for conducting a process concerning an image formation, a hard disk for recording information including an image, a plurality of hard disk clusters each cluster including erase information indicating whether or not the cluster has been designated for erasure, an erase information map configured to manage the plurality of erase information each showing whether or not to erase data for the corresponding hard disk cluster, an erase information grouping pan configured to group the erase information into a plurality of sections, each section including a portion of the plurality of hard disk clusters, and an erase count information table configured to manage erase count information for each section, the erase count information being determined for each section based on the erase information of the plurality of hard disk clusters in the respective section, wherein the erase count information indicates a number of hard disk clusters designated for erasure in the respective section, said erasing method comprising:

determining, based on the erase count information, whether or not there are any hard disk clusters including erase information indicating that the hard disk cluster is designated for erasure included in each of the plurality of sections; and erasing each hard disk cluster that includes erase information indicating that the hard disk cluster is designated for erasure in each of the plurality of sections having at least one hard disk cluster designated for erasure when it is determined by the determining pan that the respective section includes at least one hard disk cluster designated for erasure.

13. The erasing method as claimed in claim 12, wherein the erase information is shown by one bit and either one of two values shown by the one bit indicates that the hard disk cluster is designated for erasure.

14. The erasing method according to claim 12, wherein said erasing holds a process conducted therein if there is another process having a priority order higher than the process conducted in said erasing, and the priority order is used to conduct processes in order.

15. The erasing method according to claim 12, further comprising:

generating replacement information for erasing the information recorded in the hard disk; and overwriting the replacement information on the information currently stored on a sector unit or a cluster unit.

16. The erasing method as claimed in claim 15, wherein the replacement information is a random number.

17. The erasing method as claimed in claim 15, wherein the replacement information is a value obtained by conducting a calculation to the replacement information generated in said generating replacement information.

18. The erasing method as claimed in claim 15, wherein said replacement information is set by an operator of said image forming apparatus.

19. The erasing method as claimed in claim 15, wherein said replacement information is a contact number.

20. The erasing method as claimed in claim 15, wherein said overwriting replacement information overwrites different replacement information for each sector or each cluster.

21. The erasing method as claimed in claim 15, wherein said overwriting replacement information repeatedly overwrites.

22. The erasing method as claimed in claim 21, wherein said overwriting replacement information overwrites a random number as the replacement information at least twice while repeatedly overwriting.

* * * * *